US012800150B2

(12) United States Patent
Hoerner et al.

(10) Patent No.: US 12,800,150 B2
(45) Date of Patent: Nov. 17, 2026

(54) GAS GRILLS INCLUDING DOWNWARDLY FACING INFRARED BURNER ASSEMBLIES

(71) Applicant: Weber-Stephen Products LLC, Palatine, IL (US)

(72) Inventors: Madeline Hoerner, Barrington, IL (US); John R. Ciccone, Barrington, IL (US); Mohammed Shoeb, Hoffman Estates, IL (US); Sebastian Szulakiewicz, Mount Prospect, IL (US); Dane M. Parker, Loveland, CO (US); Angela Szydlowski, Mundelein, IL (US)

( * ) Notice: Subject to any disclaimer, the term of this patent is extended or adjusted under 35 U.S.C. 154(b) by 397 days.

(21) Appl. No.: 18/648,924

(22) Filed: Apr. 29, 2024

(65) Prior Publication Data

US 2025/0334270 A1 Oct. 30, 2025

(51) Int. Cl.
*F24C 3/04* (2021.01)
*A47J 37/07* (2006.01)
*F24C 3/10* (2006.01)

(52) U.S. Cl.
CPC ........... *F24C 3/047* (2013.01); *A47J 37/0713* (2013.01); *A47J 37/0759* (2013.01); *F24C 3/10* (2013.01)

(58) Field of Classification Search
CPC ......... F24C 3/047; F24C 3/10; A47J 37/0713; A47J 37/0759; A47J 37/0682
See application file for complete search history.

(56) References Cited

U.S. PATENT DOCUMENTS 3,547,097 A 12/1970 Rice et al.
3,596,591 A 8/1971 Spates
(Continued)

FOREIGN PATENT DOCUMENTS

EP 1372446 B1 3/2005
EP 2959810 B1 5/2019
(Continued)

OTHER PUBLICATIONS

International Searching Authority, "International Search Report and Written Opinion," issued in connection with International Patent Application No. PCT/US2025/010245, mailed on Apr. 23, 2025, 10 pages.

(Continued)

*Primary Examiner* — Alfred Basichas
(74) *Attorney, Agent, or Firm* — Avantech Law, LLP

(57) ABSTRACT

Gas grills including downwardly facing infrared (IR) burner assemblies are disclosed. An example gas grill includes a cookbox, a shroud, an IR burner, and a cooking grate. The shroud includes opposing sidewalls and a housing. The opposing sidewalls extend upwardly from the cookbox and include a first pair of opposing grate supports and a second pair of opposing grate supports located below the first pair of opposing grate supports. The housing extends between the opposing sidewalls and defines an internal compartment. The IR burner is coupled to the housing such that a portion of the IR burner is located within the internal compartment. The IR burner includes a plurality of downwardly facing ceramic tiles configured in an end-to-end arrangement. The cooking grate is located below the IR burner and supported by either the first or the second pair of opposing grate supports.

19 Claims, 26 Drawing Sheets

(56) References Cited

U.S. PATENT DOCUMENTS

| | | | | |
|---|---|---|---|---|
| 4,089,258 | A | 5/1978 | Berger | |
| 7,117,866 | B2 | 10/2006 | Cantal | |
| 8,993,026 | B2 | 3/2015 | Molnar et al. | |
| 9,314,134 | B2 | 4/2016 | Molnar | |
| 9,316,401 | B1 | 4/2016 | Guste | |
| 10,271,687 | B2 | 4/2019 | Wenzel et al. | |
| 10,835,079 | B2 | 11/2020 | Wenzel et al. | |
| 10,888,196 | B2 | 1/2021 | Wenzel et al. | |
| 10,959,574 | B2 | 3/2021 | Wenzel et al. | |
| 11,058,257 | B2 | 7/2021 | Wenzel et al. | |
| 11,089,904 | B2 | 8/2021 | Wenzel et al. | |
| 11,202,531 | B2 | 12/2021 | Wenzel et al. | |
| 11,737,601 | B1 * | 8/2023 | Bien-Aime | A47J 37/041 126/41 R |
| 2004/0060554 | A1 | 4/2004 | Schlosser et al. | |
| 2004/0173199 | A1 | 9/2004 | Cantal | |
| 2006/0048765 | A1 | 3/2006 | Bruno et al. | |
| 2009/0078245 | A1 * | 3/2009 | Chang | A47J 37/0713 126/25 B |
| 2009/0272278 | A1 | 11/2009 | von Herrmann et al. | |
| 2011/0049125 | A1 | 3/2011 | Home | |
| 2011/0262113 | A1 | 10/2011 | Home | |
| 2012/0073453 | A1 * | 3/2012 | Choi | A47J 37/0713 99/443 R |
| 2014/0216434 | A1 | 8/2014 | Moreth, III et al. | |
| 2023/0100955 | A1 | 3/2023 | Mercado, Jr. et al. | |
| 2025/0127330 | A1 * | 4/2025 | Ruhfus | A47J 37/0713 |

FOREIGN PATENT DOCUMENTS

| | | | |
|---|---|---|---|
| EP | 3708043 | B1 | 11/2022 |
| EP | 4124265 | A1 | 2/2023 |
| EP | 3708042 | B1 | 8/2023 |
| WO | 2017021887 | A1 | 2/2017 |
| WO | 2019004839 | A1 | 1/2019 |

OTHER PUBLICATIONS

Weber, Summit Smart FS38X E Gas Grill, accessed on Apr. 12, 2024 from https://www.weber.com/US/en/gas/summit/summit-smart-fs38x-e-gas-grill-%28liquid-propane%29/1500051.html.

Weber, Summit FS38 E Gas Grill, accessed on Apr. 30, 2024 from https://www.weber.com/US/en/gas/summit/summit-fs38-e-gas-grill-%28liquid-propane%29/1500029.html.

* cited by examiner

SECTION B-B

SECTION C-C

GAS GRILLS INCLUDING DOWNWARDLY FACING INFRARED BURNER ASSEMBLIES

FIELD OF THE DISCLOSURE

This disclosure relates generally to gas grills and, more specifically, to gas grills including downwardly facing infrared (IR) burner assemblies.

BACKGROUND

Gas grills are typically equipped with a burner assembly including a manifold, one or more burner(s), and one or more valve(s), with each valve being operatively positioned between the manifold and a corresponding burner to control a flow of pressurized fluid (e.g., pressurized gas) from the manifold into the valve, and from the valve into the corresponding burner. The burner(s) of such conventional gas grills are commonly implemented by one or more burner tube(s). In some examples, the burner(s) of such conventional gas grills additionally or alternatively include one or more IR burner(s). IR burners are known to offer certain performance benefits relative to traditional and/or standard burner tubes. For example, IR burners typically provide for higher temperatures, faster preheat times, and faster cooking times relative to the temperatures, preheat times, and cooking times that are attainable via traditional and/or standard burner tubes.

Figure 1:
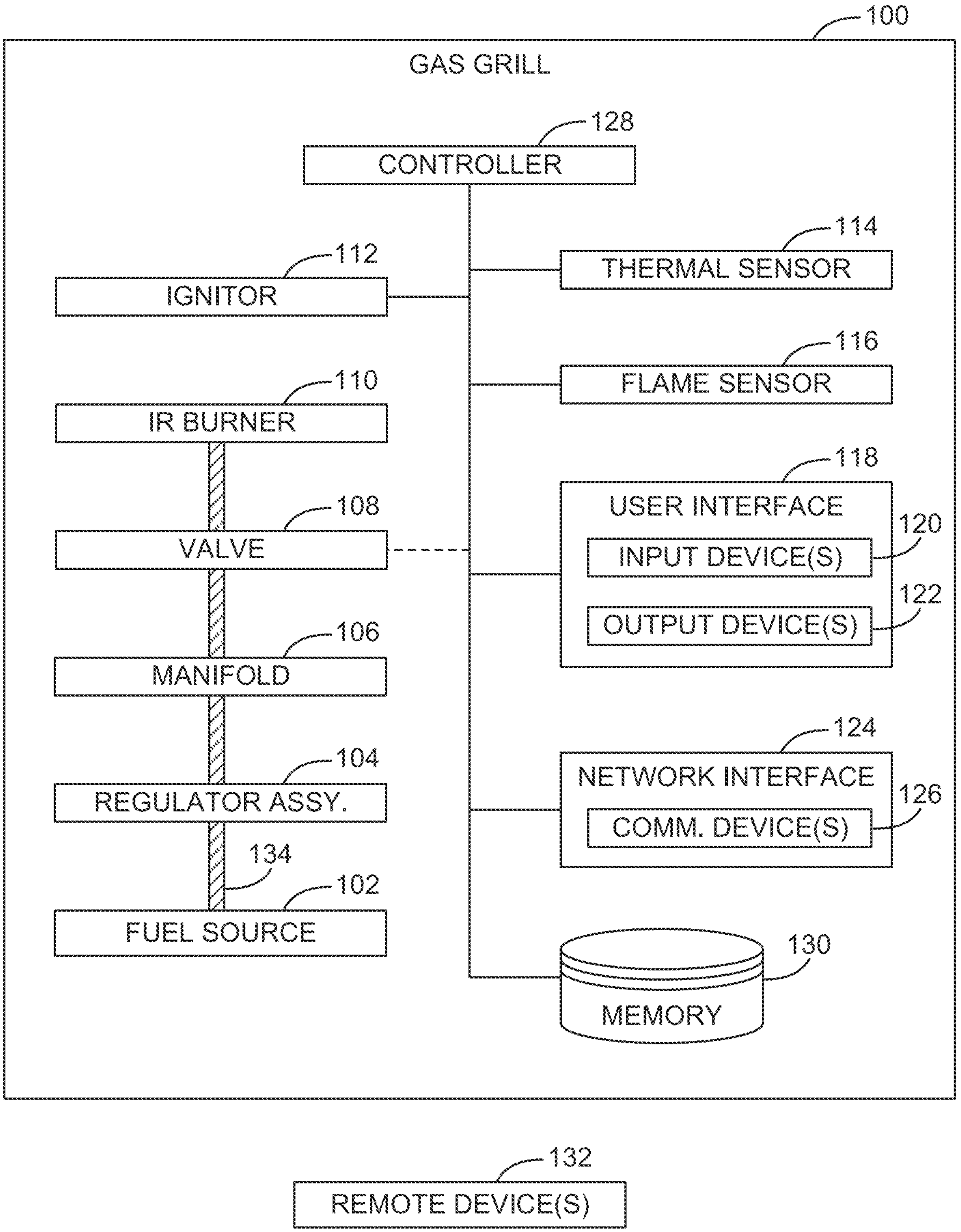
FIG. 1 is a block diagram of an example gas grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, gas grills are typically equipped with a burner assembly including a manifold, one or more burner (s), and one or more valve(s), with each valve being operatively positioned between the manifold and a corresponding burner to control a flow of pressurized fluid (e.g., pressurized gas) from the manifold into the valve, and from the valve into the corresponding burner. The burner(s) of such conventional gas grills are commonly implemented by one or more burner tube(s). In some examples, the burner(s) of such conventional gas grills additionally or alternatively include one or more IR burner(s). IR burners are known to offer certain performance benefits relative to traditional and/or standard burner tubes. For example, IR burners typically provide for higher temperatures, faster preheat times, and faster cooking times relative to the temperatures, preheat times, and cooking times that are attainable via traditional and/or standard burner tubes.

Example gas grills disclosed herein include downwardly facing (e.g., alternatively referenced as "top down") IR burner assemblies. In some disclosed examples, a gas grill includes a cookbox, a shroud, an IR burner, and a cooking grate. The shroud, which is coupled to the cookbox, includes opposing sidewalls and a housing. The opposing sidewalls of the shroud extend upwardly from the cookbox and include one or more pair(s) of opposing grate supports. The housing of the shroud extends between the opposing sidewalls of the shroud and defines an internal compartment that is laterally bound by the opposing sidewalls. The IR burner is coupled to the housing of the shroud such that a portion of the IR burner is located within the internal compartment. The IR burner includes a plurality of downwardly facing ceramic tiles configured in an end-to-end arrangement having a first end and a second end. The cooking grate is located below the IR burner on one of the one or more pair(s) of opposing grate supports of the shroud.

In some disclosed examples, the shroud provides a closed off boundary between the internal compartment of the shroud and a cooking chamber of the gas grill.

In some disclosed examples, respective neighboring ones of the plurality of downwardly facing ceramic tiles of the IR burner are spaced apart by a gap. In some disclosed examples, the gap between the respective neighboring ones of the plurality of downwardly facing ceramic tiles is ten millimeters or less.

In some disclosed examples, the opposing sidewalls of the shroud include at least a first pair and a second pair of opposing grate supports, with the second pair of opposing grate supports being located below the first pair of opposing grate supports. In some disclosed examples, the cooking grate is spaced apart from the IR burner by a first distance when the cooking grate is supported by the first pair of opposing grate supports and by a second distance greater than the first distance when the cooking grate is supported by the second pair of opposing grate supports. The ability to selectively support the cooking grate at different distances away from the IR burner advantageously enables a user of the gas grill to adjust the intensity of the IR burner relative to one or more item(s) of food to be placed on the cooking grate in connection with a cooking operation involving the IR burner.

In some disclosed examples, the cooking grate includes a front support rod, a rear support rod, a plurality of laterally spaced support rods, a first indicator rod, and a second indicator rod. The rear support rod is arranged parallel to and spaced apart from the front support rod. The laterally spaced support rods are arranged perpendicular to and extend between the front support rod and the rear support rod. The first indicator rod is welded to an underside of one or more of the plurality of laterally spaced support rods, with the first indicator rod being arranged parallel to and located rearward of the front support rod. The second indicator rod is located rearward of the first indicator rod and welded to an underside of one or more of the plurality of laterally spaced support rods, with the second indicator rod being arranged parallel to and located forward of the rear support rod. The first indicator rod and the second indicator rod collectively indicate and/or demarcate the boundaries of an optimal food placement area associated with a projection of heat generated by the IR burner. Indication and/or demarcation of the optimal food placement area via the first indicator rod and the second indicator rod of the cooking grate advantageously provides a user of the gas grill with a clear visual indication as to the preferred area for food placement on the cooking grate to best obtain the enhanced heating and/or cooking capabilities (e.g., high-heat searing capabilities) provided by the IR burner.

In some disclosed examples, the gas grill includes a guard coupled to the IR burner. The guard includes a plurality of first rods and a plurality of second rods. The first rods are located below and spaced apart from the plurality of downwardly facing ceramic tiles. Respective ones of the first rods are oriented parallel to and spaced apart from one another. The second rods are located below and spaced apart from the plurality of downwardly facing ceramic tiles. Respective ones of the second rods are oriented parallel to and spaced apart from one another, and are oriented orthogonally relative to the respective ones of the first rods. The first rods and the second rods are configured to protect a bottom surface of each one of the plurality of downwardly facing ceramic tiles. In this regard, the respective ones of the first rods and the respective ones of the second rods collectively form a lattice (e.g., a grid) that is advantageously configured to prevent objects (e.g., cooking tools, utensils, cookware, human hands, etc.) from coming into contact with the bottom surface (e.g., the bottom face) of each one of the downwardly facing ceramic tiles of the IR burner.

In some disclosed examples, the gas grill includes an ignitor operatively positioned proximate the first end of the end-to-end arrangement of the plurality of downwardly facing ceramic tiles. The ignitor is configured to ignite a first ceramic tile from among the plurality of downwardly facing ceramic tiles, with the first ceramic tile being located at the first end of the end-to-end arrangement. In some disclosed examples, the gas grill includes a first component housing coupled to and extending from a portion of the housing formed by the shroud, with the first component housing being configured to contain a portion of the ignitor. In some disclosed examples, the gas grill includes a grounding bracket extending between the ignitor and/or the first component housing on the one hand, and the IR burner on the other hand.

In some disclosed examples, the gas grill includes a flame sensor operatively positioned proximate the first end of the end-to-end arrangement. The flame sensor is advantageously configured to detect whether the first ceramic tile is ignited. In some disclosed examples, the first component housing that contains a portion of the ignitor is further configured to contain a portion of the flame sensor.

In some disclosed examples, the gas grill includes a thermal sensor operatively positioned proximate the second end of the end-to-end arrangement of the downwardly facing ceramic tiles. The thermal sensor is advantageously configured to detect whether a second ceramic tile from among the plurality of downwardly facing ceramic tiles is ignited, with the second ceramic tile being located at the second end of the end-to-end arrangement. In some disclosed examples, the gas grill includes a second component housing coupled to and extending from a portion of the housing formed by the shroud, with the second component housing being configured to contain a portion of the thermal sensor.

The above-identified features as well as other advantageous features of example gas grills including downwardly facing IR burner assemblies are further described below in connection with the figures of the application.

As used herein in a mechanical context, the term “configured” means sized, shaped, arranged, structured, oriented, positioned, and/or located. For example, in the context of a first part configured to fit within a second part, the first part is sized, shaped, arranged, structured, oriented, positioned, and/or located to fit within the second part. As used herein in an electrical and/or computing context, the term “configured” means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein in the context of a first object circumscribing a second object, the term “circumscribe” means that the first object is constructed around and/or defines an area around the second object. In interpreting the term “circumscribe” as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms “above” and “below” describe the relationship of two parts relative to Earth. For example, as used herein, a first part is “above” a second part if the second part is closer to Earth than the first part is. As another example, as used herein, a first part is “below” a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in “contact” with another part is defined to mean that there is no intermediate part between the two parts at the point (or points) of contact between the two parts.

As used herein, the term “fastener” means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

As used herein in the context of describing the relationship between two structures, the terms “in fluid communication,” “fluidically connected,” and/or “fluidically coupled” mean that the two structures are individually and/or collectively configured to allow a fluid (e.g., a gas or a liquid) to pass (e.g., to flow) from the first of the two structures to the second of the two structures, or vice-versa. For example, a second flow channel may be described as being in fluid communication with a first flow channel when a fluid (e.g., a gas or a liquid) is able to pass (e.g., to flow) from the first flow channel into the second flow channel, or from the second flow channel into the first flow channel.

As used herein, the term “in electrical communication,” including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, “processor circuitry” is defined to include (i) one or more special purpose electrical circuit(s) structured to perform one or more specific operation(s), and/or (ii) one or more general purpose electrical circuit(s) programmable with instructions to perform one or more specific operation(s). Example processor circuitry described herein can include any type(s) and/or any number(s) of processor(s), microprocessor(s), controller(s), microcontroller(s), application specific integrated circuit(s) (ASIC(s)), programmable logic device(s) (PLD(s)), field programmable logic device(s), (FPLD(s)), field programmable gate arrays (FPGA(s)), digital signal processor(s) (DSP(s)), graphics processing unit(s) (GPU(s)), central processor unit(s) (CPU(s)), semiconductor-based (e.g., silicon-based) circuit(s), digital circuit(s), analog circuit(s), logic circuit(s), and/or integrated circuit(s) implemented via any type(s) and/or any number(s) of transistor(s), capacitor(s), diode(s), inductor(s), resistor(s), timer(s), counter(s), printed circuit board(s), connector(s), wire(s), and/or other electrical circuit component(s).

As used herein, the terms “non-transitory computer-readable medium” and “non-transitory computer-readable storage medium” are expressly defined to include any type of computer-readable storage device and/or storage disk and to exclude propagating signals and to exclude transmission media.

As used herein, the terms “substantially” and/or “approximately” modify their subjects and/or values to recognize the potential presence of variations that occur in real world applications. For example, “substantially” and/or “approximately” may modify dimensions that may not be exact due to manufacturing tolerances and/or other real-world imperfections as will be understood by persons of ordinary skill in the art. For example, “substantially” and/or “approximately” may indicate such dimensions may be within a tolerance range of +/−10% unless otherwise specified in the description provided herein.

As used herein, the terms “including” and “comprising” (and all forms and tenses thereof) are open-ended terms. Thus, whenever the written description or a claim employs any form of “include” or “comprise” (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

FIG. 1 is a block diagram of an example gas grill 100 constructed in accordance with the teachings of this disclosure. The gas grill 100 of FIG. 1 includes an example fuel source 102, an example regulator assembly 104, an example manifold 106, an example valve 108, an example IR burner 110, an example ignitor 112, an example thermal sensor 114, an example flame sensor 116, an example user interface 118 (e.g., including one or more example input device(s) 120 and one or more example output device(s) 122), an example network interface 124 (e.g., including one or more example communication device(s) 126), an example controller 128, and example memory 130. In other examples, one or more of the aforementioned components of FIG. 1 can be omitted from the gas grill 100. In still other examples, the gas grill 100 can include one or more other component(s) in addition to or in lieu of the aforementioned components of FIG. 1. The gas grill 100 of FIG. 1 is configured to communicate (e.g., wirelessly communicate) with one or more example remote device(s) 132, as further described below.

The fuel source 102 of the gas grill of FIG. 1 is a source of combustible gas. In some examples, the fuel source 102 is implemented as a fuel tank (e.g., a propane tank) containing combustible gas. In such examples, the fuel source 102 will typically be located partially or fully within a cabinet of the gas grill 100, partially or fully within a spatial footprint formed by a frame of the gas grill 100, below a cookbox of the gas grill 100 and partially or fully within a spatial footprint formed by the cookbox, or below a cookbox of the gas grill 100 and partially or fully within a spatial footprint formed by a side table of the gas grill 100. In other examples, the fuel source 102 can instead be implemented as a piped (e.g., household) natural gas line that provides an accessible flow of combustible gas.

The regulator assembly 104 of the gas grill 100 of FIG. 1 is operatively positioned between the fuel source 102 and the manifold 106 of the gas grill 100 such that a supply of pressurized combustible gas provided via the fuel source 102 is regulated by the regulator assembly 104 as the pressurized combustible gas flows from the fuel source 102 through the regulator assembly 104 and into the manifold 106. The manifold 106 of the gas grill 100 of FIG. 1 is operatively positioned between the regulator assembly 104 and the valve 108 of the gas grill 100. The manifold 106 is configured to contain pressurized combustible gas received from the regulator assembly 104 until such pressurized combustible gas can be fed and/or can flow into the valve 108 by virtue of a flow control member of the valve 108 being in an open position.

The valve 108 of the gas grill 100 of FIG. 1 is operatively positioned between the manifold 106 and the IR burner 110 such that pressurized combustible gas received at the manifold 106 can be selectively supplied to the IR burner 110 via the valve 108. In this regard, the valve 108 includes a flow control member (e.g., a cone, a ball, a plug, a gate, a disc, etc.) configured to be movable between a closed position that prevents gas contained within the manifold 106 from flowing toward and/or into the IR burner 110, and an open position that enables gas contained within the manifold 106 to flow toward and/or into the IR burner 110.

In some examples, the valve 108 of FIG. 1 is implemented as a manually-controlled valve. In such examples, the valve 108 may include a stem that is mechanically coupled to the flow control member of the valve 108 such that movement (e.g., rotation) of the stem causes a corresponding movement (e.g., rotation) of the flow control member between the closed position and the open position. In such examples, movement (e.g., rotation) of the stem may be facilitated via user interaction with a control knob that is mechanically coupled to the stem.

In other examples, the valve 108 of FIG. 1 can instead be implemented as a controllable electric valve (e.g., a solenoid valve). In such other examples, the flow control member of the valve 108 is configured to transition from the closed position to the open position, and vice-versa, in response to instructions, commands, and/or signals (e.g., a supply of current) generated by the controller 128 of the gas grill 100 of FIG. 1. Accordingly, in such other examples, the valve 108 is operatively coupled to (e.g., in electrical communication with) the controller 128 of the gas grill 100. In such other examples, the controller 128 may generate one or more instruction(s), command(s), and/or signal(s) associated with movement of the flow control member of the valve 108 in response to one or more user input(s), instruction(s), command(s), and/or signal(s) received via the user interface 118 and/or the network interface 124 of the gas grill 100 of FIG. 1.

The IR burner 110 of the gas grill 100 of FIG. 1 includes a combustion chamber that is at least partially bound by one or more downwardly facing ceramic tile(s) having a plurality of apertures extending therethrough. In response to ignition of combustible gas contained in and/or emanating from (e.g., via the apertures of the ceramic tile(s)) the combustion chamber, high-intensity radiant heat is generated and/or produced by the ceramic tile(s), with such heat being directed downwardly from the ceramic tile(s) toward a cooking grate located below the IR burner 110 and positioned within a cooking chamber of the gas grill 100. Example implementations of the IR burner 110 of the gas grill 100 of FIG. 1 are further described below in connection with FIGS. 2-11 and 16-30.

The gas grill 100 of FIG. 1 further includes an example gas train 134 that extends from the fuel source 102 to the regulator assembly 104, from the regulator assembly 104 to the manifold 106, from the manifold 106 to the valve 108, and from the valve 108 to the IR burner 110. The gas train 134 of FIG. 1 can be implemented via one or more conduit(s) (e.g., one or more rigid or flexible pipe(s), tube(s), etc.) that are configured to carry and/or otherwise contain pressurized combustible gas. In the illustrated example of FIG. 1, the gas train 134 is configured such that the regulator assembly 104 is in fluid communication with and located downstream from the fuel source 102, the manifold 106 is in fluid communication with and located downstream from the regulator assembly 104, the valve 108 is in fluid communication with and located downstream from the manifold 106, and the IR burner 110 is in fluid communication with and located downstream from the valve 108.

The ignitor 112 of the gas grill 100 of FIG. 1 is operatively positioned relative to the IR burner 110 of the gas grill 100. More specifically, the IR burner 110 is located proximate (e.g., adjacent) the IR burner 110 at a position that enables the ignitor 112 to ignite combustible gas as the combustible gas emanates from the IR burner 110 via apertures formed in one or more of a plurality of ceramic tiles of the IR burner 110, as further described herein. In the illustrated example of FIG. 1, the ignitor 112 is operatively coupled to (e.g., in electrical communication with) the controller 128 of the gas grill 100, with the ignitor 112 being configured to generate sparks (e.g., via a spark electrode of the ignitor 112) and/or to otherwise induce ignition of the combustible gas emanating from the IR burner 110 in response to an instruction, a command, and/or a signal (e.g., an ignition activation instruction, command, and/or signal) generated by the controller 128. Example implementations of the ignitor 112 of the gas grill 100 of FIG. 1 are further described below in connection with FIGS. 16-30.

The thermal sensor 114 of the gas grill 100 of FIG. 1 is configured to sense, measure, and/or detect whether a temperature proximate to (e.g., adjacent) the IR burner 110 of the gas grill 100 exceeds a predetermined temperature threshold. In some examples, the thermal sensor 114 can be implemented by and/or as a thermal switch that is operatively positioned proximate to (e.g., adjacent) the IR burner 110 of FIG. 1 (e.g., proximate to one or more of a plurality of ceramic tiles of the IR burner 110). Data, information, and/or signals sensed, measured, and/or detected by the thermal sensor 114 of FIG. 1 can be of any quantity, type, form, and/or format. Data, information, and/or signals sensed, measured, and/or detected by the thermal sensor 114 of FIG. 1 can be transmitted directly to the controller 128 of FIG. 1, and/or can be transmitted to and stored in the memory 130 of FIG. 1. Example implementations of the thermal sensor 114 of the gas grill 100 of FIG. 1 are further described below in connection with FIGS. 16-23 and 25-28.

The flame sensor 116 of the gas grill 100 of FIG. 1 is configured to detect the presence and/or the absence of a flame proximate to (e.g., adjacent) the IR burner 110 of the gas grill 100. In some examples, the flame sensor 116 of the gas grill 100 can be structured, configured, and/or implemented as one of the various flame sensors described in U.S. Pat. No. 11,624,508. The entirety of U.S. Pat. No. 11,624,508 is hereby incorporated by reference herein. Data, information, and/or signals sensed, measured, and/or detected by the flame sensor 116 of FIG. 1 can be of any quantity, type, form, and/or format. In some examples, data, information, and/or signals sensed, measured, and/or detected by the flame sensor 116 of FIG. 1 can be transmitted directly to the controller 128 of FIG. 1, and/or can be transmitted to and stored in the memory 130 of FIG. 1. Example implementations of the flame sensor 116 of the gas grill 100 of FIG. 1 are further described below in connection with FIGS. 24, 29, and 30.

The user interface 118 of the gas grill 100 of FIG. 1 enables a user of the gas grill 100 to interact with the controller 128 of the gas grill 100. In the illustrated example of FIG. 1, the user interface 118 is operatively coupled to (e.g., in electrical communication with) the controller 128 and/or the memory 130 of the gas grill 100. In some examples, the user interface 118 is mechanically coupled to (e.g., fixedly connected to) the gas grill 100. For example, the user interface 118 can be mounted to a cookbox, a lid, a frame, or a side table of the gas grill 100. The user interface 118 is preferably mounted to a portion of the gas grill 100 that is readily accessible to a user of the gas grill 100, such as a front portion of a cookbox, a front portion of a lid, a front portion of a frame, or a front portion of a side table of the gas grill 100. In some examples, respective ones of the input device(s) 120 and/or the output device(s) 122 of the user interface 118 can be mounted to different portions of the gas grill 100. The architecture and/or operations of the user interface 118 can be distributed among any number of user interfaces respectively having any number of input device(s) 120 and/or output device(s) 122 located at and/or mounted to any portion of the gas grill 100.

The input device(s) 120 of the user interface 118 of FIG. 1 permit(s) the user of the gas grill 100 to enter data, information, selections, inputs, instructions, and/or commands into the controller 128. For example, the input device(s) 120 of the user interface 118 can permit the user of the gas grill 100 to enter data, information, one or more selection(s), one or more input(s), one or more instruction(s), and/or one or more command(s) into the controller 128 that cause(s) the controller 128 to implement (e.g., to initiate, to execute, and/or to terminate) one or more ignition monitoring process(es) (e.g., one or more process(es) and/or protocol(s) configured to monitor an ignition status of the IR burner 110 of FIG. 1) via the gas grill 100. The input device(s) 120 of the user interface 118 can be implemented, for example, by one or more of a touchscreen, a button, a dial, a knob, a switch, an audio sensor, a microphone, an image sensor, a camera, and/or a voice recognition system.

The output device(s) 122 of the user interface 118 of FIG. 1 facilitate(s) the presentation of data and/or information (e.g., data and/or information generated by the controller 128) to the user of the gas grill 100. For example, the output device(s) 122 of the user interface 118 can facilitate the presentation (e.g., textually, graphically, and/or audibly) of data and/or information (e.g., one or more notification(s), alert(s), and/or message(s)) associated with implementing (e.g., initiating, executing, and/or terminating) one or more ignition monitoring process(es) (e.g., one or more process(es) and/or protocol(s) configured to monitor an ignition status of the IR burner 110 of FIG. 1) via the gas grill 100. The output device(s) 122 of the user interface 118 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker.

The network interface 124 of the gas grill 100 of FIG. 1 enables a user of the gas grill 100 to remotely interact (e.g., via one or more of the remote device(s) 132) with the gas grill 100. In the illustrated example of FIG. 1, the network interface 124 is operatively coupled to (e.g., in electrical communication with) the controller 128 and/or the memory 130 of the gas grill 100. The network interface 124 of FIG. 1 includes one or more communication device(s) 126 (e.g., transmitter(s), receiver(s), transceiver(s), modem(s), gateway(s), wireless access point(s), etc.) to facilitate the exchange of data with external machines (e.g., computing devices of any kind, including the remote device(s) 132 of FIG. 1) by a wired or wireless communication network. Communications transmitted and/or received via the communication device(s) 126 and/or, more generally, via the network interface 124 can be made over and/or carried by, for example, an Ethernet connection, a digital subscriber line (DSL) connection, a telephone line connection, a coaxial cable system, a satellite system, a wireless system, a cellular telephone system, an optical connection, etc.

The controller 128 of the gas grill 100 of FIG. 1 implements processor circuitry to control and/or manage one or more operation(s) associated with the gas grill 100 of FIG. 1 and/or the components thereof, including the valve 108, the ignitor 112, the thermal sensor 114, the flame sensor 116, the user interface 118 (e.g., including the input device(s) 120 and the output device(s) 122), the network interface 124 (e.g., including the communication device(s) 126), and/or the memory 130. The processor circuitry of the controller 128 of FIG. 1 includes any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s).

In the illustrated example of FIG. 1, the controller 128 is graphically represented as a single, discrete structure that manages and/or controls the operation(s) of various components of the gas grill 100. It is to be understood, however, that in other examples, the architecture and/or operations of the controller 128 can be distributed among any number of controllers, with each separate controller having a dedicated subset of one or more operation(s) described herein. In some examples, the gas grill 100 can include separate, distinct controllers for one or more of the valve 108, the ignitor 112, the thermal sensor 114, the flame sensor 116, the user interface 118 (e.g., including the input device(s) 120 and the output device(s) 122), the network interface 124 (e.g., including the communication device(s) 126), and/or the memory 130 of the gas grill 100.

In the illustrated example of FIG. 1, the controller 128 is operatively coupled to (e.g., in electrical communication with) one or more of the valve 108, the ignitor 112, the thermal sensor 114, the flame sensor 116, the user interface 118 (e.g., including the input device(s) 120 and the output device(s) 122), the network interface 124 (e.g., including the communication device(s) 126), and/or the memory 130 of the gas grill 100. The controller 128 of FIG. 1 is also operatively coupled to (e.g., in wired or wireless electrical communication with) the remote device(s) 132 of FIG. 1 via the network interface 124 (e.g., including the communication device(s) 126) of the gas grill 100 of FIG. 1. In some examples, the controller 128 of FIG. 1 receives commands, instructions, signals, and/or data from, and/or transmits commands, instructions, signals, and/or data to, the valve 108, the ignitor 112, the thermal sensor 114, the flame sensor 116, the user interface 118 (e.g., including the input device(s) 120 and the output device(s) 122), the network interface 124 (e.g., including the communication device(s) 126), and/or the memory 130 of the gas grill 100 in connection with implementing (e.g., initiating, executing, and/or terminating) one or more ignition monitoring protocol(s), process(es), program(s), sequence(s), subroutine(s), and/or method(s), as further described herein.

In some examples, the controller 128 of FIG. 1 manages and/or controls one or more operation(s) associated with the gas grill 100 based on instructions, commands, and/or signals transmitted from the controller 128 to one or more component(s) of the gas grill 100 that is/are operatively coupled to (e.g., in wired or wireless electrical communication with) the controller 128. For example, when the valve 108 of FIG. 1 is implemented as a controllable electric valve (e.g., a solenoid valve), the controller 128 of FIG. 1 can instruct, command, signal, and/or otherwise cause the valve 108 of the gas grill 100 to open (e.g., fully open), to close (e.g., fully close), or to otherwise change position. As another example, the controller 128 of FIG. 1 can instruct, command, signal, and/or otherwise cause the ignitor 112 of the gas grill 100 to activate (e.g., to fire), thereby causing the ignitor 112 to ignite the IR burner 110 of the gas grill 100. As another example, the controller 128 of FIG. 1 can instruct, command, signal, and/or otherwise cause one or more of the output device(s) 122 of the user interface 118 of the gas grill 100 to textually, graphically, or audibly present data and/or information, which may include one or more notification(s) (e.g., one or more visible, audible, and/or tactile message(s) or alert(s)). As another example, the controller 128 of FIG. 1 can instruct, command, signal, and/or otherwise cause one or more of the communication device(s) 126 of the network interface 124 of the gas grill 100 to transmit data and/or information, which may include one or more notification(s) (e.g., one or more visible, audible, and/or tactile message(s) or alert(s)), to one or more of the remote device(s) 132 of FIG. 1.

In some examples, the controller 128 of FIG. 1 detects and/or determines one or more state(s), condition(s), operation(s), and/or event(s) associated with the gas grill 100 based on data, information, and/or signals received from one or more component(s) of the gas grill 100 that is/are operatively coupled to (e.g., in wired or wireless electrical communication with) the controller 128 of the gas grill 100. For example, when the valve 108 of FIG. 1 is implemented as a controllable electric valve (e.g., a solenoid valve), the controller 128 of FIG. 1 can detect and/or determine a relative position of the valve 108 of the gas grill 100 based on one or more instruction(s), command(s), and/or signal(s) generated at the controller 128 and/or transmitted to the valve 108. As another example, the controller 128 of FIG. 1 can detect and/or determine an activation status of the ignitor 112 of the gas grill 100 (e.g., whether the ignitor has been activated) based on one or more ignition activation instruction(s), command(s), and/or signal(s) generated at the controller 128 and/or transmitted to the ignitor 112. As another example, the controller 128 of FIG. 1 can detect and/or determine whether one or more ceramic tile(s) of the IR burner 110 of the gas grill 100 is/are ignited based on data, information, and/or signals received from the thermal sensor 114 and/or the flame sensor 116 of the gas grill 100. As another example, the controller 128 of FIG. 1 can detect and/or determine one or more state(s), condition(s), operation(s), and/or event(s) associated with the gas grill 100 based on data, information, and/or signals received from the user interface 118 of the gas grill 100. As another example, the controller 128 of FIG. 1 can detect and/or determine one or more state(s), condition(s), operation(s), and/or event(s) associated with the gas grill 100 based on data, information, and/or signals received from the network interface 124 of the gas grill 100.

In some examples, the controller 128 of FIG. 1 manages and/or controls the implementation, invocation, initiation, termination, and/or execution of one or more timer(s) of the gas grill 100, with each such timer having a predetermined duration (e.g., as may be stored in the memory 130 of the gas grill 100) associated therewith. In some examples, the predetermined duration of a timer has an associated starting time value of zero and an associated ending time value greater than zero (e.g., a timer that increases in value over time). In other examples, the predetermined duration of a timer has an associated starting time value greater than zero and an associated ending time value of zero (e.g., a timer that decreases in value over time). In some examples, controller 128 of FIG. 1 detects and/or determines whether a timer has reached its associated predetermined duration.

In some examples, the controller 128 of FIG. 1 implements, manages, and/or controls an ignition monitoring process via the gas grill 100, wherein the ignition monitoring process is configured to monitor an ignition status of the IR burner 110 of the gas grill 100. In connection with implementing and/or executing the ignition monitoring process, the controller 128 of FIG. 1 determines whether the ignitor 112 associated with the IR burner 110 of the gas grill 100 of FIG. 1 has been activated. For example, the controller 128 can determine that the ignitor 112 has been activated based on one or more ignition activation instruction(s), command(s), and/or signal(s) generated by the controller 128 and/or transmitted to the ignitor 112. In response to determining that the ignitor 112 has been activated, the controller 128 of FIG. 1 initiates a timer having a predetermined duration (e.g., as may be stored in the memory 130 of the gas grill 100) associated therewith. In some examples, the predetermined duration of the timer may have an associated starting time value of zero and an associated ending time value greater than zero (e.g., a timer that increases in value over time). In other examples, the predetermined duration of the timer may have an associated starting time value greater than zero and an associated ending time value of zero (e.g., a timer that decreases in value over time).

Following initiation of the timer, the controller 128 of FIG. 1 determines whether ignition of one or more of ceramic tile(s) of the IR burner 110 of the gas grill 100 of FIG. 1 has been detected. For example, the controller 128 can determine, based on data sensed, measured, and/or detected by either the thermal sensor 114 or the flame sensor 116 of FIG. 1, whether ignition of one or more ceramic tile(s) of the IR burner 110 has been detected. In some examples, the controller 128 of FIG. 1 continues evaluating the ignition status of the IR burner 110 until the earlier of either (1) the controller 128 determining that ignition of one or more ceramic tile(s) of the IR burner 110 has been detected, or (2) the controller 128 determining that the timer has reached the predetermined duration.

In response to the controller 128 of FIG. 1 determining that the timer has reached the predetermined duration prior to the controller 128 determining that ignition of one or more ceramic tile(s) of the IR burner 110 has been detected, the controller 128 generates one or more notification(s) (e.g., visible, audible, and/or tactile message(s) or alert(s)) that, when presented, indicate that ignition of the IR burner 110 of the gas grill 100 has failed. In some examples, the processor circuitry of the controller 128 generates one or more "failed ignition" notification(s) that, when presented, is/are intended to expressly inform a user of the gas grill 100 that ignition of the IR burner 110 of the gas grill 100 has failed. In other examples, the processor circuitry of the controller 128 generates one or more "failed ignition" notification(s) that, when presented, is/are intended to inherently and/or intuitively inform a user of the gas grill 100 that ignition of the IR burner 110 of the gas grill 100 has failed.

Following generation of the "failed ignition" notification(s), the controller 128 of FIG. 1 instructs, commands, signals, and/or otherwise causes such notification(s) to be presented locally and/or remotely. For example, the controller 128 may instruct, command, signal, and/or otherwise cause the user interface 118 of the gas grill 100 of FIG. 1 to locally present (e.g., via one or more of the output device(s) 122 of the user interface 118) one or more of the notification(s) indicating that ignition of the IR burner 110 of the gas grill 100 has failed. As another example, the processor circuitry of the controller 128 may additionally or alternatively instruct, command, signal, and/or otherwise cause the network interface 124 of the gas grill 100 of FIG. 1 to transmit (e.g., via one or more of the communication device(s) 126 of the network interface 124) one or more of the notification(s) indicating that ignition of the IR burner 110 of the gas grill 100 has failed to one or more of the remote device(s) 132 of FIG. 1 for remote presentation via one or more of the output device(s) of the remote device(s) 132.

In some examples, one or more of the "failed ignition" notification(s) associated with the ignition monitoring process implemented via the controller 128 may be presented for a predetermined duration (e.g., a predetermined presentation duration, as may be stored in the memory 130 of the gas grill 100). In other examples, one or more of the "failed ignition" notification(s) associated with the ignition monitoring process implemented via the controller 128 may be presented until a countering event (e.g., detecting ignition of one or more of the ceramic tile(s) of the IR burner 110, or receiving a request, command, and/or instruction to terminate the presentation of the "failed ignition" notification(s)) occurs.

In connection with implementing and/or executing the ignition monitoring process, the controller 128 of FIG. 1 can also determine whether to end (e.g., to terminate or cease executing) the ignition monitoring process. For example, the controller 128 can determine whether the user interface 118 and/or the network interface 124 of the gas grill 100 of FIG. 1 has/have received any commands, instructions, signals, inputs, and/or other data indicative of a request to terminate the ignition monitoring process. In response to determining that the ignition monitoring process is to continue (e.g., that no termination request has been received), the controller 128 continues implementing and/or executing the ignition monitoring process in a looped manner. In response to determining that the ignition monitoring process is to cease or terminate (e.g., that a termination request has been received), the controller 128 terminates and/or stops implementing and/or executing the ignition monitoring process.

The memory 130 of the gas grill 100 of FIG. 1 can be implemented by any type(s) and/or any number(s) of storage device(s) such as an optical storage device, a magnetic storage device, a floppy disk drive, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information). The information and/or data stored in the memory 130 of FIG. 1 can be stored in any file and/or data structure format, organization scheme, and/or arrangement. The memory 130 of FIG. 1 is accessible to one or more of the valve 108, the ignitor 112, the thermal sensor 114, the flame sensor 116, the user interface 118 (e.g., including the input device(s) 120 and the output device(s) 122), the network interface 124 (e.g., including the communication device(s) 126), and/or the controller 128 of the gas grill 100 of FIG. 1.

The memory 130 of the gas grill 100 of FIG. 1 stores data sensed, measured, detected, generated, determined, computed, calculated, identified, presented, input, output, transmitted, and/or received by, to, and/or from the valve 108, the ignitor 112, the thermal sensor 114, the flame sensor 116, the user interface 118 (e.g., including the input device(s) 120 and the output device(s) 122), the network interface 124 (e.g., including the communication device(s) 126), and/or the controller 128 of the gas grill 100. The memory 130 also stores instructions (e.g., computer-readable instructions) and associated data corresponding to one or more ignition monitoring protocol(s), process(es), program(s), sequence(s), subroutine(s), and/or method(s) described below in connection with FIG. 31. The memory 130 can also store correlation data, threshold data, and/or settings data associated with such ignition monitoring protocol(s), process(es), program(s), sequence(s), subroutine(s), and/or method(s).

The remote device(s) 132 of FIG. 1 can be implemented by any type(s) and/or any number(s) of mobile or stationary computing devices. In this regard, examples of such remote device(s) 132 include a smartphone, a tablet, a laptop, a desktop, a cloud server, a wearable computing device, a wireless control hub, etc. The remote device(s) 132 of FIG. 1 facilitate(s) a remote (e.g., wired, or wireless) extension of the above-described user interface 118 of the gas grill 100. In this regard, each remote device 132 includes one or more input device(s) and/or one or more output device(s) that mimic and/or enable a remotely-located version of the above-described functionality of the corresponding input device(s) 120 and/or the corresponding output device(s) 122 of the user interface 118 of the gas grill 100. Accordingly, one or more input(s), selection(s), instruction(s), and/or command(s) received at the gas grill 100 (e.g., via the communication device(s) 126 of the network interface 124 of the gas grill 100) from the remote device(s) 132 can be entered and/or made via the input device(s) of the remote device(s) 132 much in the same way that such input(s), selection(s), instruction(s), and/or command(s) would be entered and/or made via the input device(s) 120 of the user interface 118 of the gas grill 100. Similarly, one or more notification(s), prompt(s), request(s), and/or confirmation(s) transmitted from the gas grill 100 (e.g., via the communication device(s) 126 of the network interface 124 of the gas grill 100) to the remote device(s) 132 can be presented via the output device(s) of the remote device(s) 132 much in the same way that such notification(s), prompt(s), request(s), and/or confirmation(s) would be presented via the output device(s) 122 of the user interface 118 of the gas grill 100.

While an example manner of implementing the gas grill 100 is illustrated in FIG. 1, one or more of the elements, processes, and/or devices illustrated in FIG. 1 may be combined, divided, re-arranged, omitted, eliminated, and/or implemented in any other way. Further, the valve 108, the ignitor 112, the thermal sensor 114, the flame sensor 116, the user interface 118 (e.g., including the input device(s) 120 and the output device(s) 122), the network interface 124 (e.g., including the communication device(s) 126), the controller 128, the memory 130, and/or, more generally, the gas grill 100 of FIG. 1, may be implemented by hardware alone or by hardware in combination with software and/or firmware. Thus, for example, any of the valve 108, the ignitor 112, the thermal sensor 114, the flame sensor 116, the user interface 118 (e.g., including the input device(s) 120 and the output device(s) 122), the network interface 124 (e.g., including the communication device(s) 126), the controller 128, the memory 130, and/or, more generally, the gas grill 100 of FIG. 1 could be implemented at least in part by processor circuitry including any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s).

Further still, the gas grill 100 of FIG. 1 may include one or more element(s), component(s), and/or device(s) in addition to, or instead of, those illustrated in FIG. 1, and/or may include more than one of any or all of the illustrated element(s), component(s), and/or device(s). For example, the gas grill 100 of FIG. 1 can include multiple instances of the above-described IR burner 110, as well as corresponding multiple instances of the above-described valve 108, the above-described ignitor 112, the above described thermal sensor 114, and/or the above-described flame sensor 116. As another example, in addition to the above-described IR burner 110, the gas grill 100 can further include any types(s) and/or any number(s) of standard and/or conventional burner(s) (e.g., burner tube(s)) that is/are operatively coupled to the manifold 106 via any type(s) and/or any number(s) of valve(s) (e.g., manually-operated valve(s), solenoid valve(s), etc.) to facilitate a flow of pressurized combustible gas from the manifold 106 toward and/or into such burner(s).

Figure 2:
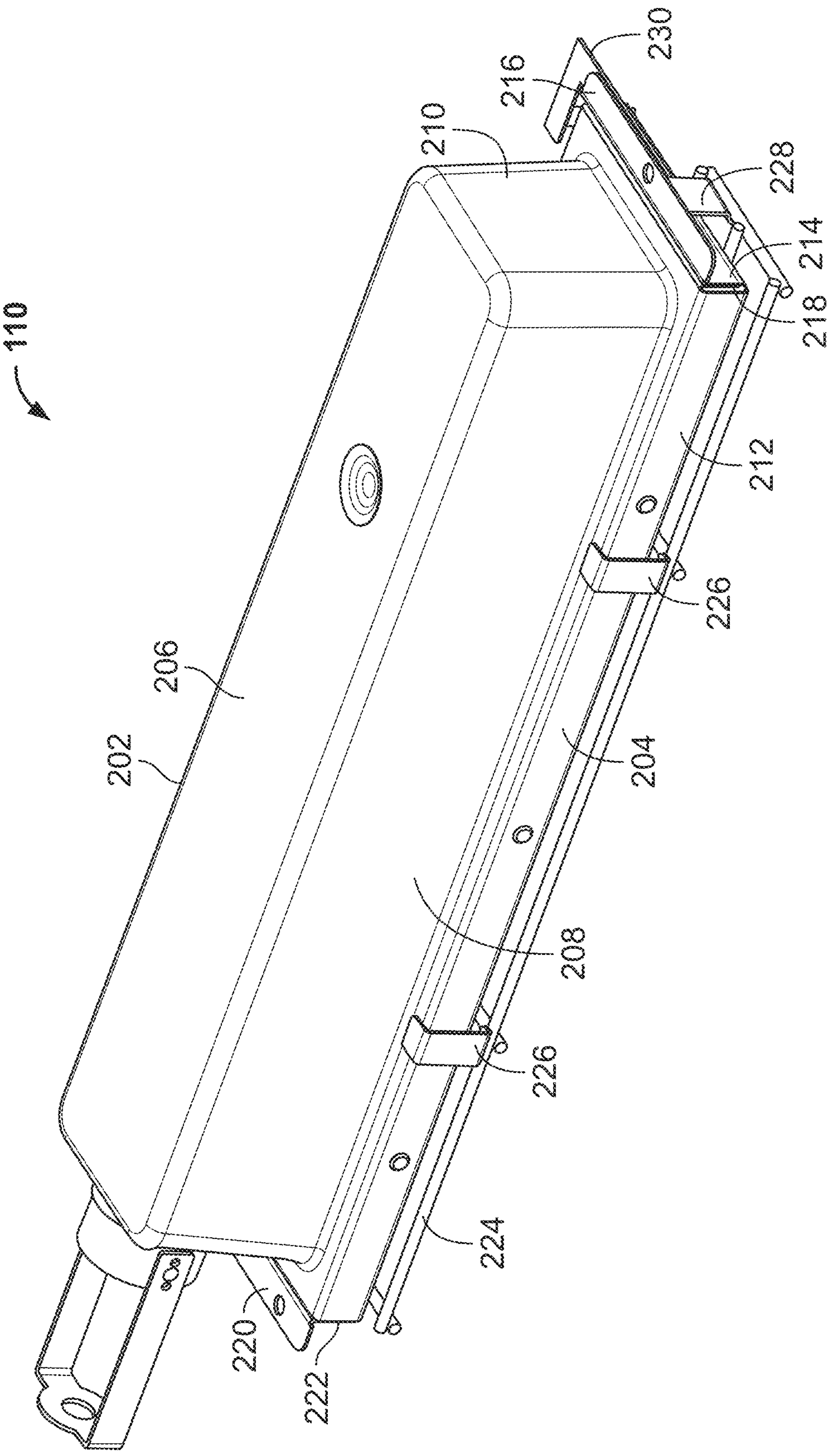
FIG. 2 is a first perspective view of an example implementation of the IR burner of the gas grill of FIG. 1.
Figure 3:
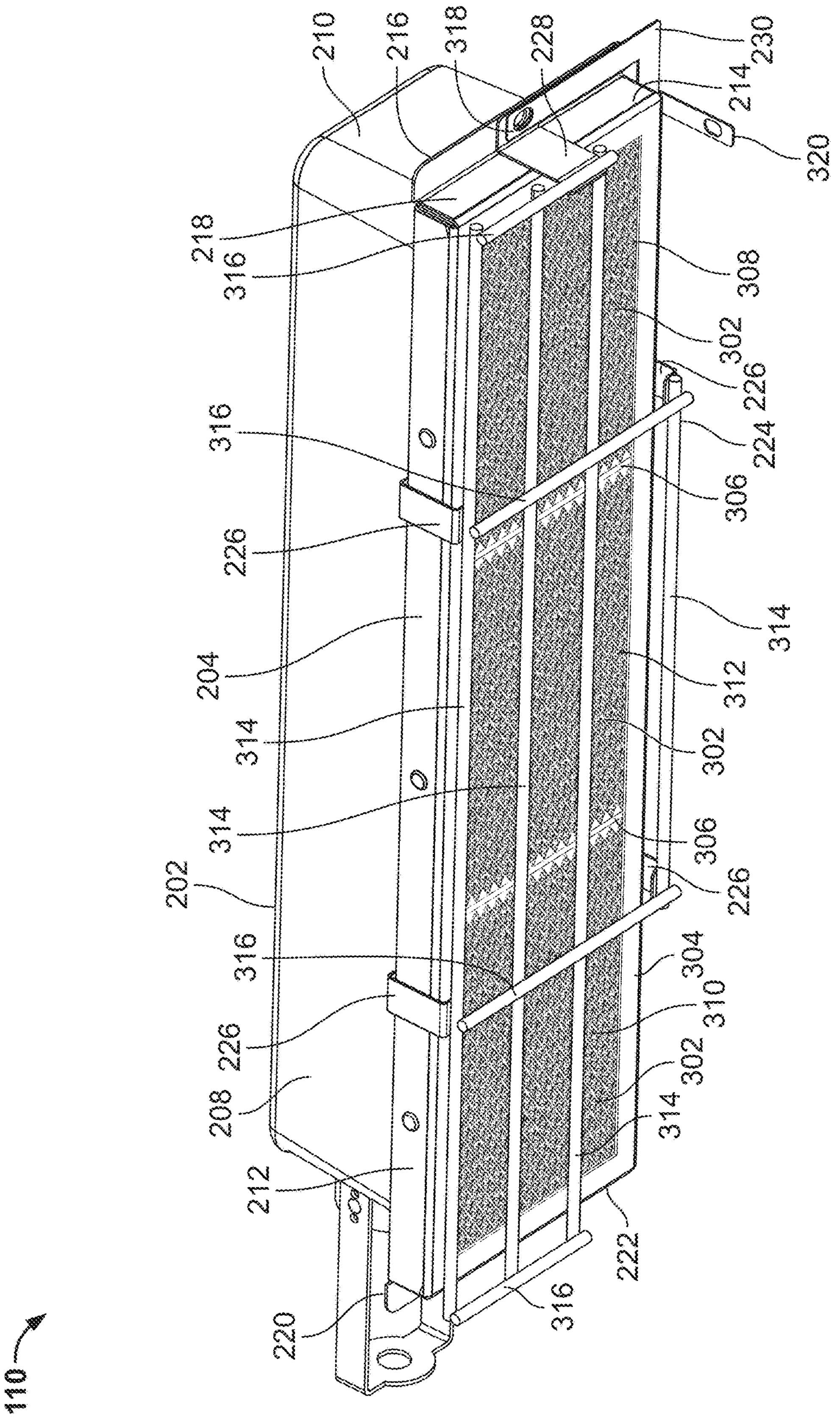
FIG. 3 is a second perspective view of the IR burner as shown in FIG. 2.
Figure 4:
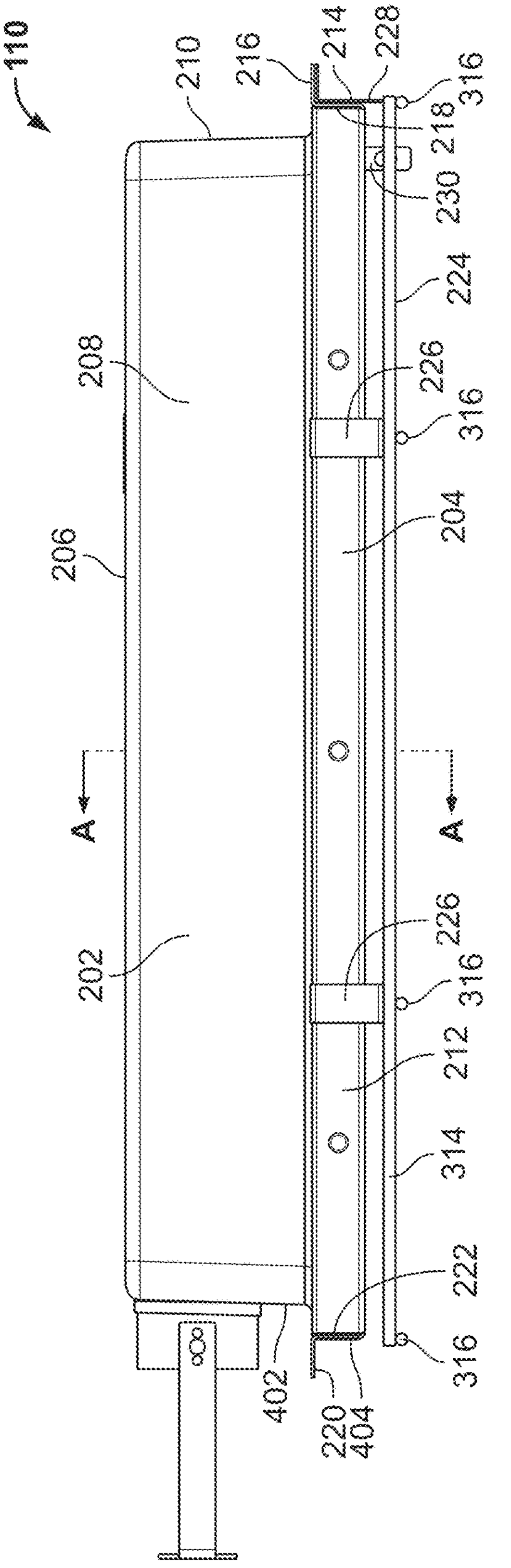
FIG. 4 is a front view of the IR burner as shown in FIGS. 2 and 3.
Figure 5:
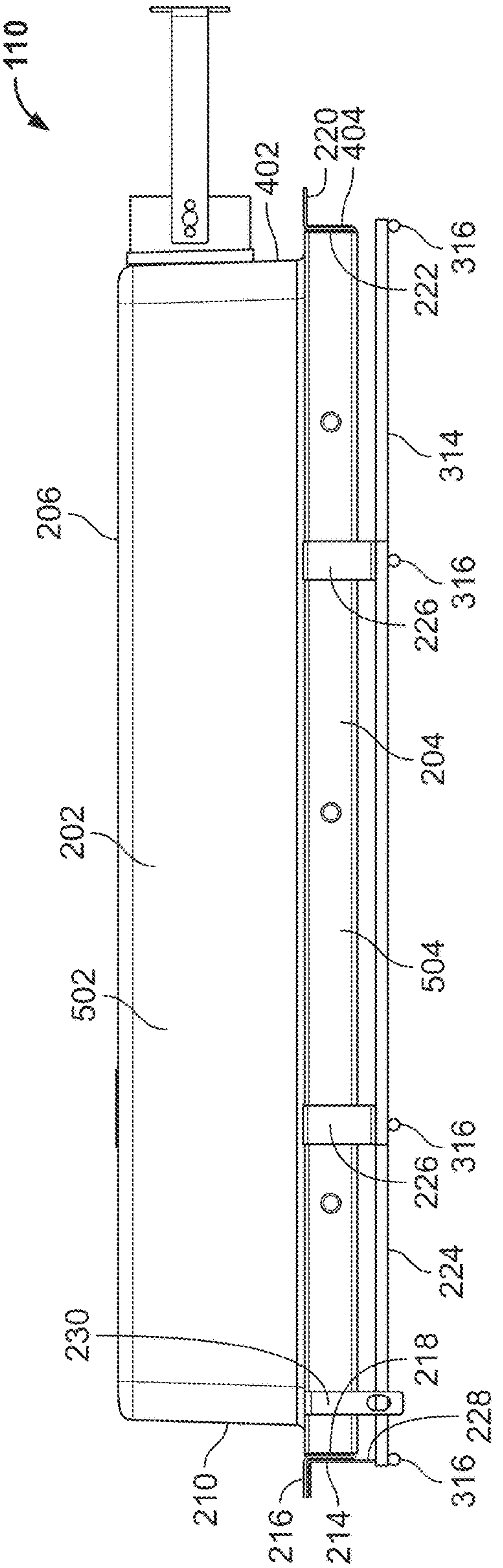
FIG. 5 is a rear view of the IR burner as shown in FIGS. 2-4.
Figure 6:
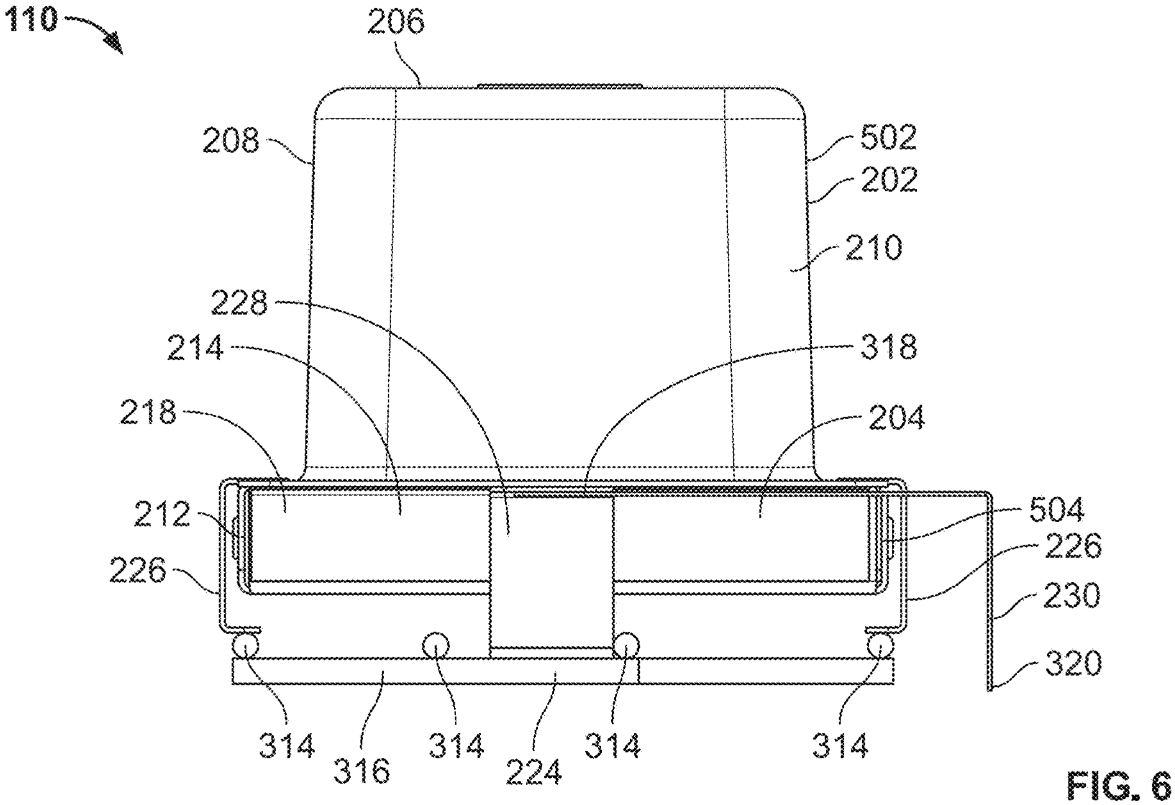
FIG. 6 is a right side view of the IR burner as shown in FIGS. 2-5.
Figure 7:
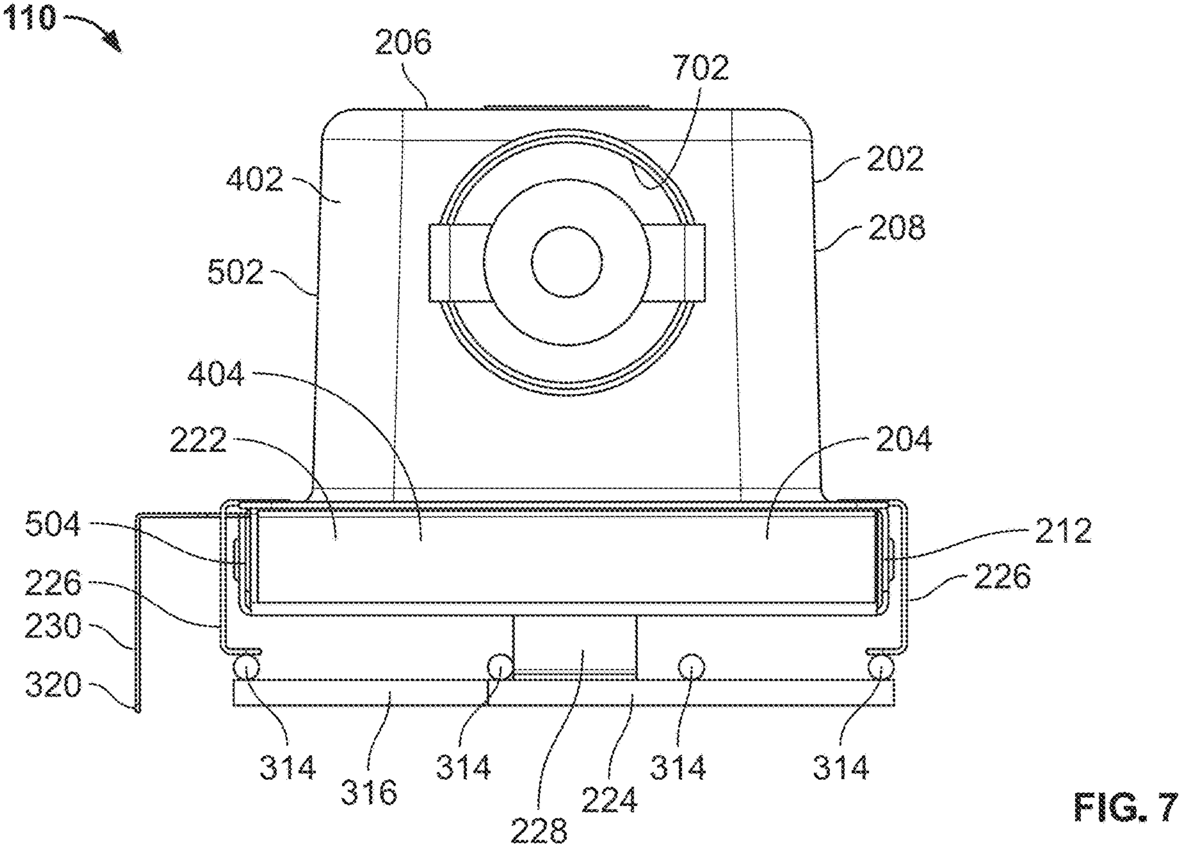
FIG. 7 is a left side view of the IR burner as shown in FIGS. 2-6.
Figure 8:
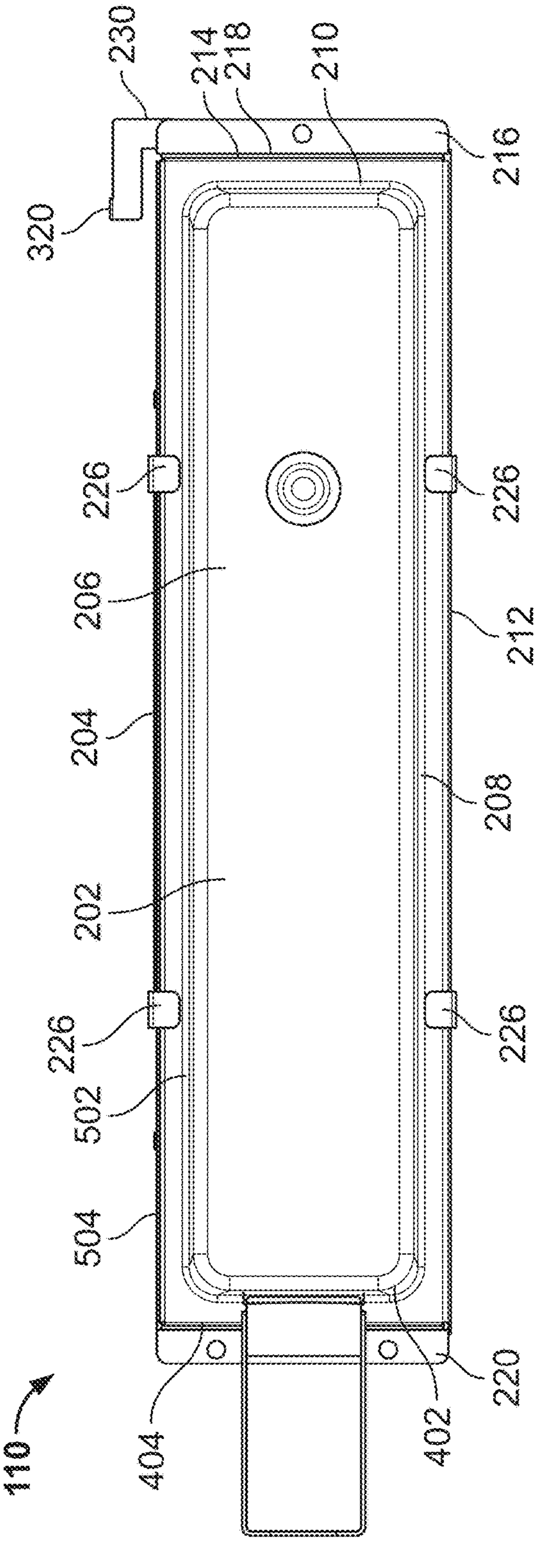
FIG. 8 is a top view of the IR burner as shown in FIGS. 2-7.
Figure 9:
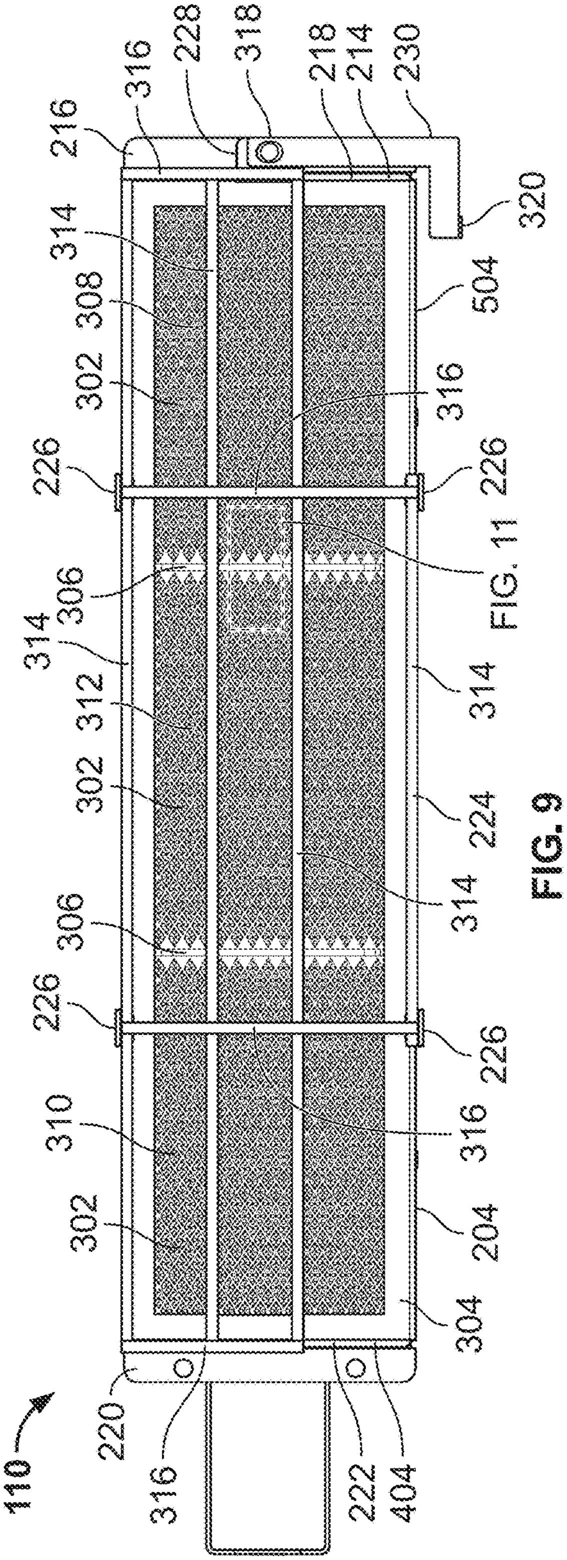
FIG. 9 is a bottom view of the IR burner as shown in FIGS. 2-8.
Figure 10:
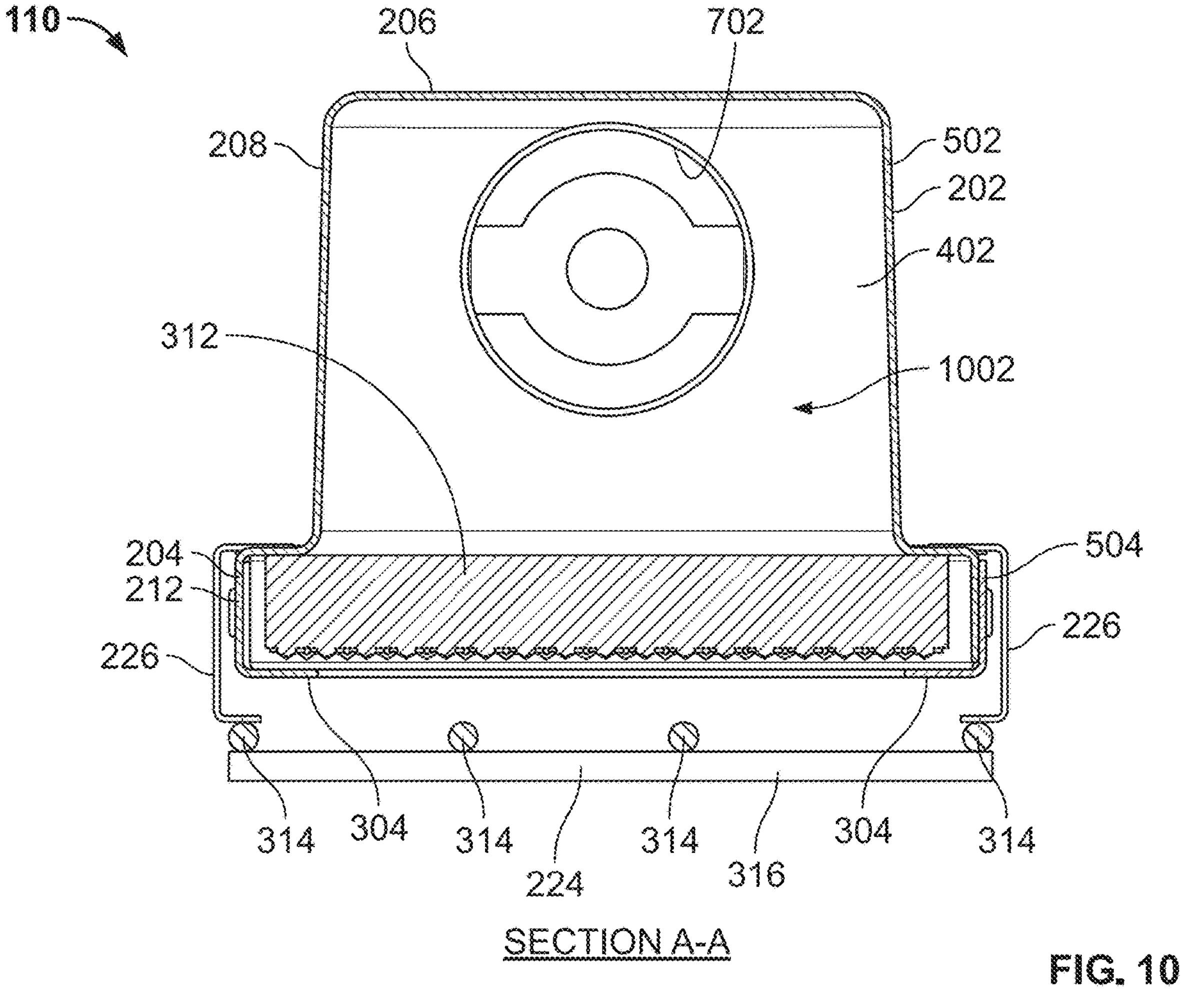
FIG. 10 is a cross-sectional view of the IR burner as shown in FIGS. 2-9, taken along section A-A of FIG. 4.

FIG. 2 is a first perspective view of an example implementation of the IR burner 110 of the gas grill 100 of FIG. 1. FIG. 3 is a second perspective view of the IR burner 110 as shown in FIG. 2. FIG. 4 is a front view of the IR burner 110 as shown in FIGS. 2 and 3. FIG. 5 is a rear view of the IR burner 110 as shown in FIGS. 2-4. FIG. 6 is a right side view of the IR burner 110 as shown in FIGS. 2-5. FIG. 7 is a left side view of the IR burner 110 as shown in FIGS. 2-6. FIG. 8 is a top view of the IR burner 110 as shown in FIGS. 2-7. FIG. 9 is a bottom view of the IR burner 110 as shown in FIGS. 2-8. FIG. 10 is a cross-sectional view of the IR burner 110 as shown in FIGS. 2-9, taken along section A-A of FIG. 4.

In the illustrated example of FIGS. 2-10, the IR burner 110 includes an example housing 202, an example frame 204, and a plurality of example ceramic tiles 302. The housing 202 of the IR burner 110 includes an example top wall 206, an example front wall 208, an example rear wall

502, an example right sidewall 210, and an example left sidewall 402. The front wall 208 of the housing 202 extends downwardly from the top wall 206 of the housing 202. The rear wall 502 of the housing 202 extends downwardly from the top wall 206 of the housing 202, with the rear wall 502 being located opposite and spaced apart from the front wall 208 of the housing 202.

The right sidewall 210 of the housing 202 extends downwardly from the top wall 206 of the housing 202, with the right sidewall 210 extending between the front wall 208 and the rear wall 502 of the housing 202. The left sidewall 402 of the housing 202 extends downwardly from the top wall 206 of the housing 202, with the left sidewall 402 extending between the front wall 208 and the rear wall 502 of the housing 202, and with the left sidewall 402 being located opposite and spaced apart from the right sidewall 210 of the housing 202.

The housing 202 of the IR burner 110 of FIGS. 2-10 further includes and/or defines an example combustion chamber 1002 that is bound (e.g., bound on five sides) by the top wall 206, the front wall 208, the rear wall 502, the right sidewall 210, and the left sidewall 402 of the housing 202. The combustion chamber 1002 of the housing 202 is configured to receive combustible gas via an example inlet 702 (e.g., an opening) formed in the housing 202. In this regard, the inlet 702 of the housing 202 is in fluid communication with the manifold 106 and/or the valve 108 of the gas grill 100 of FIG. 1 via one or more conduit(s) of the gas train 134 that extend(s) from the manifold 106 and/or the valve 108 to an area located proximate the inlet 702. In the illustrated example of FIGS. 2-10, the inlet 702 is formed in the left sidewall 402 of the housing 202. In other examples, the inlet 702 can instead be formed in a portion of the housing 202 other than the left sidewall 402 (e.g., the top wall 206, the front wall 208, the right sidewall 210, etc.).

The frame 204 of the IR burner 110 of FIGS. 2-10 is coupled (e.g., via one or more fastener(s)) to the housing 202 of the IR burner 110. The frame 204 is configured to support, carry, and/or hold the ceramic tiles 302 of the IR burner 110 in a downwardly-facing orientation, as further described herein. In the illustrated example of FIGS. 2-10, the frame 204 includes an example front wall 212, an example rear wall 504, an example right sidewall 214, and an example left sidewall 404. The front wall 212 of the frame 204 is located adjacent to (e.g., in a face-to-face relationship with) a bottom portion of the front wall 208 of the housing 202. The rear wall 504 of the frame 204 is located opposite and spaced apart from the front wall 212 of the frame 204, with the rear wall 504 of the frame 204 being located adjacent to (e.g., in a face-to-face relationship with) a bottom portion of the rear wall 502 of the housing 202. The right sidewall 214 of the frame 204 extends between the front wall 212 and the rear wall 504 of the frame 204, with the right sidewall 214 of the frame 204 being located adjacent to (e.g., in a face-to-face relationship with) a bottom portion of the right sidewall 210 of the housing 202. The left sidewall 404 of the frame 204 extends between the front wall 212 and the rear wall 504 of the frame 204, with the left sidewall 404 being located opposite and spaced apart from the right sidewall 214 of the frame 204, and with the left sidewall 404 of the frame 204 being located adjacent to (e.g., in a face-to-face relationship with) a bottom portion of the left sidewall 402 of the housing 202. In the illustrated example of FIGS. 2-10, the front wall 212, the rear wall 504, the right sidewall 214, and the left sidewall 404 of the frame 204 are collectively configured to circumscribe the front wall 208, the rear wall 502, the right sidewall 210, and the left sidewall 402 of the housing 202.

The frame 204 of the IR burner of FIGS. 2-10 further includes an example support flange 304, one or more portion(s) of which extend(s) inwardly from the front wall 212, the rear wall 504, the right sidewall 214, and/or the left sidewall 404 of the frame 204. For example, as shown in FIGS. 2-10, a first portion of the support flange 304 extends inwardly from the front wall 212 of the frame 204, a second portion of the support flange 304 extends inwardly from the rear wall 504 of the frame 204, a third portion of the support flange 304 extends inwardly from the right sidewall 214 of the frame 204, and a fourth portion of the support flange 304 extends inwardly from the left sidewall 404 of the frame 204. The support flange 304 of the frame 204 is configured to support, carry, and/or hold the ceramic tiles 302 of the IR burner 110 in a downwardly-facing orientation wherein respective ones of the ceramic tiles are positioned in an end-to-end arrangement relative to one another such that the ceramic tiles 302 collectively bound, cap, cover, and/or extend across a lower portion of the combustion chamber 1002 of the housing 202, as further described herein.

The frame 204 of the IR burner 110 of FIGS. 2-10 further includes one or more mounting flange(s) configured to couple and/or mount the IR burner 110 to a shroud of an IR burner assembly. In the illustrated example of FIGS. 2-10, the frame 204 includes an example first mounting flange 216 located at an example first end 218 of the frame 204, and an example second mounting flange 220 located at an example second end 222 of the frame 204 opposite the first end 218 of the frame 204. The first mounting flange 216 of the frame 204 extends outwardly relative to the right sidewall 214 of the frame 204 (e.g., to the right of the right sidewall 214), and the second mounting flange 220 of the frame 204 extends outwardly relative to the left sidewall 404 of the frame 204 (e.g., to the left of the left sidewall 404). In other examples, the frame 204 can additionally or alternatively include one or more mounting flange(s) located along the front portion and/or the rear portion of the IR burner 110. For example, the frame 204 can include a mounting flange that extends outwardly relative to the front wall 212 of the frame 204 (e.g., to the front of the front wall 212), and/or a mounting flange that extends outwardly relative to the rear wall 504 of the frame 204 (e.g., to the rear of the rear wall 504). In the illustrated example of FIGS. 2-10, the first mounting flange 216 and the second mounting flange 220 of the frame 204 each include one or more opening(s) configured to receive a corresponding one or more fastener(s) for the purpose of coupling the frame 204 and/or, more generally, coupling the IR burner 110 to a shroud of an IR burner assembly, as further described herein.

Figure 11:
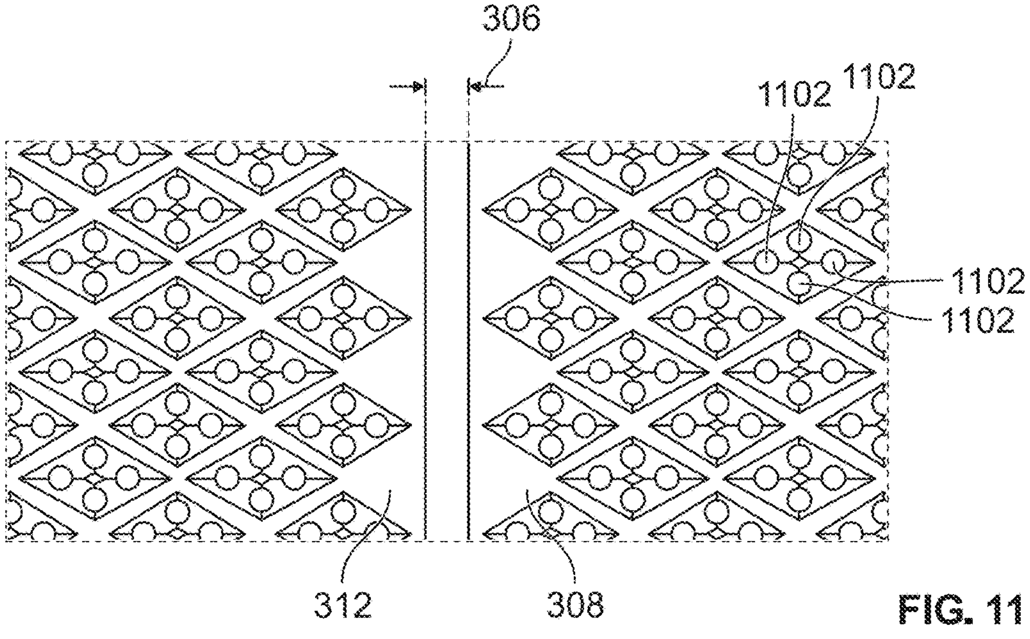
FIG. 11 is an enlarged view of a portion of FIG. 9.

The ceramic tiles 302 of the IR burner 110 of FIGS. 2-10 are disposed between the housing 202 and the frame 204 of the IR burner 110, with each of the ceramic tiles 302 being positioned in a downwardly facing orientation, and with each of the ceramic tiles 302 being configured in an end-to-end arrangement relative to other ones of the ceramic tiles 302. Each one of the ceramic tiles 302 includes a plurality of apertures (e.g., apertures 1102 as shown in FIG. 11) extending through the thickness dimension (e.g., from the bottom face to the top face) of the ceramic tile 302. The apertures are configured to enable gas located within the combustion chamber 1002 of the housing 202 of the IR burner 110 to pass and/or flow from the combustion chamber 1002 through the apertures of the ceramic tiles 302, and toward and/or into an area and/or space located immediately below the ceramic tiles 302 and/or immediately below the frame 204 of the IR burner 110. As shown in FIGS. 3 and 9 and more closely shown in FIG. 11, which is an enlarged view of a portion of FIG. 9, neighboring ones of the ceramic tiles 302 are spaced apart from one another by an example gap 306. In some examples, the gap 306 separating neighboring ones of the ceramic tiles 302 of the IR burner 110 preferably measures ten millimeters or less. For example, as shown in FIGS. 3, 9, and 11, the gap 306 separating neighboring ones of the ceramic tiles 302 of the IR burner 110 measures approximately seven millimeters.

In the illustrated example of FIGS. 2-10, the IR burner 110 includes a total of three ceramic tiles 302. More specifically, the IR burner 110 of FIGS. 2-10 includes an example first ceramic tile 308 located at the first end 218 of the frame 204, an example second ceramic tile 310 located at the second end 222 of the frame 204, and an example third ceramic tile 312 located between the first ceramic tile 308 and the second ceramic tile 310. The first ceramic tile 308, the second ceramic tile 310, and the third ceramic tile 312 are configured in an end-to-end arrangement that bounds, caps, covers, and/or extends across a lower portion of the combustion chamber 1002 of the housing 202. In other examples, the IR burner 110 can instead include a different number (e.g., one, two, four, five, etc.) of ceramic tiles 302 configured in an end-to-end arrangement that bounds, caps, covers, and/or extends across a lower portion of the combustion chamber 1002 of the housing 202.

In the illustrated example of FIGS. 2-10, each one of the first ceramic tile 308, the second ceramic tile 310, and the third ceramic tile 312 is oriented downwardly (e.g., facing downward and away from the housing 202 of the IR burner 110) such that one or more portion(s) of the bottom surface (e.g., one or more portion(s) of the bottom face) of the respective ceramic tile is/are seated on and/or supported by the support flange 304 of the frame 204 of the IR burner 110. For example, as shown in FIGS. 3 and 9, portions of the bottom surface (e.g., first, second, and third edge portions of the bottom face) of the first ceramic tile 308 are seated on and/or supported by corresponding portions of the support flange 304 of the frame 204 located proximate the front wall 212, the rear wall 504, and the right sidewall 214 of the frame 204. Similarly, portions of the bottom surface (e.g., first, second, and third edge portions of the bottom face) of the second ceramic tile 310 are seated on and/or supported by corresponding portions of the support flange 304 of the frame 204 located proximate the front wall 212, the rear wall 504, and the left sidewall 404 of the frame 204. Finally, portions of the bottom surface (e.g., first and second edge portions of the bottom face) of the third ceramic tile 312 are seated on and/or supported by corresponding portions of the support flange 304 of the frame 204 located proximate the front wall 212 and the rear wall 504 of the frame 204.

The IR burner 110 of FIGS. 2-10 further includes an example guard 224 configured to protect the bottom surface (e.g., the bottom face) of each of the ceramic tiles 302. The guard 224 of the IR burner 110 includes a plurality of example first rods 314 and a plurality of example second rods 316. Respective ones of the first rods 314 are oriented parallel to and spaced apart from one another, and are located below and spaced apart from each one of the downwardly facing ceramic tiles 302. Similarly, respective ones of the second rods 316 are oriented parallel to and spaced apart from one another, and are located below and spaced apart from each one of the downwardly facing ceramic tiles 302. In the illustrated example of FIGS. 2-10, the respective ones of the second rods 316 are oriented orthogonally relative to the respective ones of the first rods 314. In other examples, the respective ones of the second rods 316 can instead be oriented at a non-parallel and non-orthogonal angle (e.g., forty-five degrees) relative to the respective ones of the first rods 314. In the illustrated example of FIGS. 2-10, the guard 224 includes a total of four first rods 314 and a total of four second rods 316. In other examples, the guard 224 can instead include a different number (e.g., 2, 3, 6, 8, 10, etc.) of first rods 314, and/or a different number (e.g., 2, 3, 6, 8, 10) of second rods 316. As shown in FIGS. 2-10, the respective ones of the first rods 314 and the respective ones of the second rods 316 collectively form a lattice (e.g., a grid) configured to prevent objects (e.g., cooking tools, utensils, cookware, human hands, etc.) from coming into contact with the bottom surface (e.g., the bottom face) of each one of the downwardly facing ceramic tiles 302 of the IR burner 110.

The guard 224 of the IR burner 110 further includes a plurality of example clips 226 configured to couple the guard 224 to the frame 204 of the IR burner 110 such that the first rods 314 and the second rods 316 of the guard 224 are located below and spaced apart from (e.g., suspended from) the frame 204, and/or such that the first rods 314 and the second rods 316 of the guard 224 are located below and spaced apart from the bottom surface (e.g., the bottom face) of each one of the downwardly facing ceramic tiles 302 of the IR burner 110. In the illustrated example of FIGS. 2-10, the guard 224 includes a total of four clips 226, with two of the four clips 226 being located along a front portion of the guard 224, and the other two of the four clips 226 being located along a rear portion of the guard 224. More specifically, two of the four clips 226 are coupled to an extend upwardly from a front one of the first rods 314 of the guard 224, with such clips 226 being configured to interface with and/or otherwise engage the front wall 212 of the frame 204. The other two of the four clips 226 are coupled to and extend upwardly from a rear one of the first rods 314 of the guard 224, with such clips 226 being configured to interface with and/or otherwise engage the rear wall 504 of the frame 204. This arrangement advantageously enables the clips 226 and/or, more generally, the guard 224 to be slidingly coupled to and/or slidingly removed from the frame 204 of the IR burner 110 by sliding the clips 226 of the guard 224 onto and/or off of the front wall 212 and the rear wall 504 of the frame 204 from the first end 218 of the frame 204.

The guard 224 of the IR burner 110 further includes an example mounting bracket 228 configured to further couple the guard 224 to the frame 204 of the IR burner 110. In the illustrated example of FIGS. 2-10, the mounting bracket 228 is coupled to and extends upwardly from a rightmost one of the second rods 316 of the guard 224, with the mounting bracket 228 being configured to interface and/or otherwise engage the first mounting flange 216 located at the first end 218 of the frame 204. In this regard, the mounting bracket 228 of the guard 224 includes an opening configured to be coaxially aligned with an opening formed in the first mounting flange 216 of the frame 204 such that a single fastener can extend through both openings to couple the guard 224 to the frame 204, and/or to couple both the guard 224 and the frame 204 to a shroud of an IR burner assembly, as further described herein. In other examples, the mounting bracket 228 can instead be coupled to and extend upwardly from a leftmost one of the second rods 316 of the guard 224, with the mounting bracket 228 being configured to interface and/or otherwise engage the second mounting flange 220 located at the second end 222 of the frame 204.

The IR burner 110 of FIGS. 2-10 is further configured to support and/or to be coupled to an example grounding bracket 230. In the illustrated example of FIGS. 2-10, the grounding bracket 230 includes an example first end 318 and an example second end 320. The first end 318 of the grounding bracket 230 is configured to be coupled to the mounting bracket 228 of the guard 224 and/or to the first mounting flange 216 of the frame 204. In this regard, the first end 318 of the grounding bracket 230 includes an opening configured to be coaxially aligned with an opening formed in the mounting bracket 228 of the guard 224 and/or with an opening formed in the first mounting flange 216 of the frame 204 such that a single fastener can extend through such openings to couple the grounding bracket 230 to the mounting bracket 228 of the guard 224, to couple the grounding bracket 230 to the first mounting flange 216 of the frame 204, and/or to couple each of the grounding bracket 230, the mounting bracket 228 of the guard 2224, and the first mounting flange 216 of the frame 204 to a shroud of an IR burner assembly, as further described herein. In other examples, the grounding bracket 230 can instead be configured to be coupled to another portion of the frame 204 (e.g., to the second mounting flange 220 located at the second end 222 of the frame 204). The second end of the grounding bracket 230 is configured to be coupled to a component housing that carries, supports, houses, and/or otherwise contains at least a portion of the ignitor 112 of the gas grill 100, as further described herein.

Figure 12:
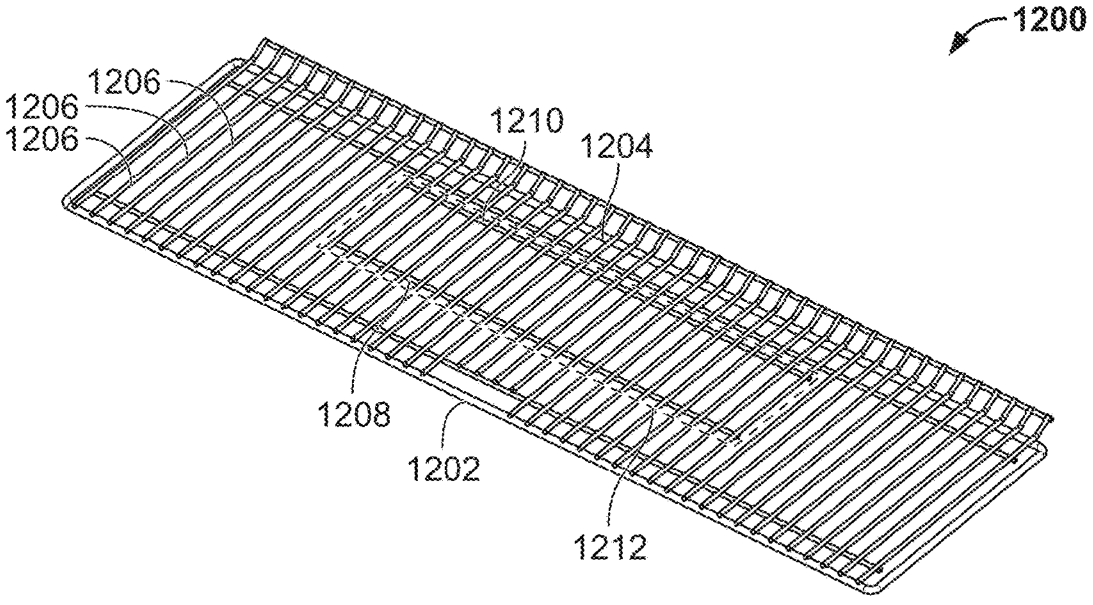
FIG. 12 is a first perspective view of an example cooking grate to be used in connection with the IR burner as shown in FIGS. 2-10.
Figure 13:
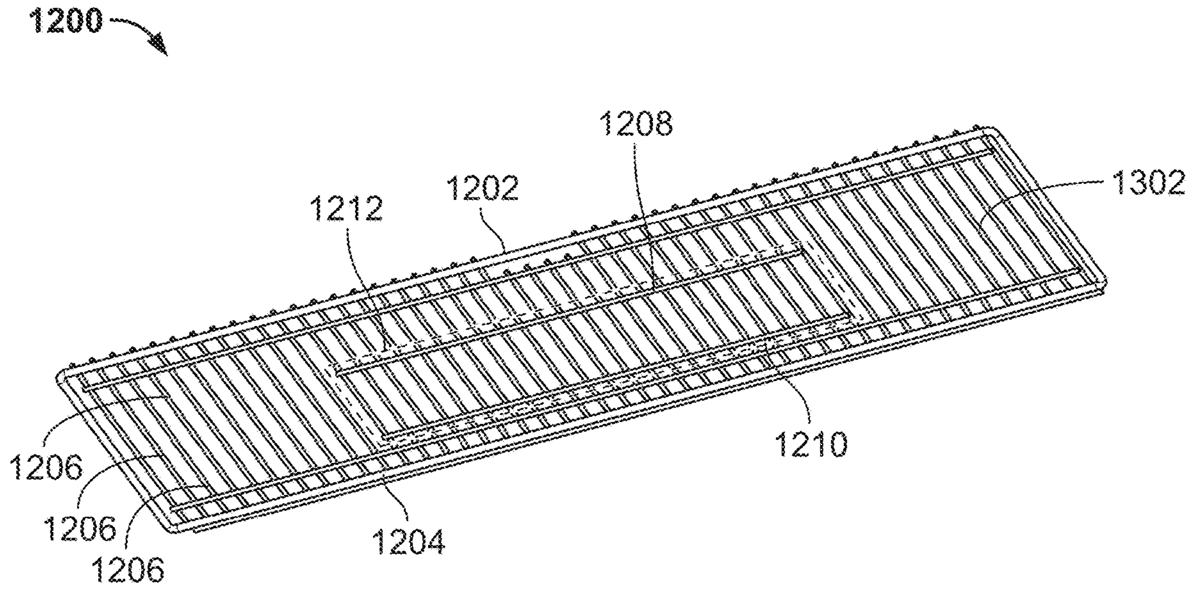
FIG. 13 is a second perspective view of the cooking grate of FIG. 12.
Figure 14:
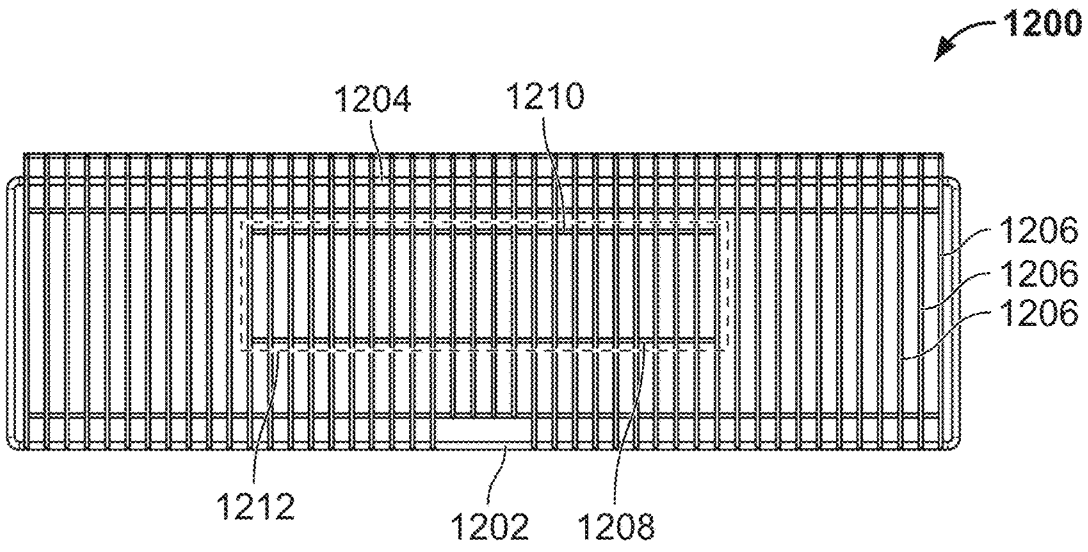
FIG. 14 is a top view of the cooking grate of FIGS. 12 and 13.
Figure 15:
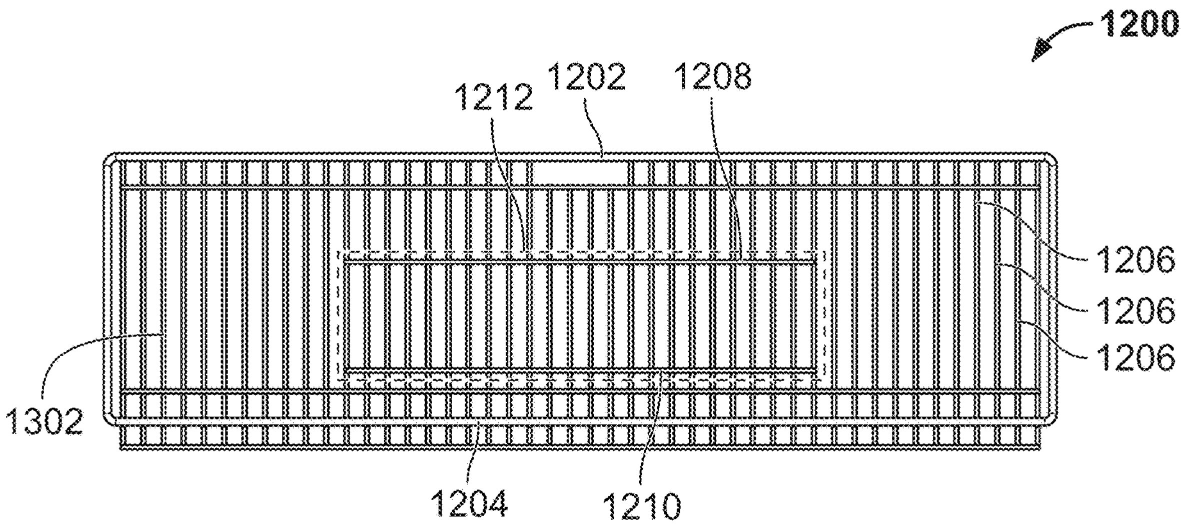
FIG. 15 is a bottom view of the cooking grate of FIGS. 12-14.

FIG. 12 is a first perspective view of an example cooking grate 1200 to be used in connection with the IR burner 110 as shown in FIGS. 2-10. FIG. 13 is a second perspective view of the cooking grate 1200 of FIG. 12. FIG. 14 is a top view of the cooking grate 1200 of FIGS. 12 and 13. FIG. 15 is a bottom view of the cooking grate 1200 of FIGS. 12-14. The cooking grate 1200 of FIGS. 12-15 is configured to be located below the IR burner 110 of FIGS. 2-10, with the cooking grate 1200 being supported by one of a plurality of pairs of opposing grate supports coupled to and/or integrally formed by opposing sidewalls of a shroud of an IR burner assembly, as further described herein.

In the illustrated example of FIGS. 12-15, the cooking grate 1200 includes an example front support rod 1202, an example rear support rod 1204, a plurality of example laterally spaced support rods 1206, an example first indicator rod 1208, and an example second indicator rod 1210. The rear support rod 1204 of the cooking grate 1200 is arranged parallel to and spaced apart from the front support rod 1202 of the cooking grate 1200. Respective ones of the laterally spaced support rods 1206 of the cooking grate 1200 are arranged perpendicular to and extend between the front support rod 1202 and the rear support rod 1204 of the cooking grate 1200. The first indicator rod 1208 of the cooking grate 1200 is welded to an example underside 1302 of one or more of the laterally spaced support rods 1206 of the cooking grate 1200. The second indicator rod 1210 of the cooking grate 1200 is also welded to the underside 1302 of one or more of the laterally spaced support rods 1206 of the cooking grate 1200, with the second indicator rod 1210 being located rearward of the first indicator rod 1208. In the illustrated example of FIGS. 12-15, the first indicator rod 1208 of the cooking grate 1200 is arranged parallel to and located rearward of the front support rod 1202 of the cooking grate 1200, and the second indicator rod 1210 of the cooking grate 1200 is arranged parallel to and located forward of the rear support rod 1204 of the cooking grate 1200. The first indicator rod 1208 and the second indicator rod 1210 of the cooking grate 1200 collectively indicate and/or demarcate an example optimal food placement area 1212 associated with a projection of heat generated by the IR burner 110. Indication and/or demarcation of the optimal food placement area 1212 via the first indicator rod 1208 and the second indicator rod 1210 of the cooking grate 1200 advantageously provides a user of the gas grill 100 of FIG. 1 with a clear visual indication as to the preferred area for food placement on the cooking grate 1200 to best obtain the enhanced heating and/or cooking capabilities (e.g., high-heat searing capabilities) provided by the IR burner 110 of FIGS. 2-10.

In the illustrated example of FIGS. 12-15, the cooking grate 1200 is configured such that the first indicator rod 1208 of the cooking grate 1200 has a length that is less than a length of the front support rod 1202 of the cooking grate 1200, and such that the second indicator rod 1210 of the cooking grate 1200 has a length that is less than a length of the rear support rod 1204 of the cooking grate 1200. The cooking grate 1200 of FIGS. 12-15 is further configured such that the length of the first indicator rod 1208 of the cooking grate 1200 is greater than or equal to a length of the end-to-end arrangement of the plurality of downwardly facing ceramic tiles 302 of the above-described IR burner 110 of FIGS. 2-10. The cooking grate 1200 of FIGS. 12-15 is further configured such that the second indicator rod 1210 of the cooking grate 1200 is spaced apart from the first indicator rod 1208 of the cooking grate 1200 by a distance that is greater than or equal to a width of the end-to-end arrangement of the plurality of downwardly facing ceramic tiles 302 of the above-described IR burner 110 of FIGS. 2-10. The optimal food placement area indicated and/or demarcated by the first indicator rod 1208 and the second indicator rod 1210 of the cooking grate 1200 is accordingly greater than or equal to an area defined by the length and the width of the end-to-end arrangement of the plurality of downwardly facing ceramic tiles 302 of the above-described IR burner 110 of FIGS. 2-10.

Figure 16:
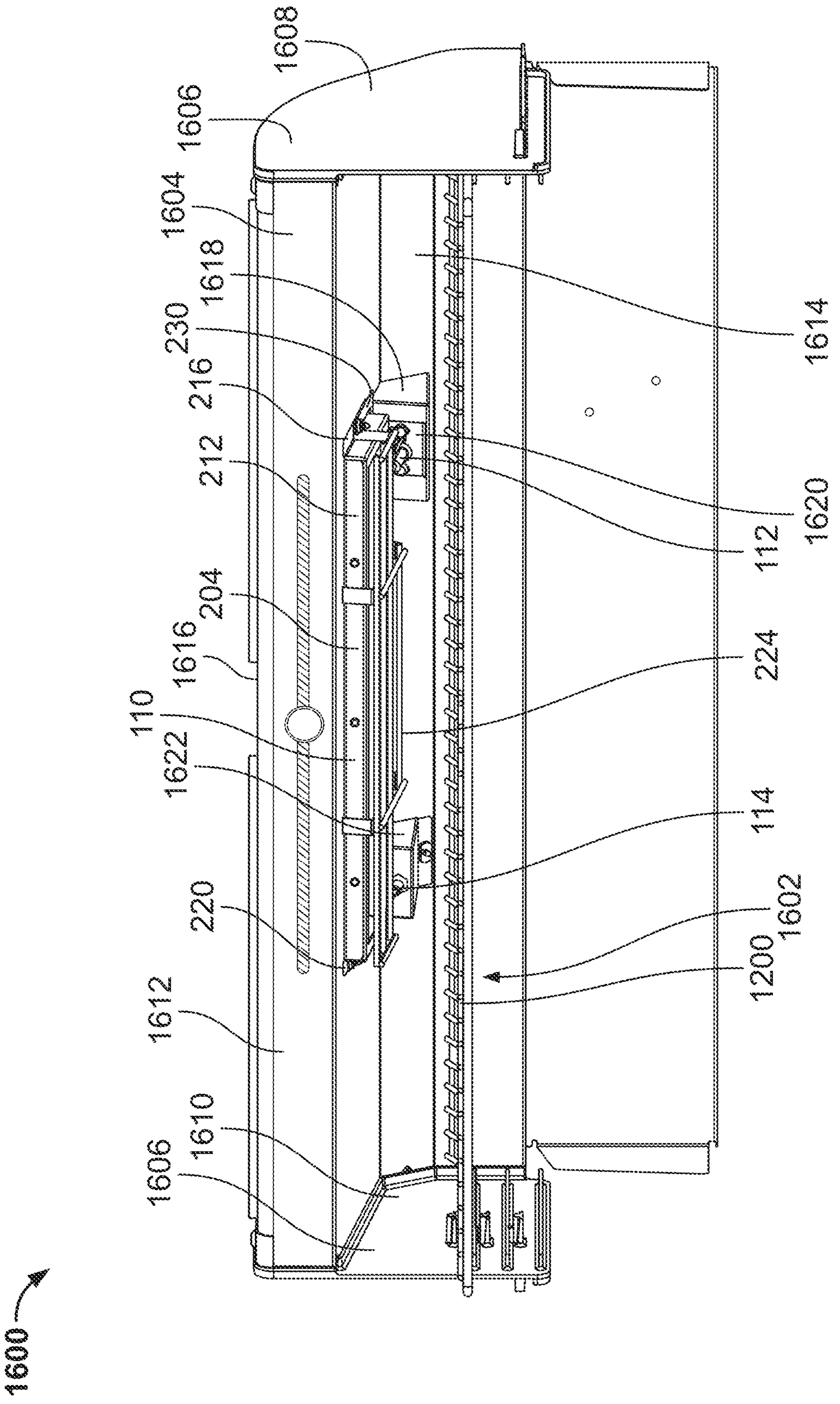
FIG. 16 is a perspective view of an example IR burner assembly including the IR burner as shown in FIGS. 2-10 and the cooking grate as shown in FIGS. 12-15, with the cooking grate located at an example first position below the IR burner.
Figure 17:
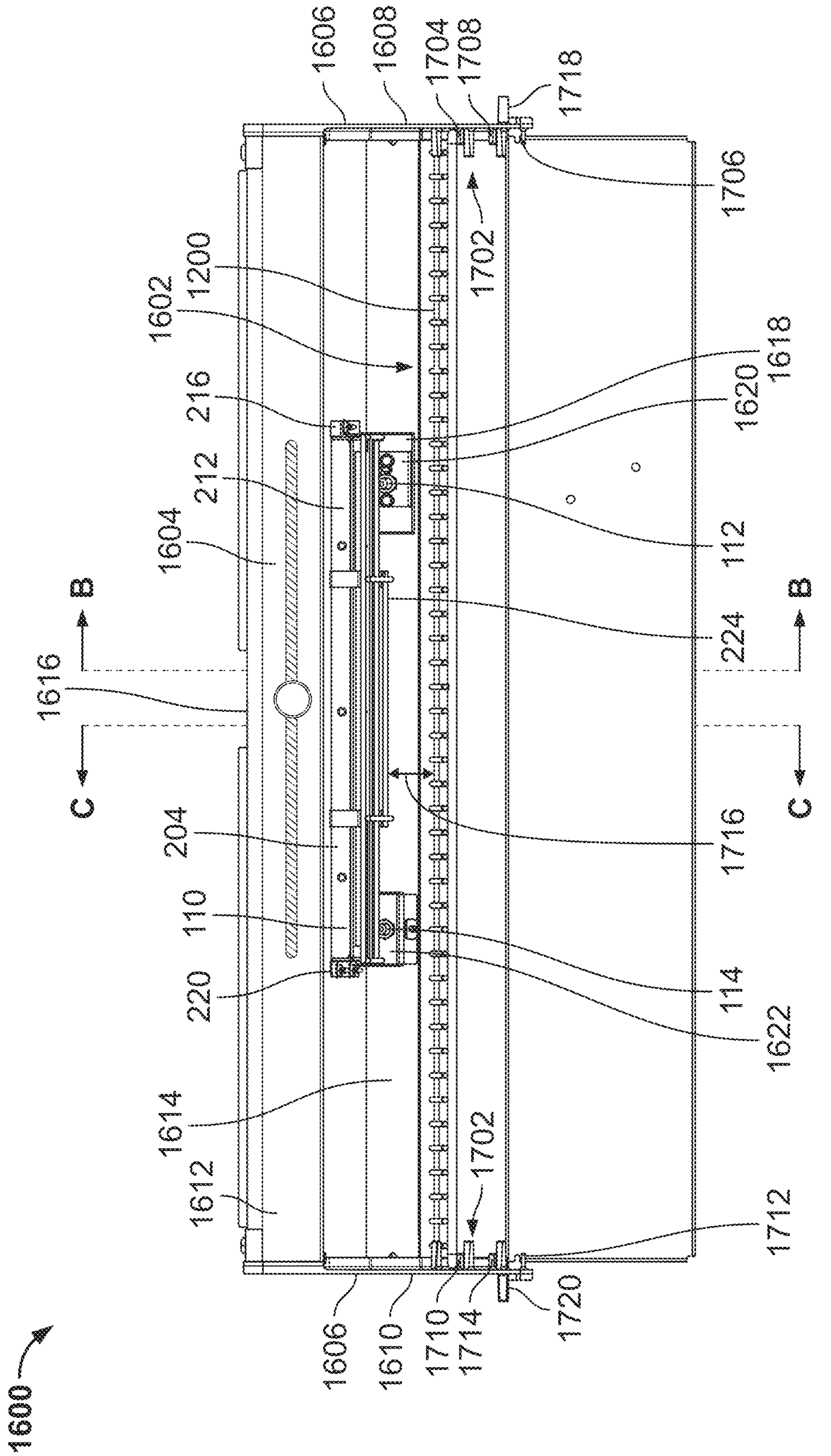
FIG. 17 is a front view of the IR burner assembly as shown in FIG. 16.
Figure 18:
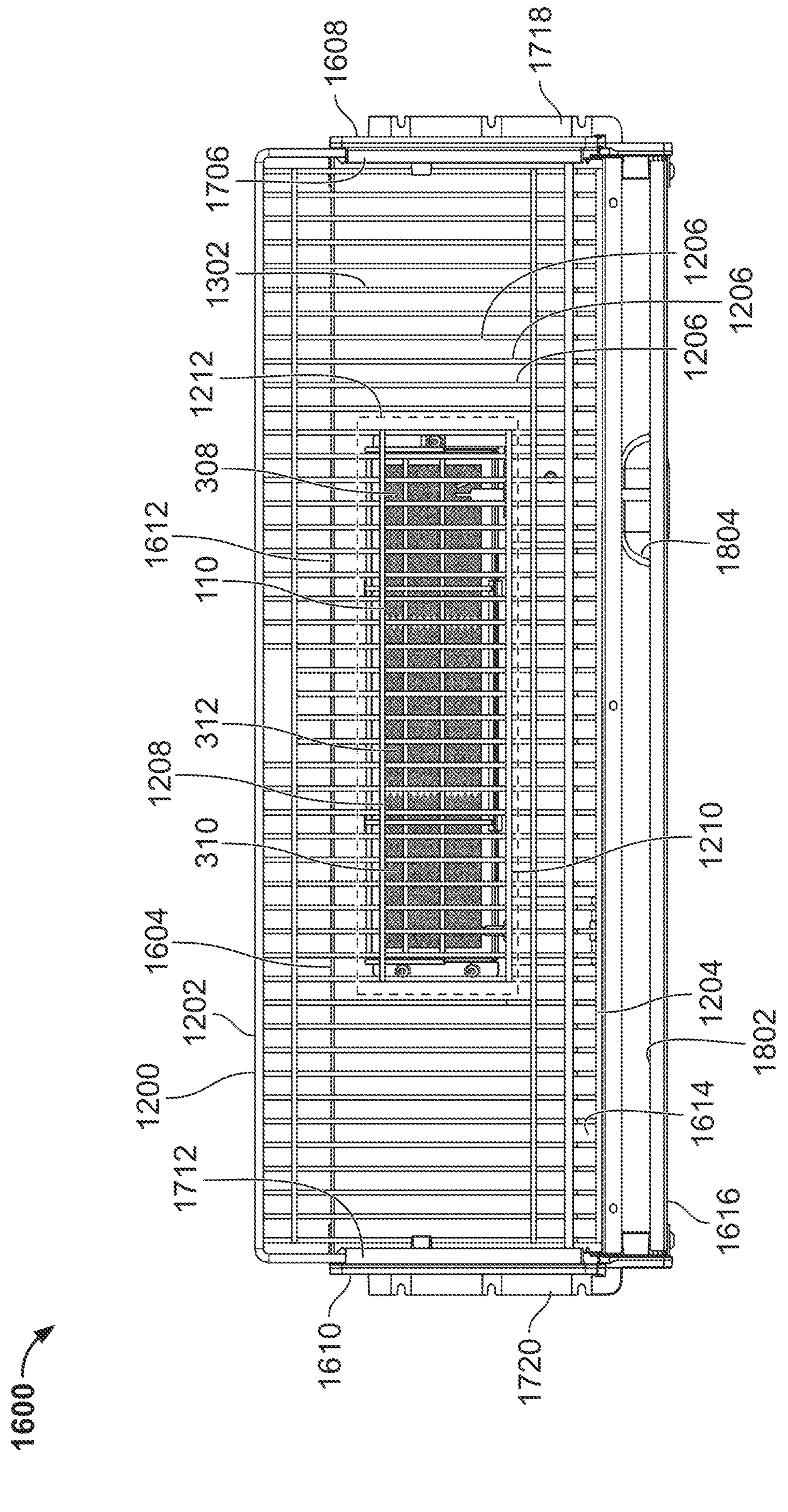
FIG. 18 is a bottom view of the IR burner assembly as shown in FIGS. 16 and 17.
Figure 19:
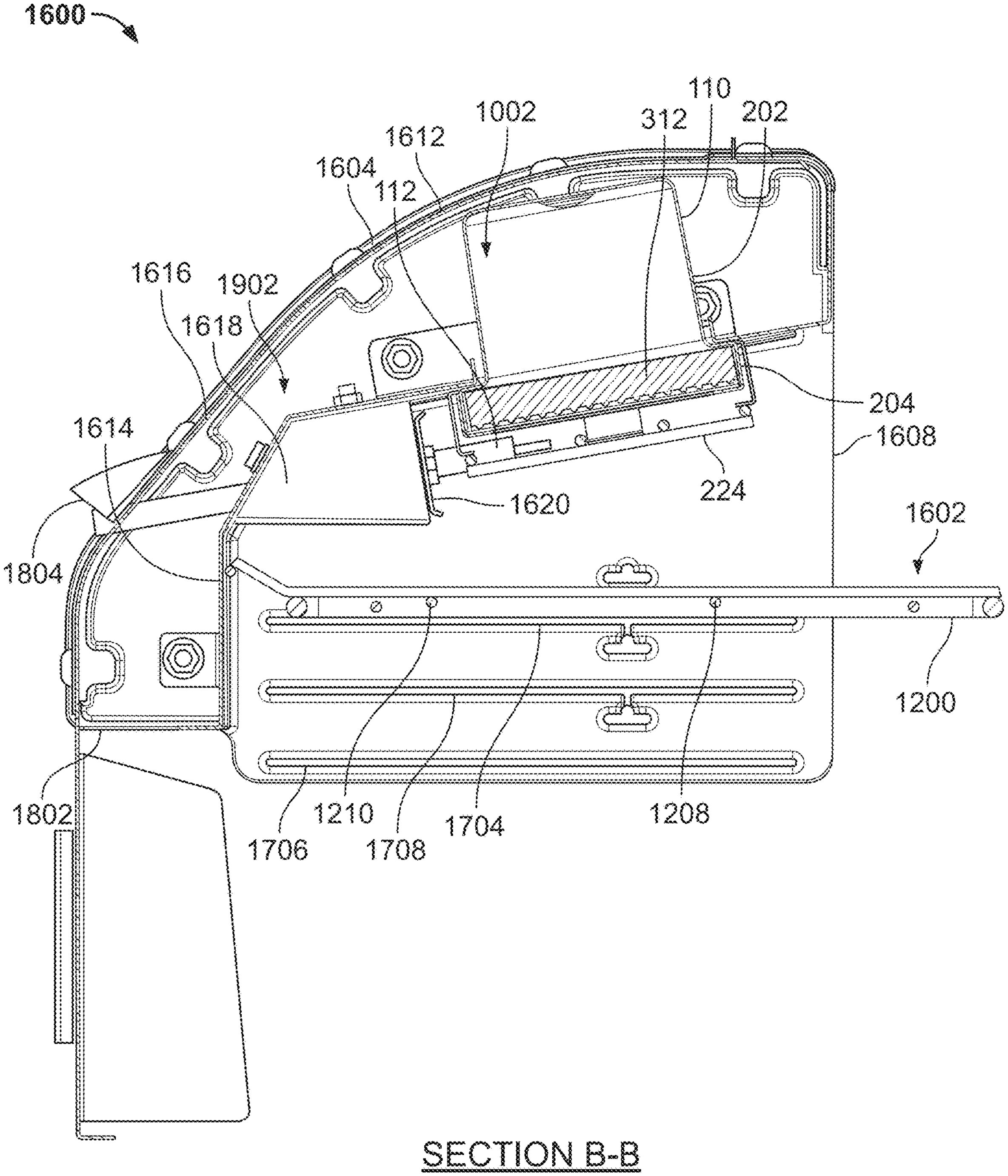
FIG. 19 is a cross-sectional view of the IR burner assembly as shown in FIGS. 16-18, taken along section B-B of FIG. 18.
Figure 20:
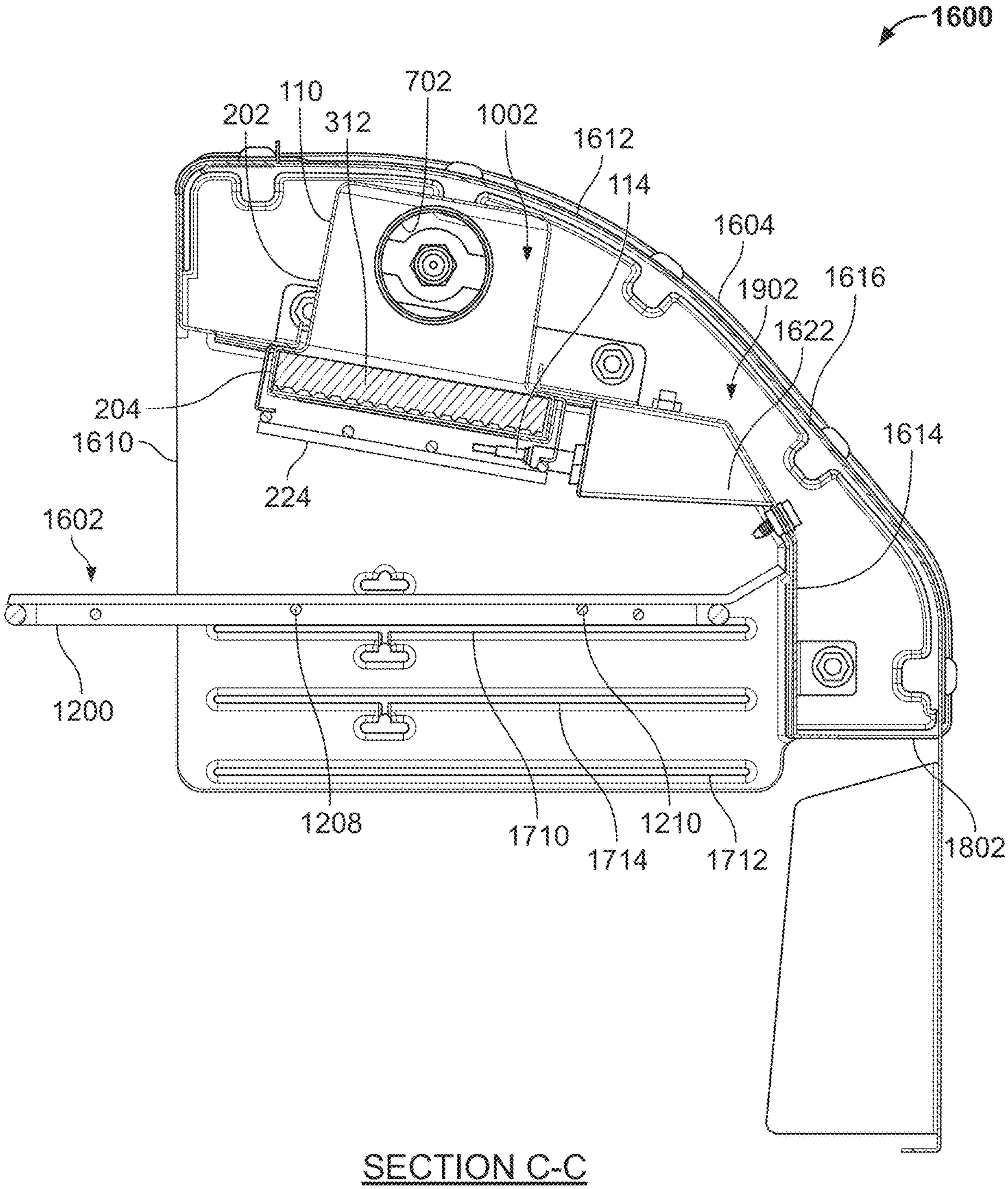
FIG. 20 is a cross-sectional view of the IR burner assembly as shown in FIGS. 16-19, taken along section C-C of FIG. 18.
Figure 21:
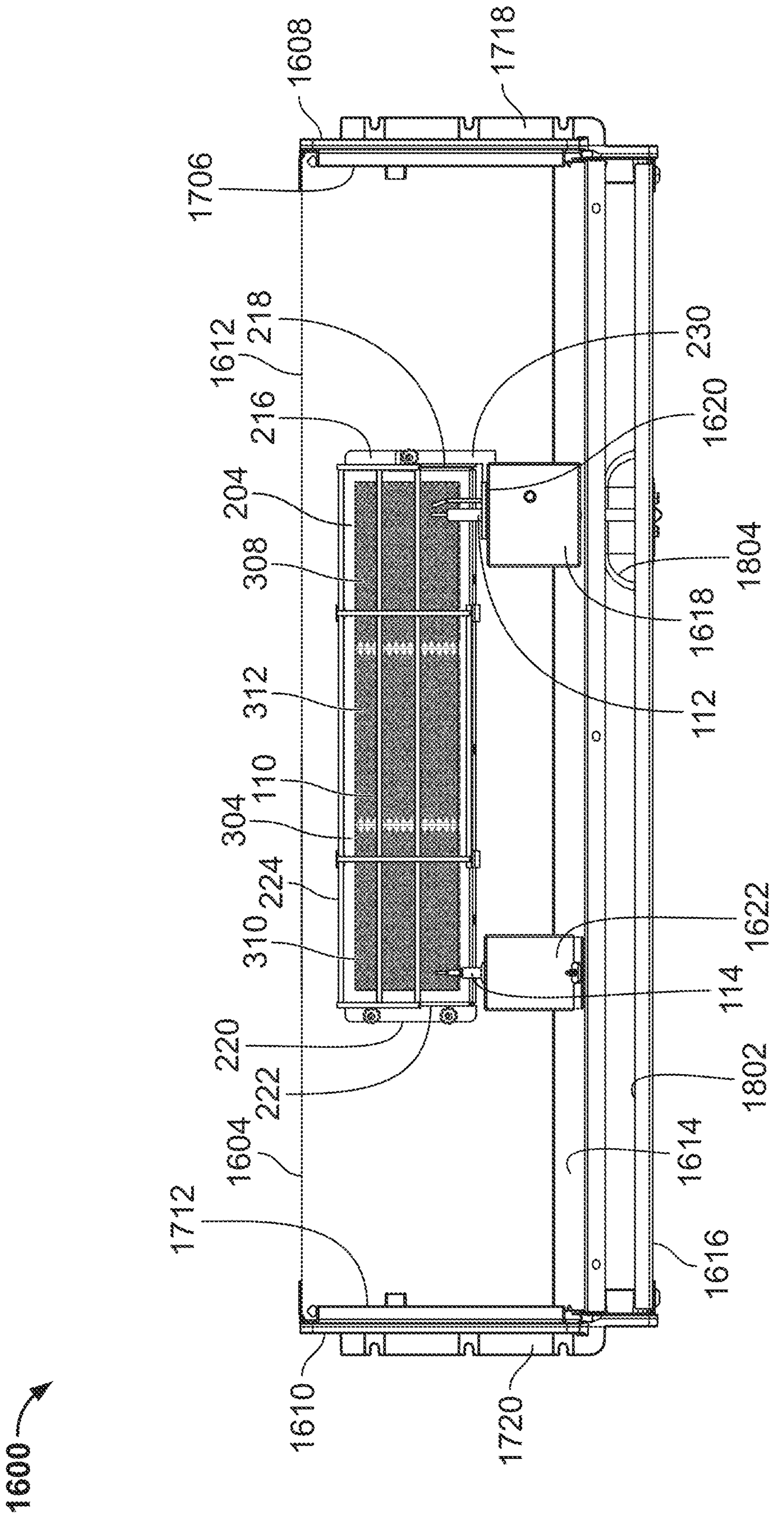
FIG. 21 is another bottom view of the IR burner assembly as shown in FIGS. 16-20, with the cooking grate of the IR burner assembly omitted.

FIG. 16 is a perspective view of an example IR burner assembly 1600 including the IR burner 110 as shown in FIGS. 2-10 and the cooking grate 1200 as shown in FIGS. 12-15, with the cooking grate 1200 located at an example first position 1602 (e.g., an upper position) below the IR burner 110. FIG. 17 is a front view of the IR burner assembly 1600 as shown in FIG. 16. FIG. 18 is a bottom view of the IR burner assembly 1600 as shown in FIGS. 16 and 17. FIG. 19 is a cross-sectional view of the IR burner assembly 1600 as shown in FIGS. 16-18, taken along section B-B of FIG. 18. FIG. 20 is a cross-sectional view of the IR burner assembly 1600 as shown in FIGS. 16-19, taken along section C-C of FIG. 18. FIG. 21 is another bottom view of the IR burner assembly 1600 as shown in FIGS. 16-20, with the cooking grate 1200 of the IR burner assembly 1600 omitted.

The IR burner assembly 1600 of FIGS. 16-21 includes an example shroud 1604 that is configured to be coupled to a cookbox of the gas grill 100 of FIG. 1, as further described herein. In the illustrated example of FIGS. 16-21, the shroud 1604 includes example opposing sidewalls 1606 (e.g., an example right sidewall 1608 and an example left sidewall 1610 located opposite the right sidewall 1608). The opposing sidewalls 1606 are configured to extend upwardly from a cookbox of the gas grill 100. In the illustrated example of FIGS. 16-21, the opposing sidewalls 1606 include a plurality of pairs of example opposing grate supports 1702, with respective ones of the opposing grate supports 1702 extending inwardly from the respective ones of the opposing sidewalls 1606 to support the cooking grate 1200 at a plurality of different distances from the IR burner 110. The ability to selectively support the cooking grate 1200 at different distances away from the IR burner 110 advantageously enables a user of the gas grill 100 to adjust the intensity of the IR burner 110 relative to one or more item(s)

of food to be placed on the cooking grate 1200 in connection with a cooking operation involving the IR burner 110.

For example, as shown in FIGS. 16-21, the right sidewall 1608 of the shroud 1604 includes an example first grate support 1704, an example second grate support 1706, and an example third grate support 1708, each of which extends inwardly from the right sidewall 1608 of the shroud 1604. The first grate support 1704 of the right sidewall 1608 is located below the IR burner 110 (e.g., below the bottom surface of the plurality of downwardly facing ceramic tiles 302 of the IR burner 110, and/or below the guard 224 of the IR burner 110). The second grate support 1706 of the right sidewall 1608 is located below the first grate support 1704 of the right sidewall 1608. The third grate support 1708 of the right sidewall 1608 is located intermediately between the first grate support 1704 and the second grate support 1706 of the right sidewall 1608. Similarly, the left sidewall 1610 of the shroud 1604 includes an example first grate support 1710, an example second grate support 1712, and an example third grate support 1714, each of which extends inwardly from the left sidewall 1610 of the shroud 1604. The first grate support 1710 of the left sidewall 1610 is located below the IR burner 110 (e.g., below the bottom surface of the plurality of downwardly facing ceramic tiles 302 of the IR burner 110, and/or below the guard 224 of the IR burner 110). The second grate support 1712 of the left sidewall 1610 is located below the first grate support 1710 of the left sidewall 1610. The third grate support 1714 of the left sidewall 1610 is located intermediately between the first grate support 1710 and the second grate support 1712 of the left sidewall 1610.

In the above-described example, the first grate support 1704 of the right sidewall 1608 and the first grate support 1710 of the left sidewall 1610 of the shroud 1604 form a first pair of the opposing grate supports 1702 of the shroud 1604, with the first pair of the opposing grate supports 1702 being configured to support the cooking grate 1200 at the first position 1602 (e.g., the upper position) below the IR burner 110, as shown in FIGS. 16-21. When the cooking grate 1200 is disposed on and/or otherwise supported by the first pair (e.g., the first grate support 1704 of the right sidewall 1608 and the first grate support 1710 of the left sidewall 1610) of the opposing grate supports 1702 of the shroud 1604, the cooking grate 1200 is vertically spaced apart from the IR burner 110 by an example first distance 1716. Positioning the cooking grate 1200 at the first distance 1716 (e.g., on the first pair of the opposing grate supports 1702 of the shroud 1604) can increase (e.g., maximize) the extent to which one or more item(s) of food placed on the cooking grate 1200 is/are exposed to heat generated by the IR burner 110 in connection with a cooking operation involving the IR burner 110.

Figure 22:
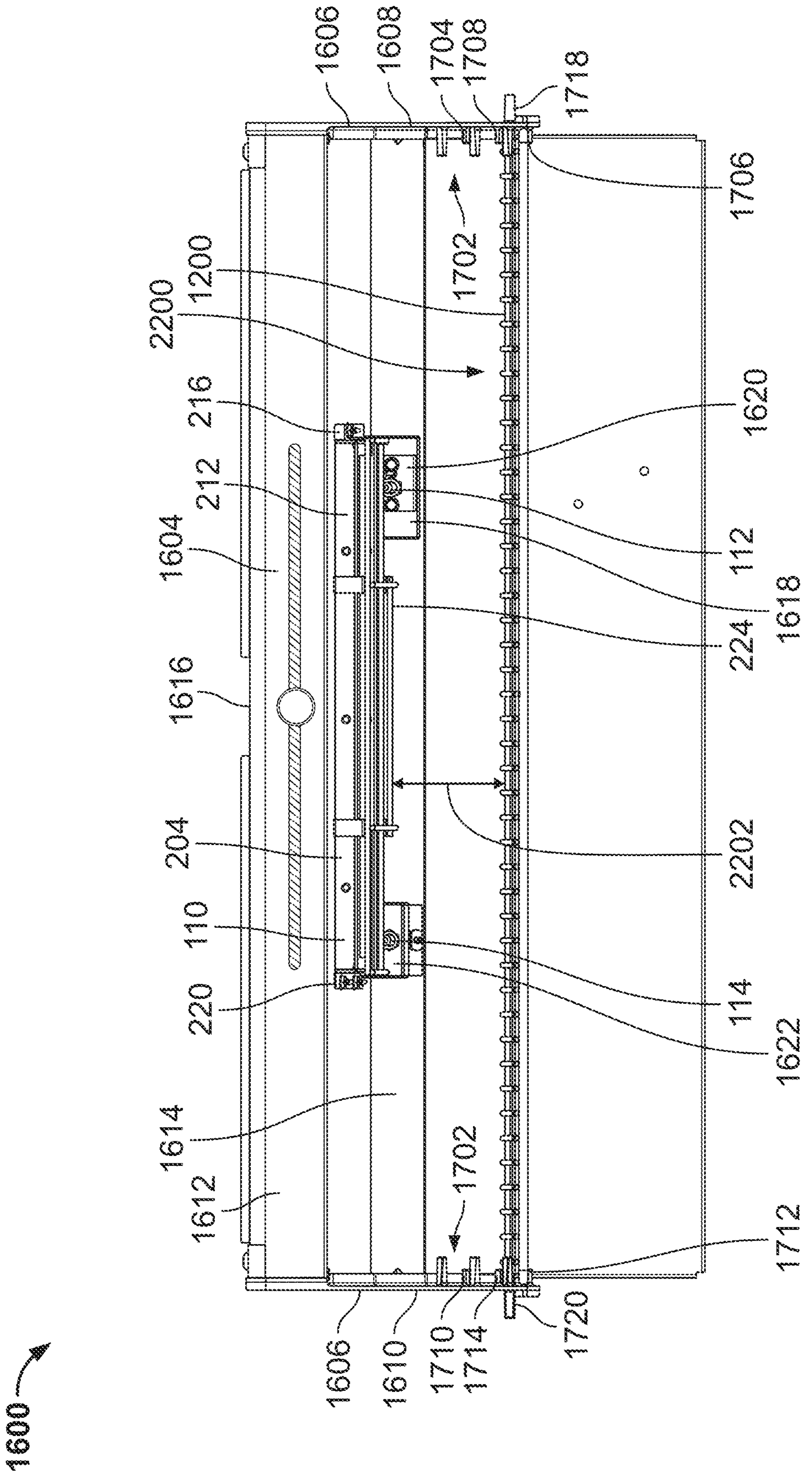
FIG. 22 is another front view of the IR burner assembly as shown in FIGS. 16-21, with the cooking grate located at an example second position below the IR burner.

Continuing with the above-described example, the second grate support 1706 of the right sidewall 1608 and the second grate support 1712 of the left sidewall 1610 of the shroud 1604 form a second pair of the opposing grate supports 1702 of the shroud 1604, with the second pair of the opposing grate supports 1702 being configured to support the cooking grate 1200 at a second position (e.g., a lower position) below the IR burner 110. For example, FIG. 22 is another front view of the IR burner assembly 1600 as shown in FIGS. 16-21, with the cooking grate 1200 located at an example second position 2200 (e.g., a lower position) below the IR burner 110. The second pair (e.g., the second grate support 1706 of the right sidewall 1608 and the second grate support 1712 of the left sidewall 1610) of the opposing grate supports 1702 of the shroud 1604 is located below the first pair (e.g., the first grate support 1704 of the right sidewall 1608 and the first grate support 1710 of the left sidewall 1610) of the opposing grate supports 1702 of the shroud 1604. Accordingly, when the cooking grate 1200 is disposed on and/or otherwise supported by the second pair (e.g., the second grate support 1706 of the right sidewall 1608 and the second grate support 1712 of the left sidewall 1610) of the opposing grate supports 1702 of the shroud 1604, the cooking grate 1200 is vertically spaced apart from the IR burner 110 by an example second distance 2202 that is greater than the first distance 1716. Positioning the cooking grate 1200 at the second distance 2202 (e.g., on the second pair of the opposing grate supports 1702 of the shroud 1604) can decrease (e.g., minimize) the extent to which one or more item(s) of food placed on the cooking grate 1200 is/are exposed to heat generated by the IR burner 110 in connection with a cooking operation involving the IR burner 110.

Figure 23:
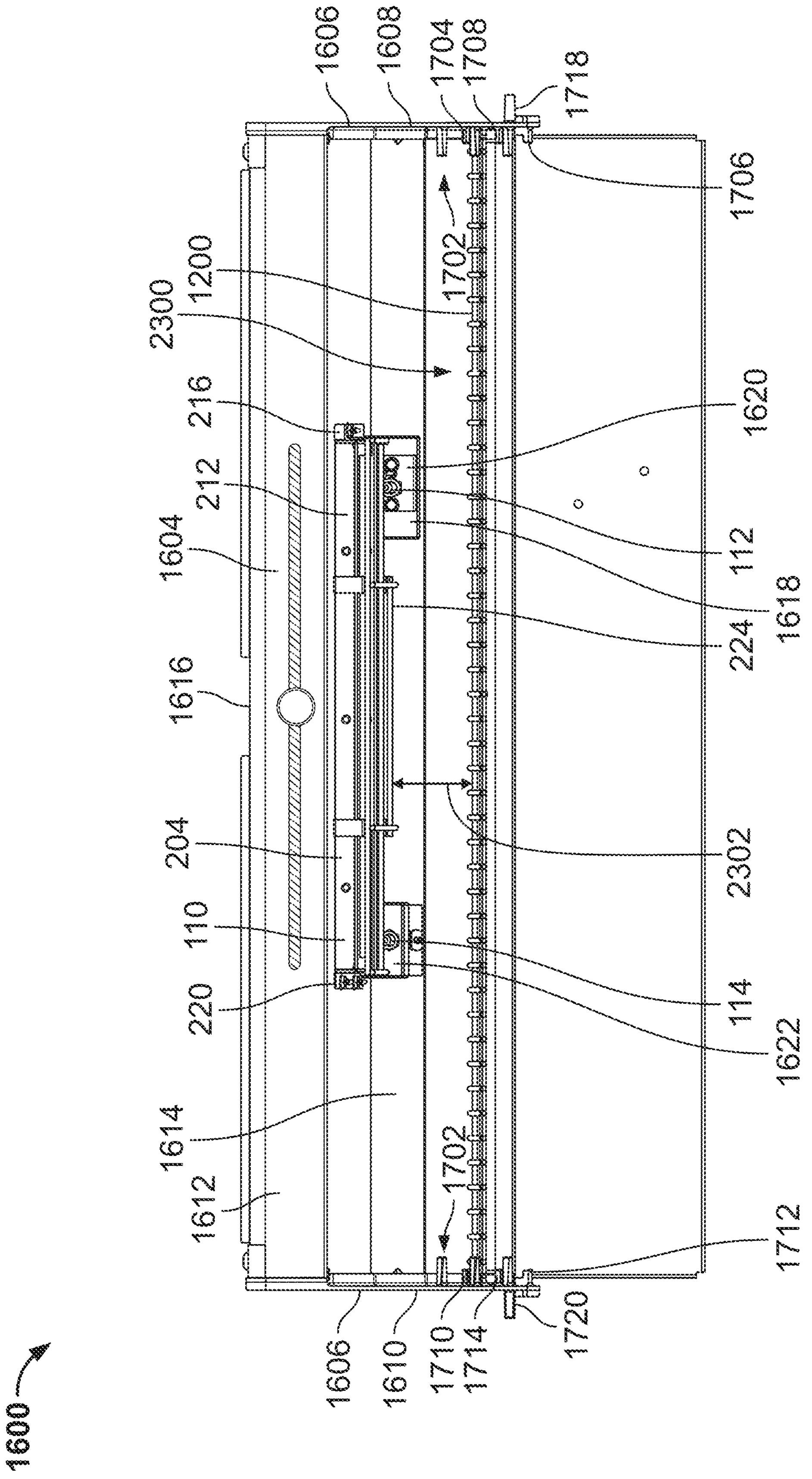
FIG. 23 is another front view of the IR burner assembly as shown in FIGS. 16-22, with the cooking grate located at an example third position below the IR burner.

Still continuing with the above-described example, the third grate support 1708 of the right sidewall 1608 and the third grate support 1714 of the left sidewall 1610 of the shroud 1604 form a third pair of the opposing grate supports 1702 of the shroud 1604, with the third pair of the opposing grate supports 1702 being configured to support the cooking grate 1200 at a third position (e.g., an intermediate position between the upper and lower positions) below the IR burner 110. For example, FIG. 23 is another front view of the IR burner assembly 1600 as shown in FIGS. 16-22, with the cooking grate 1200 located at an example third position 2300 (e.g., an intermediate position between the upper and lower positions) below the IR burner 110. The third pair (e.g., the third grate support 1708 of the right sidewall 1608 and the third grate support 1714 of the left sidewall 1610) of the opposing grate supports 1702 of the shroud 1604 is located below the first pair (e.g., the first grate support 1704 of the right sidewall 1608 and the first grate support 1710 of the left sidewall 1610) of the opposing grate supports 1702 of the shroud 1604 and above the second pair (e.g., the second grate support 1706 of the right sidewall 1608 and the second grate support 1712 of the left sidewall 1610) of the opposing grate supports 1702 of the shroud 1604. Accordingly, when the cooking grate 1200 is disposed on and/or otherwise supported by the third pair (e.g., the third grate support 1708 of the right sidewall 1608 and the third grate support 1714 of the left sidewall 1610) of the opposing grate supports 1702 of the shroud 1604, the cooking grate 1200 is vertically spaced apart from the IR burner 110 by an example third distance 2302 that is greater than the first distance 1716 and less than the second distance 2202. Positioning the cooking grate 1200 at the third distance 2302 (e.g., on the third pair of the opposing grate supports 1702 of the shroud 1604) can further modify (e.g., provide an intermediate result) the extent to which one or more item(s) of food placed on the cooking grate 1200 is/are exposed to heat generated by the IR burner 110 in connection with a cooking operation involving the IR burner 110.

The shroud 1604 of FIGS. 16-21 further includes one or more mounting flange(s) configured to couple the shroud 1604 to a cookbox of the gas grill 100 of FIG. 1. In the illustrated example of FIGS. 16-21, the right sidewall 1608 of the shroud 1604 includes an example first mounting flange 1718 that is coupled to and/or integrally formed with the right sidewall 1608. The first mounting flange 1718 of the shroud 1604 extends outwardly from the right sidewall 1608 of the shroud 1604. Similarly, the left sidewall 1610 of the shroud 1604 includes an example second mounting flange 1720 that is coupled to and/or integrally formed with the left sidewall 1610. The second mounting flange 1720 of the shroud 1604 extends outwardly from the left sidewall 1610 of the shroud 1604. In the illustrated example of FIGS. 16-21, the first mounting flange 1718 and the second mounting flange 1720 of the shroud 1604 each include one or more opening(s) configured to receive a corresponding one or more fastener(s) for the purpose of coupling the shroud 1604 to a cookbox of the gas grill 100 of FIG. 1, as further described herein.

The shroud 1604 of FIGS. 16-21 further includes an example housing 1612 having an example inner wall 1614 (e.g., an interior wall configured to face toward a cooking chamber of the gas grill 100) and an example outer wall 1616 (e.g., an exterior wall configured to face toward an atmosphere surrounding the gas grill 100). In the illustrated example of FIGS. 16-21, the outer wall 1616 of the housing 1612 is spaced apart from the inner wall 1614 of the housing 1612 such that the inner wall 1614 and the outer wall 1616 of the housing 1612 define an example internal compartment 1902 of the housing 1612 and/or, more generally, of the shroud 1604. The inner wall 1614 and the outer wall 1616 of the housing 1612 respectively extend between the opposing sidewalls 1606 (e.g., from the right sidewall 1608 to the left sidewall 1610) of the shroud 1604 such that the internal compartment 1902 of the housing 1612 is laterally bound by the opposing sidewalls 1606 of the shroud 1604. As shown in FIGS. 16-21, the housing 1612 of the shroud 1604 is configured to provide a closed off boundary between the internal compartment 1902 of the housing 1612 of the shroud 1604 on the one hand and a cooking compartment (e.g., a cooking chamber) of the gas grill 100 of FIG. 1 on the other hand, as further described herein.

In the illustrated example of FIGS. 16-21, the IR burner 110 is coupled to and/or supported by the housing 1612 of the shroud 1604 (e.g., via the first mounting flange 216 and the second mounting flange 220 of the frame 204 of the IR burner 110) such that at least a portion of the IR burner 110 is located within the internal compartment 1902 of the housing 1612. For example, as shown in FIGS. 16-21, a portion of the housing 202 of the IR burner 110 (e.g., the top wall 206 and a majority of the front wall 208, the rear wall 502, the right sidewall 210, and the left sidewall 402 of the housing 202 of the IR burner 110) is located within the internal compartment 1902 of the housing 1612 of the shroud 1604. As further shown in FIGS. 16-21, one or more other portion(s) of the IR burner 110 (e.g., the ceramic tiles 302, the frame 204, the guard 224, etc.) is/are located outside of the internal compartment 1902 of the housing 1612 of the shroud 1604. In other examples, substantially all portions of the IR burner 110 other than the guard 224 can be located within (e.g., recessed into) the internal compartment 1902 of the housing 1612 of the shroud 1604.

In the illustrated example of FIGS. 16-21, the housing 1612 of the shroud 1604 includes an example first opening 1802 extending between the inner wall 1614 and the outer wall 1616 of the housing 1612 at a location proximate the bottom end of the inner wall 1614 of the housing 1612. The first opening 1802 is configured to draw in and/or otherwise facilitate a flow of ambient air from an external environment (e.g., the atmosphere surrounding the gas grill 100) into the internal compartment 1902 of the housing 1612 (e.g., via the first opening 1802) and toward and/or into the IR burner 110, thereby enabling the IR burner to achieve a clean air/gas mixture without flame abnormality and/or without excess carbon monoxide during combustion of the air/gas mixture. The housing 1612 of the shroud 1604 further includes an example second opening 1804 formed in and/or extending through the outer wall 1616 of the housing 1612. The second opening 1804 is configured to provide a pathway for routing a wire, cable, or cord of the ignitor 112 externally along the outer wall 1616 of the housing 1612, thereby reducing the extent to which the wire, cable, or cord of the ignitor 112 is exposed to heat generated by the IR burner 110.

The IR burner assembly 1600 of FIGS. 16-21 further includes an example implementation of the ignitor 112 of the gas grill 100 of FIG. 1. In the illustrated example of FIGS. 16-21, the ignitor 112 is operatively positioned proximate the first end 218 of the frame 204 of the IR burner 110, and/or proximate the first end of the end-to-end arrangement of the plurality of downwardly facing ceramic tiles 302 of the IR burner 110, such that the ignitor 112 is configured to ignite the first ceramic tile 308 from among the plurality of downwardly facing ceramic tiles 302. As further shown in FIGS. 16-21, the IR burner assembly 1600 includes an example first component housing 1618 coupled to and extending forwardly from the inner wall 1614 of the housing 1612 of the shroud 1604, with the first component housing 1618 being configured to contain a portion (e.g., a rear end) of the ignitor 112. In the illustrated example of FIGS. 16-21, the IR burner assembly 1600 further includes an example ignitor bracket 1620 coupled to the first component housing 1618, with the ignitor bracket 1620 being configured to support the ignitor 112. As further shown in FIGS. 16-21, the first end 318 of the above-described grounding bracket 230 is coupled to the frame 204 and/or the guard 224 of the IR burner 110, and the second end 320 of the above-described grounding bracket 230 is coupled to the ignitor 112, the ignitor bracket 1620, and/or the first component housing 1618. The grounding bracket 230 accordingly extends between the frame 204 and/or the guard 224 of the IR burner 110 on the one hand, and the ignitor 112, the ignitor bracket 1620, and/or the first component housing 1618 on the other hand.

The IR burner assembly 1600 of FIGS. 16-21 further includes an example implementation of the thermal sensor 114 of the gas grill 100 of FIG. 1. In the illustrated example of FIGS. 16-21, the thermal sensor 114 is operatively positioned proximate the second end 222 of the frame 204 of the IR burner 110, and/or proximate the second end of the end-to-end arrangement of the plurality of downwardly facing ceramic tiles 302 of the IR burner 110, such that the thermal sensor 114 is configured to detect whether the second ceramic tile 310 from among the plurality of downwardly facing ceramic tiles 302 is ignited. As further shown in FIGS. 16-21, the IR burner assembly 1600 includes an example second component housing 1622 coupled to and extending forwardly from the inner wall 1614 of the housing 1612 of the shroud 1604, with the second component housing 1622 being configured to contain a portion (e.g., a rear end) of the thermal sensor 114. In some examples, a crossover ignition is required to span respective ones of the gap(s) 306 existing between neighboring ones of the plurality of downwardly facing ceramic tiles 302 of the IR burner 110 in order to successfully ignite the second ceramic tile 310 following ignition of the first ceramic tile 308 by the ignitor 112. In such examples, the thermal sensor 114 is configured to determine whether the crossover ignition is successful (e.g., whether the second ceramic tile 310 has been ignited following, based on, and/or in response to ignition of the first ceramic tile 308).

Figure 24:
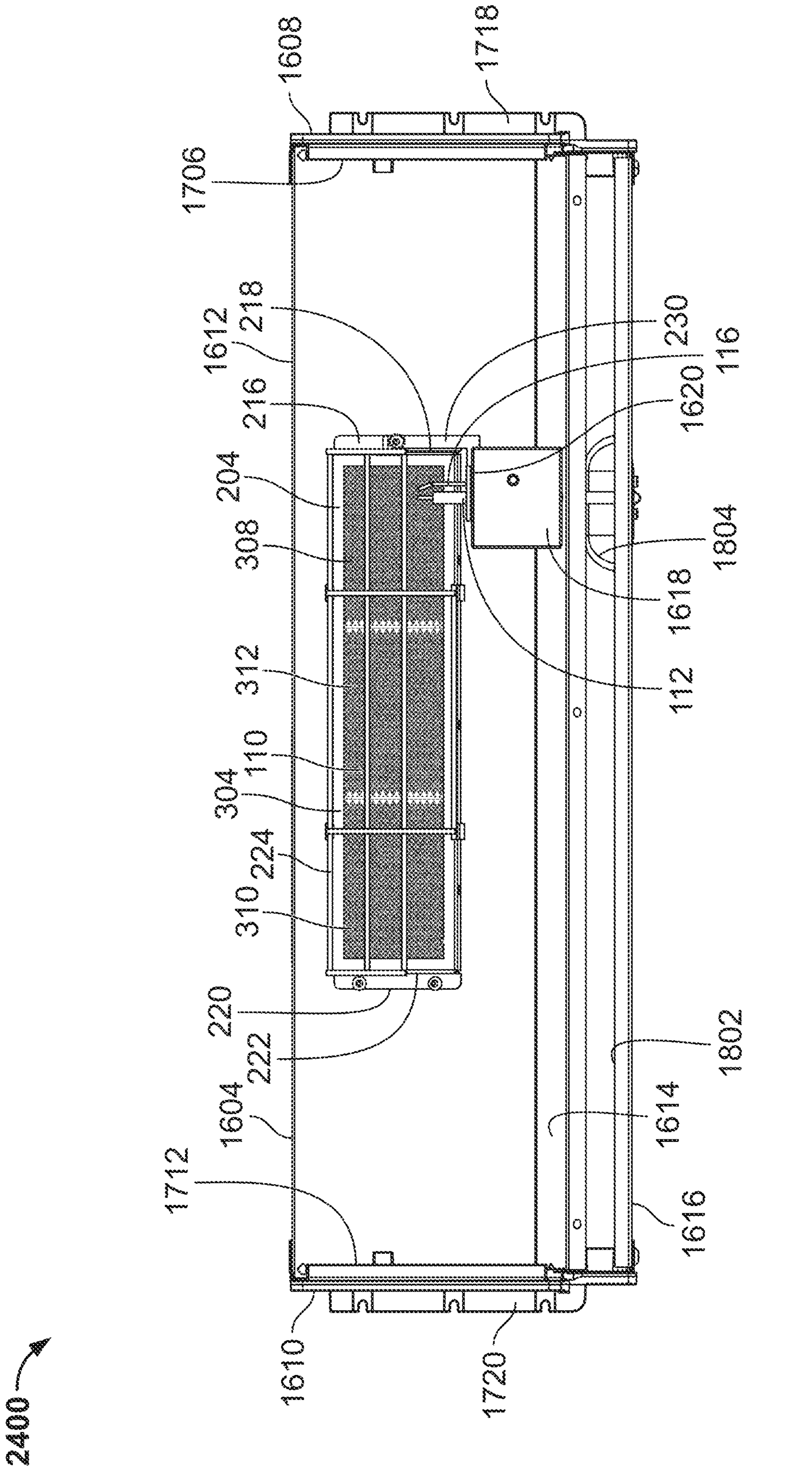
FIG. 24 is a bottom view of another example IR burner assembly including the IR burner as shown in FIGS. 2-10 and 16-21, with the cooking grate of the IR burner assembly omitted.

FIG. 24 is a bottom view of another example IR burner assembly 2400 including the IR burner 110 as shown in FIGS. 2-10 and 16-21, with the cooking grate 1200 of the IR burner assembly 2400 omitted. The IR burner assembly 2400 of FIG. 24 is structured and/or configured in a manner that is generally the same as that of the IR burner assembly 1600 of FIGS. 16-21 described above, with the primary difference being that the IR burner assembly 2400 shown in FIG. 24 is intended to be used in an implementation of the gas grill 100 that lacks the above-described thermal sensor 114. The IR burner assembly 2400 of FIG. 24 accordingly lacks the second component housing 1622 described above in connection with the IR burner assembly 1600 of FIGS. 16-21. The IR burner assembly 2400 shown in FIG. 24 is otherwise structured and/or configured in a manner that is substantially identical to that of the IR burner assembly 1600 shown in FIGS. 16-21 (e.g., otherwise including the above-described features of the shroud 1604, the ignitor 112, the first component housing 1618, the ignitor bracket 1620, and the grounding bracket 230 of the IR burner assembly 1600).

The IR burner assembly 2400 of FIG. 24 includes an example implementation of the flame sensor 116 of the gas grill 100 of FIG. 1. In the illustrated example of FIG. 24, the flame sensor 116 is operatively positioned proximate the first end 218 of the frame 204 of the IR burner 110, and/or proximate the first end of the end-to-end arrangement of the plurality of downwardly facing ceramic tiles 302 of the IR burner 110, such that the flame sensor 116 is configured to detect whether the first ceramic tile 308 from among the plurality of downwardly facing ceramic tiles 302 is ignited. As further shown in FIG. 24, the first component housing 1618 that contains a portion of the ignitor 112 is further configured to contain a portion (e.g., a rear end) of the flame sensor 116 such that the respective portions of the ignitor 112 and the flame sensor 116 are commonly contained within the first component housing 1618.

Figure 25:
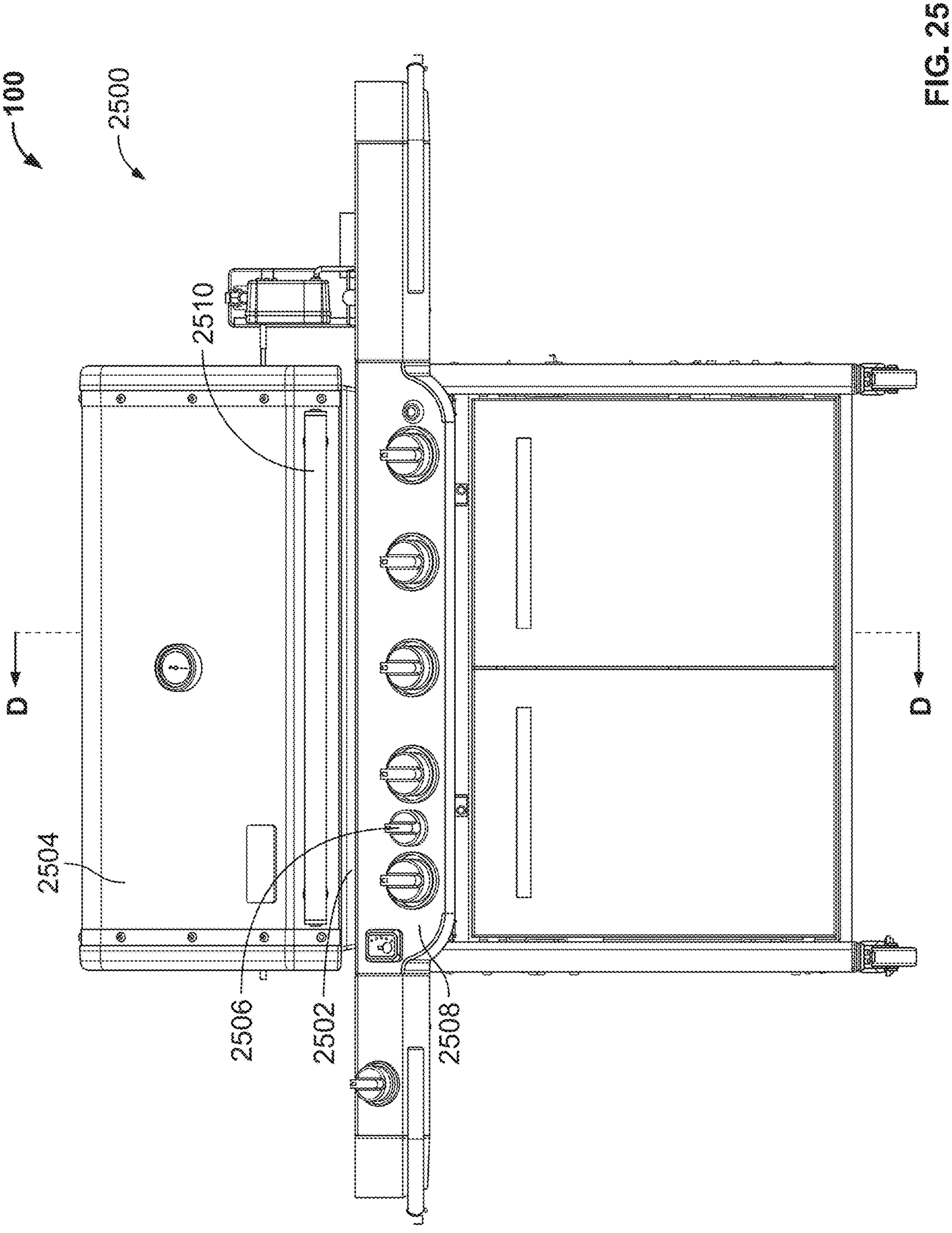
FIG. 25 is a front view of an example first implementation of the gas grill of FIG. 1, with an example lid of the gas grill shown in an example closed position relative to an example cookbox of the gas grill.
Figure 26:
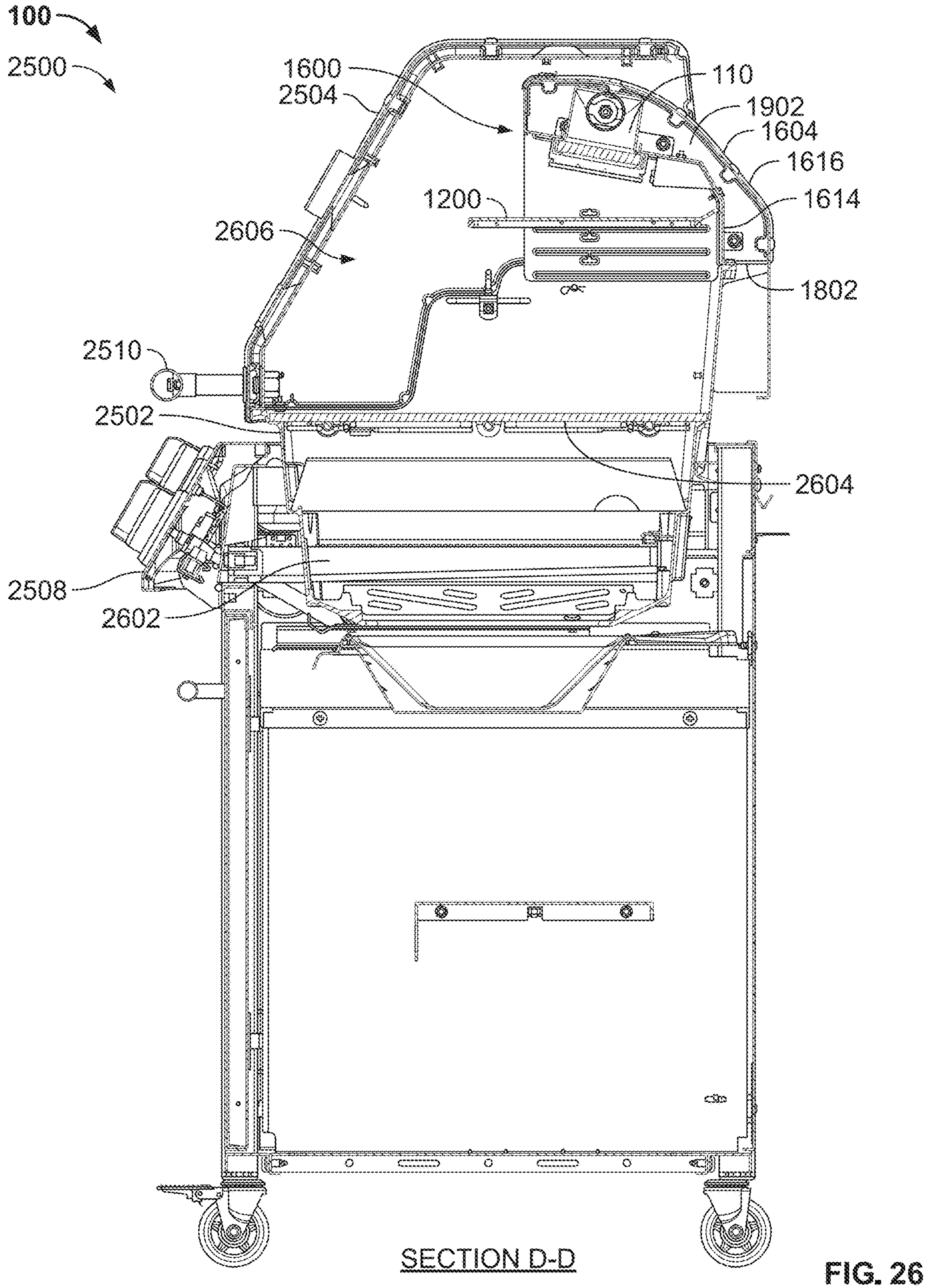
FIG. 26 is a cross-sectional view of the first implementation of the gas grill as shown in FIG. 25, taken along section D-D of FIG. 25.
Figure 27:
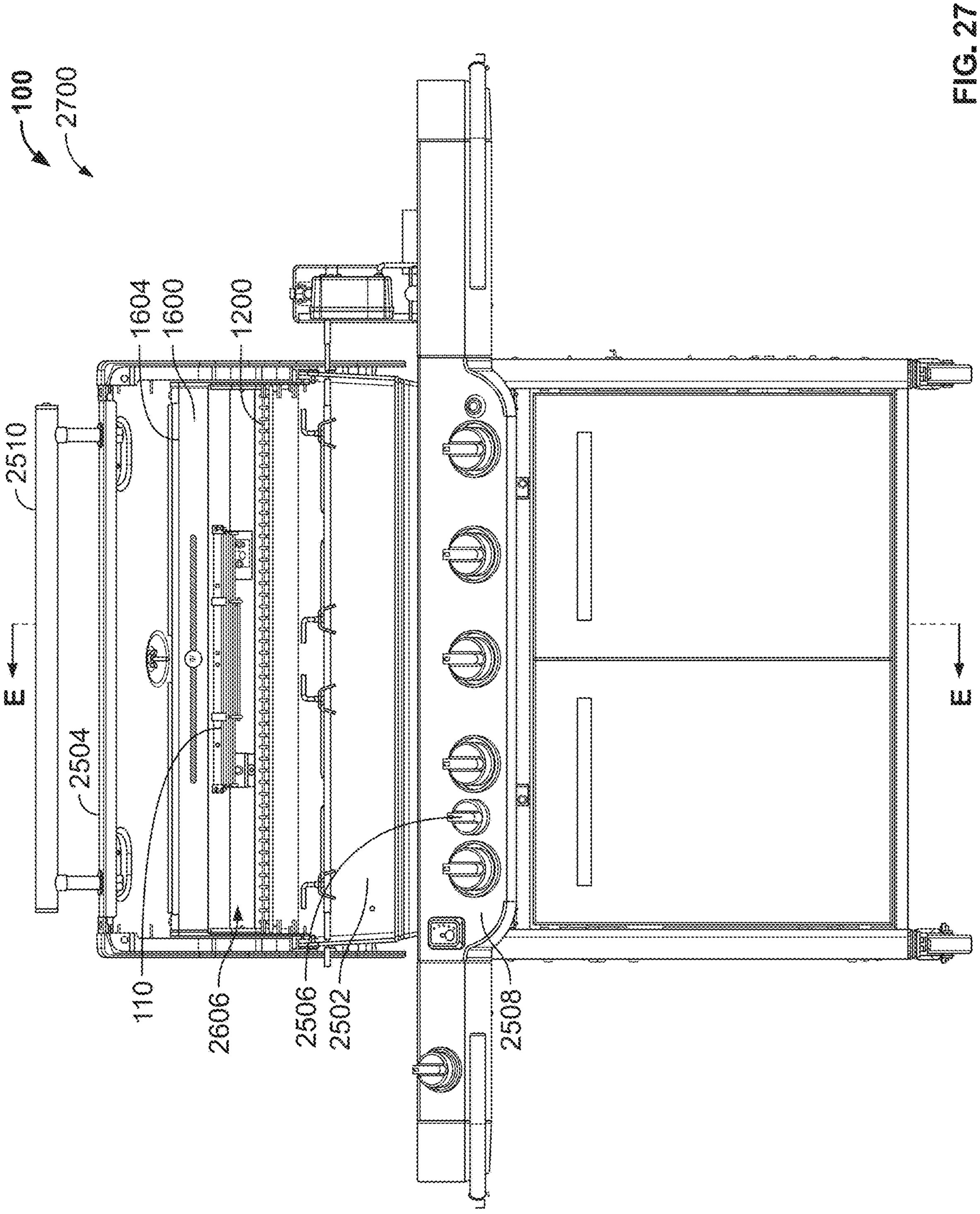
FIG. 27 is a front view of the first implementation of the gas grill of FIGS. 25 and 26, with the lid of the gas grill shown in an example open position relative to the cookbox of the gas grill.
Figure 28:
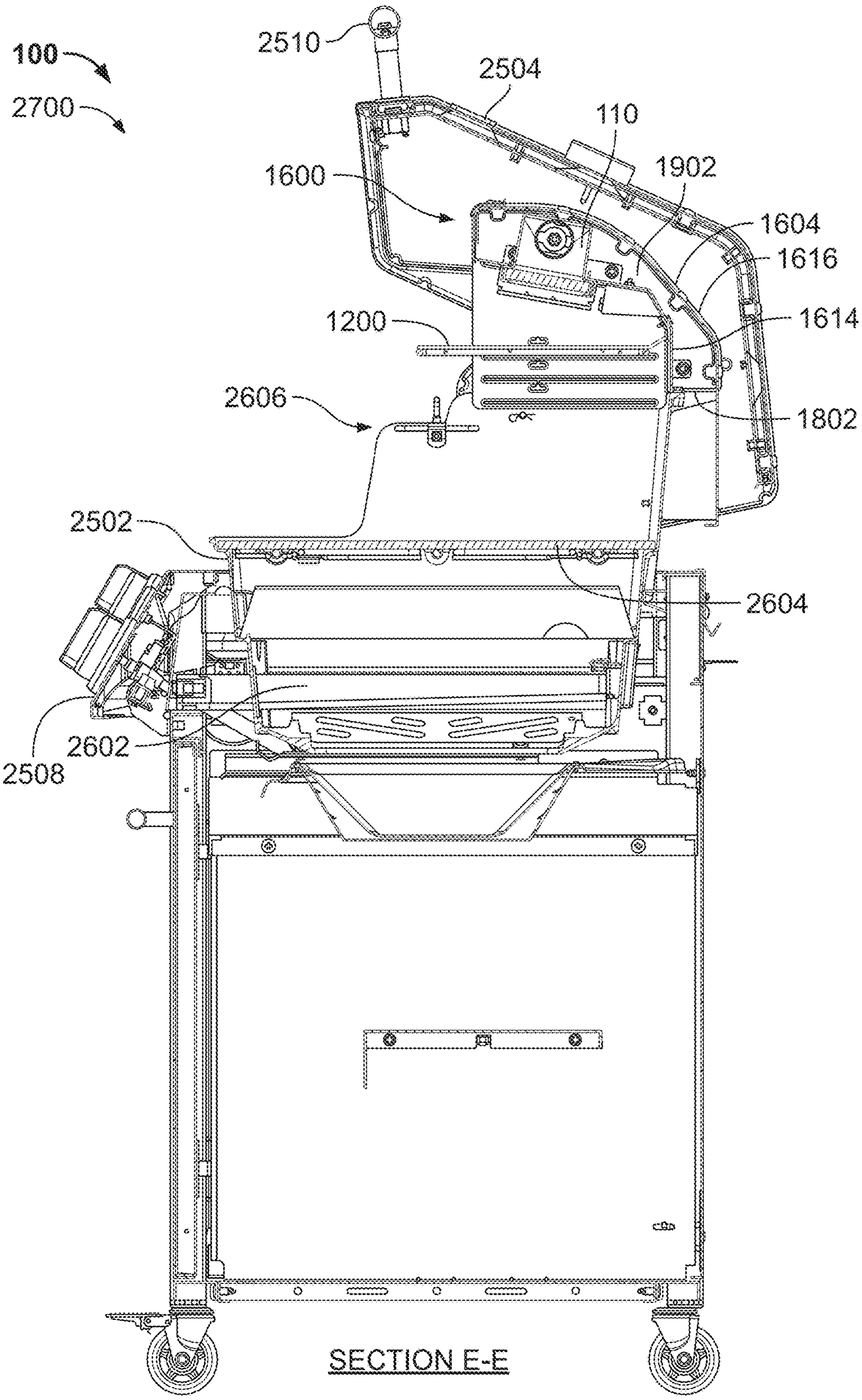
FIG. 28 is a cross-sectional view of the first implementation of the gas grill as shown in FIG. 27, taken along section E-E of FIG. 27.

FIG. 25 is a front view of an example first implementation of the gas grill 100 of FIG. 1, with an example lid 2504 of the gas grill 100 shown in an example closed position 2500 relative to an example cookbox 2502 of the gas grill 100. FIG. 26 is a cross-sectional view of the first implementation of the gas grill 100 as shown in FIG. 25, taken along section D-D of FIG. 25. FIG. 27 is a front view of the first implementation of the gas grill 100 of FIGS. 25 and 26, with the lid 2504 of the gas grill 100 shown in an example open position 2700 relative to the cookbox 2502 of the gas grill 100. FIG. 28 is a cross-sectional view of the first implementation of the gas grill 100 as shown in FIG. 27, taken along section E-E of FIG. 27.

In the illustrated example of FIGS. 25-28, the gas grill 100 includes the IR burner 110 as shown in FIGS. 2-11, the cooking grate 1200 as shown in FIGS. 12-15, and the IR burner assembly 1600 as shown in FIGS. 16-21. The shroud 1604 of the IR burner assembly 1600 is coupled to the cookbox 2502 of the gas grill 100 via the first mounting flange 1718 and the second mounting flange 1720 of the shroud 1604. The opposing sidewalls 1606 (e.g., the right sidewall 1608 and the left sidewall 1610) of the shroud 1604 extend upwardly from the cookbox 2502 and include the plurality of pairs of opposing grate supports 1702 described above in connection with FIGS. 16-23, thereby facilitating adjustment of the cooking grate 1200 to various positions relative to the IR burner 110. As shown in FIGS. 25-28, the cookbox 2502 of the gas grill 100 supports, carries, and/or houses one or more example conventional (e.g., non-infrared) burner tube(s) 2602 in addition to supporting the shroud 1604 of the IR burner assembly 1600 that includes the IR burner 110. The cookbox 2502 also supports, carries, and/or houses one or more example lower cooking grate(s) 2604 positioned below the cooking grate 1200.

In the illustrated example of FIGS. 25-28, the valve 108 which controls the delivery of pressurized combustible gas from the manifold 106 of the gas grill 100 to the IR burner 110 of the gas grill 100 is implemented as a manually-controllable valve, with the manually-controllable valve having a flow control member configured to be manually adjusted via rotation of an example control knob 2506 located on an example control panel 2508 of the gas grill 100, wherein the control knob 2506 is operatively coupled (e.g., via a mechanical connection) to the flow control member of the valve 108.

As shown in FIGS. 25-28, the shroud 1604 of the IR burner assembly 1600 covers and/or encloses a portion of the cookbox 2502 of the gas grill 100. The lid 2504 of the gas grill 100 is configured to cover and/or enclose the remaining portion of the cookbox 2502 (e.g., not already covered and/or enclosed by the shroud 1604 of the IR burner assembly 1600) when the lid 2504 is in the closed position 2500 shown in FIGS. 25 and 26. The lid 2504 is movably (e.g., pivotally) coupled to the cookbox 2502 such that the lid 2504 can be moved (e.g., pivoted) relative to the cookbox 2502 between the closed position 2500 shown in FIGS. 25 and 26 and the open position 2700 shown in FIGS. 27 and 28. Movement of the lid 2504 of the gas grill 100 between the closed position 2500 shown in FIGS. 25 and 26 and the open position 2700 shown in FIGS. 27 and 28 can be facilitated via user interaction with an example handle 2510 of the gas grill 100 that is coupled to the lid 2504.

In the illustrated example of FIGS. 25-28, the cookbox 2502, the shroud 1604, and the lid 2504 of the gas grill 100 collectively define an example cooking chamber 2606 configured to cook one or more item(s) of food. The cooking chamber 2606 of the gas grill 100 becomes accessible to a user of the gas grill 100 when the lid 2504 of the gas grill 100 is in the open position 2700 shown in FIGS. 27 and 28. Conversely, the cooking chamber 2606 of the gas grill 100 is generally inaccessible to the user of the gas grill 100 when the lid 2504 of the gas grill 100 is in the closed position 2500 shown in FIGS. 25 and 26. As shown in FIGS. 25-28, the cooking grate 1200 is located within the cooking chamber 2606. At least a portion of the IR burner 110 (e.g., the guard 224, the frame 204, and/or the downwardly facing ceramic tiles 302 of the IR burner 110) is also located within the cooking chamber 2606. The inner wall 1614 of the housing 1612 of the shroud 1604 separates the cooking chamber 2606 of the gas grill 100 from the above-described internal compartment 1902 of the housing 1612 which contains one or more portion(s) of the IR burner 110. User access to the cooking chamber 2606 of the gas grill 100 may periodically become necessary, for example, to add an item of food to the cooking chamber 2606 (e.g., at or toward the beginning of a cook), to remove an item of food from the cooking chamber 2606 (e.g., at or toward the end of a cook), and/or to flip, rotate, relocate, or otherwise move an item of food within the cooking chamber 2606 (e.g., during the middle of a cook).

Figure 29:
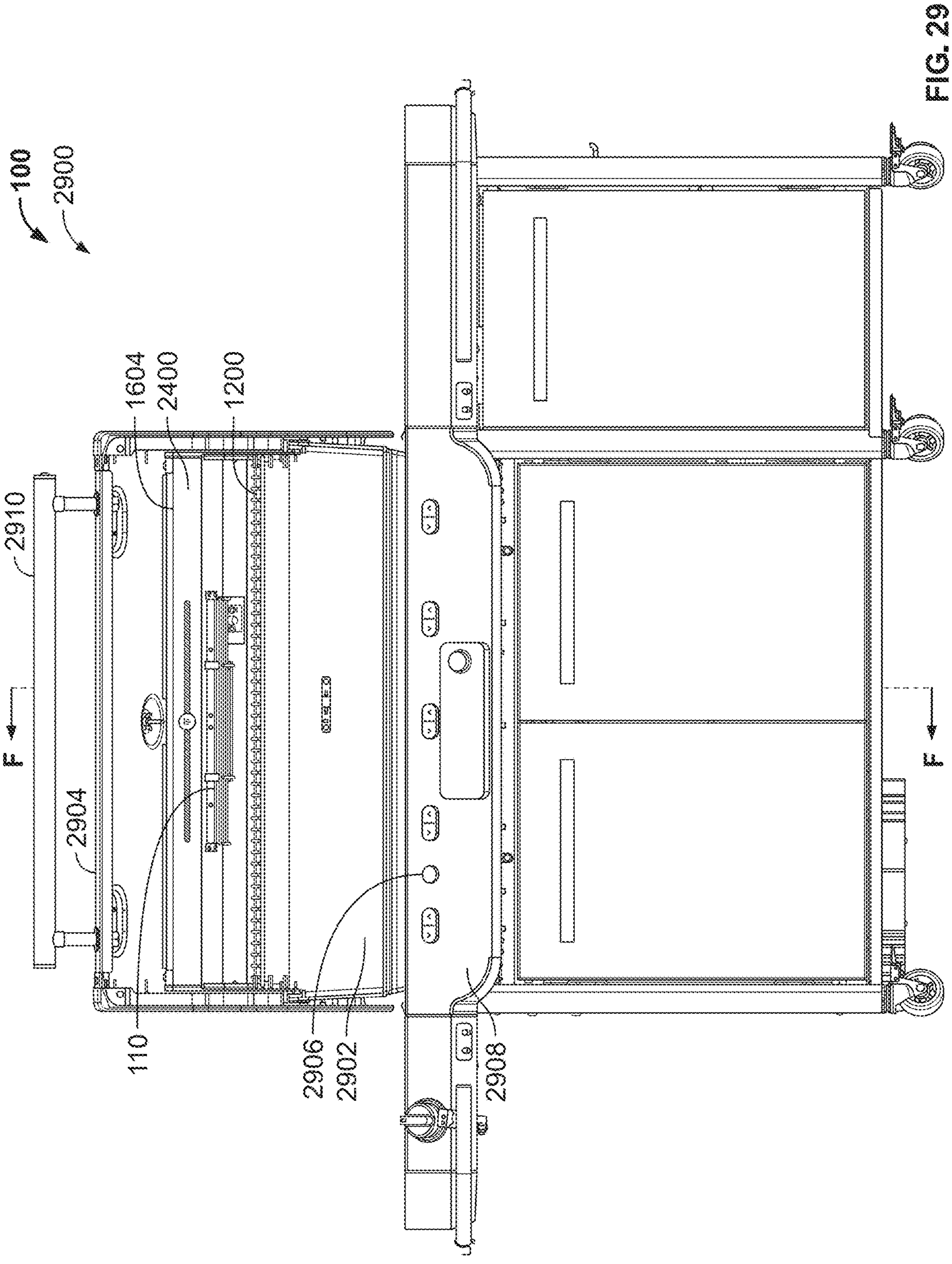
FIG. 29 is a front view of an example second implementation of the gas grill of FIG. 1, with an example lid of the gas grill shown in an example open position relative to an example cookbox of the gas grill 100.
Figure 30:
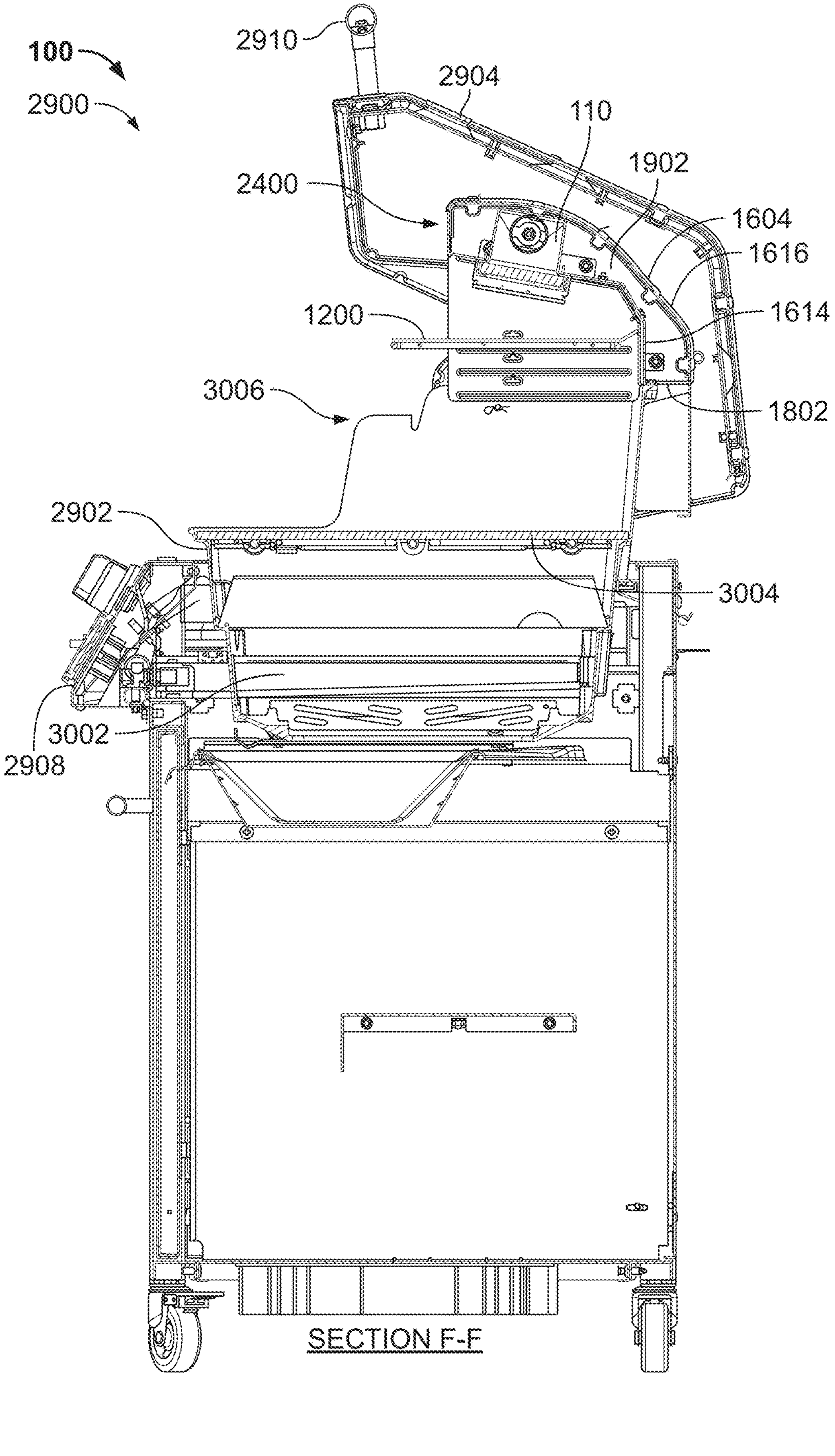
FIG. 30 is a cross-sectional view of the second implementation of the gas grill as shown in FIG. 29, taken along section F-F of FIG. 29.

FIG. 29 is a front view of an example second implementation of the gas grill 100 of FIG. 1, with an example lid 2904 of the gas grill 100 shown in an example open position 2900 relative to an example cookbox 2902 of the gas grill 100. FIG. 30 is a cross-sectional view of the second implementation of the gas grill 100 as shown in FIG. 29, taken along section F-F of FIG. 29. In the illustrated example of FIGS. 29 and 30, the gas grill 100 includes the IR burner 110 as shown in FIGS. 2-11, the cooking grate 1200 as shown in FIGS. 12-15, and the IR burner assembly 2400 as shown in FIG. 24. The shroud 1604 of the IR burner assembly 2400 is coupled to the cookbox 2902 of the gas grill 100 via the first mounting flange 1718 and the second mounting flange

1720 of the shroud 1604. The opposing sidewalls 1606 (e.g., the right sidewall 1608 and the left sidewall 1610) of the shroud 1604 extend upwardly from the cookbox 2902 and include the plurality of pairs of opposing grate supports 1702 described above in connection with FIGS. 16-24, thereby facilitating adjustment of the cooking grate 1200 to various positions relative to the IR burner 110. As shown in FIGS. 29 and 30, the cookbox 2902 of the gas grill 100 supports, carries, and/or houses one or more example conventional (e.g., non-infrared) burner tube(s) 3002 in addition to supporting the shroud 1604 of the IR burner assembly 2400 that includes the IR burner 110. The cookbox 2902 also supports, carries, and/or houses one or more example lower cooking grate(s) 3004 positioned below the cooking grate 1200.

In the illustrated example of FIGS. 29 and 30, the valve 108 which controls the delivery of pressurized combustible gas from the manifold 106 of the gas grill 100 to the IR burner 110 of the gas grill 100 is implemented as a controllable electric valve (e.g., a solenoid valve), with the controllable electric valve having a flow control member configured to be electrically adjusted in response to instructions, commands, and/or signals (e.g., a supply of current) generated by the controller 128 of the gas grill 100. User inputs pertaining to such instructions, commands, and/or signals can be received via an example control button 2906 located on an example control panel 2908 of the gas grill 100, wherein the control button 2906 is operatively coupled (e.g., via a wired or wireless electrical connection) to the controller 128 of the gas grill 100, and the controller is operatively coupled (e.g., via a wired or wireless electrical connection) to the controllable electric valve.

As shown in FIGS. 29 and 30, the shroud 1604 of the IR burner assembly 1600 covers and/or encloses a portion of the cookbox 2902 of the gas grill 100. The lid 2904 of the gas grill 100 is configured to cover and/or enclose the remaining portion of the cookbox 2902 (e.g., not already covered and/or enclosed by the shroud 1604 of the IR burner assembly 1600) when the lid 2904 is in a closed position. The lid 2904 is movably (e.g., pivotally) coupled to the cookbox 2902 such that the lid 2904 can be moved (e.g., pivoted) relative to the cookbox 2902 between the closed position and the open position 2900 shown in FIGS. 29 and 30. Movement of the lid 2904 of the gas grill 100 between the closed position and the open position can be facilitated via user interaction with an example handle 2910 of the gas grill 100 that is coupled to the lid 2904.

In the illustrated example of FIGS. 29 and 30, the cookbox 2902, the shroud 1604, and the lid 2904 of the gas grill 100 collectively define an example cooking chamber 3006 configured to cook one or more item(s) of food. The cooking chamber 3006 of the gas grill 100 becomes accessible to a user of the gas grill 100 when the lid 2904 of the gas grill 100 is in the open position 2900 shown in FIGS. 29 and 30. Conversely, the cooking chamber 3006 of the gas grill 100 is generally inaccessible to the user of the gas grill 100 when the lid 2904 of the gas grill 100 is in the closed position. As shown in FIGS. 29 and 30, the cooking grate 1200 is located within the cooking chamber 3006. At least a portion of the IR burner 110 (e.g., the guard 224, the frame 204, and/or the downwardly facing ceramic tiles 302 of the IR burner 110) is also located within the cooking chamber 3006. The inner wall 1614 of the housing 1612 of the shroud 1604 separates the cooking chamber 3006 of the gas grill 100 from the above-described internal compartment 1902 of the housing 1612 which contains one or more portion(s) of the IR burner 110. User access to the cooking chamber 3006 of the gas grill 100 may periodically become necessary, for example, to add an item of food to the cooking chamber 3006 (e.g., at or toward the beginning of a cook), to remove an item of food from the cooking chamber 3006 (e.g., at or toward the end of a cook), and/or to flip, rotate, relocate, or otherwise move an item of food within the cooking chamber 3006 (e.g., during the middle of a cook).

Figure 31:
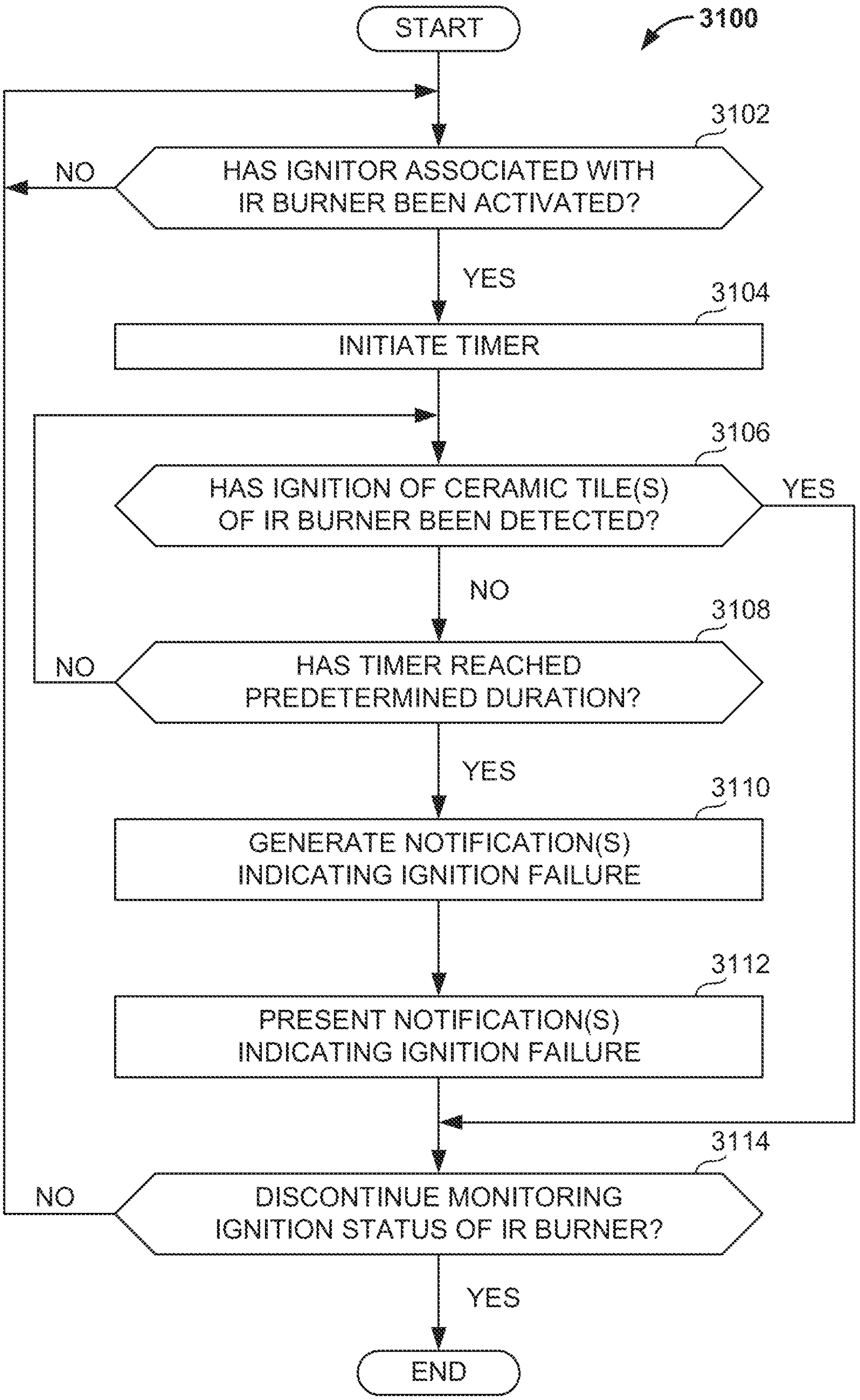
FIG. 31 is a flowchart representative of example machine-readable instructions and/or example operations that may be executed by processor circuitry to implement an ignition monitoring process via the gas grill of FIG. 1.

A flowchart representing example machine-readable instructions, which may be executed to configure processor circuitry to implement the gas grill 100 of FIG. 1, is shown in FIG. 31. The machine-readable instructions may be one or more executable program(s) or portion(s) thereof for execution by processor circuitry, such as the processor circuitry 3202 shown in the example processor platform 3200 discussed below in connection with FIG. 32. The program(s) may be embodied in software stored on one or more non-transitory computer readable storage media such as an optical storage device, a magnetic storage device, a floppy disk drive, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk associated with processor circuitry located in one or more hardware device(s). Alternatively, the entire program(s) and/or the portion(s) thereof could be executed by one or more hardware device(s) other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer-readable storage media may include one or more medium(s) located in one or more hardware device(s). Further, although example programs are described with reference to the flowchart illustrated in FIG. 31, many other methods of implementing the example gas grill 100 of FIG. 1 may alternatively be used. For example, the order of execution of the blocks may be changed, and/or some of the blocks described may be changed, eliminated, or combined. Additionally, or alternatively, any or all of the blocks may be implemented by one or more hardware circuit(s) (e.g., processor circuitry) and/or hardware device(s) structured to perform the corresponding operation(s) without executing software or firmware. The hardware circuit(s) and/or hardware device(s) can be located on a single machine, or can be located across multiple machines in different network locations.

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., one or more server(s)) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or any other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operation(s) that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or any other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit. The machine-readable instructions described herein can be represented by any past, present, or future instruction language, scripting language, programming language, etc. For example, the machine-readable instructions may be represented using any of the following languages: C, C++, C#, Java, JavaScript, Python, Perl, HyperText Markup Language (HTML), Structured Query Language (SQL), Non-relational SQL (NoSQL), Swift, etc.

As mentioned above, the example operations of FIG. 31 may be implemented using executable instructions (e.g., computer and/or machine-readable instructions) stored on one or more non-transitory computer and/or machine-readable media such as an optical storage device, a magnetic storage device, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information).

FIG. 31 is a flowchart representative of example machine-readable instructions and/or example operations 3100 that may be executed by processor circuitry (e.g., processor circuitry of the controller 128 of FIG. 1) to implement an ignition monitoring process and/or protocol via the gas grill 100 of FIG. 1. The machine-readable instructions and/or operations 3100 of FIG. 31 begin at Block 3102 when the processor circuitry of the controller 128 of FIG. 1 determines whether the ignitor 112 associated with the IR burner 110 of the gas grill 100 of FIG. 1 has been activated. For example, the processor circuitry of the controller 128 can determine that the ignitor 112 has been activated based on one or more ignition activation instruction(s), command(s), and/or signal(s) generated by the controller 128 and/or transmitted to the ignitor 112. If the processor circuitry of the controller 128 determines at Block 3102 that the ignitor 112 has been activated, control of the machine-readable instructions and/or operations 3100 of FIG. 31 proceeds to Block 3104. If the processor circuitry of the controller 128 instead determines at Block 3102 that the ignitor 112 has not been activated, control of the machine-readable instructions and/or operations 3100 of FIG. 31 remains at Block 3102.

At Block 3104, the processor circuitry of the controller 128 of FIG. 1 initiates a timer having a predetermined duration (e.g., as may be stored in the memory 130 of the gas grill 100) associated therewith. In some examples, the predetermined duration of the timer may have an associated starting time value of zero and an associated ending time value greater than zero (e.g., a timer that increases in value over time). In other examples, the predetermined duration of the timer may have an associated starting time value greater than zero and an associated ending time value of zero (e.g., a timer that decreases in value over time). Following Block 3104, control of the machine-readable instructions and/or operations 3100 of FIG. 31 proceeds to Block 3106.

At Block 3106, the processor circuitry of the controller 128 of FIG. 1 determines whether ignition of one or more ceramic tile(s) of the IR burner 110 of the gas grill 100 of FIG. 1 has been detected. For example, the processor circuitry of the controller 128 can determine, based on data sensed, measured, and/or detected by either the thermal sensor 114 or the flame sensor 116 of FIG. 1, that ignition of one or more ceramic tile(s) of the IR burner 110 has been detected. If the processor circuitry of the controller 128 determines at Block 3106 that ignition of one or more ceramic tile(s) of the IR burner 110 has not been detected, control of the machine-readable instructions and/or operations 3100 of FIG. 31 proceeds to Block 3108. If the processor circuitry of the controller 128 instead determines at Block 3106 that ignition of one or more ceramic tile(s) of the IR burner 110 has been detected, control of the machine-readable instructions and/or operations 3100 of FIG. 31 proceeds to Block 3114.

At Block 3108, the processor circuitry of the controller 128 of FIG. 1 determines whether the timer has reached the predetermined duration. If the processor circuitry of the controller 128 determines at Block 3108 that the timer has not reached the predetermined duration, control of the machine-readable instructions and/or operations 3100 of FIG. 31 returns to Block 3106. If the processor circuitry of the controller 128 instead determines at Block 3108 that the timer has reached the predetermined duration, control of the machine-readable instructions and/or operations 3100 of FIG. 31 proceeds to block 3110.

At Block 3110, the processor circuitry of the controller 128 of FIG. 1 generates one or more notification(s) (e.g., visible, audible, and/or tactile message(s) or alert(s)) that, when presented, indicate that ignition of the IR burner 110 of the gas grill 100 has failed. In some examples, the processor circuitry of the controller 128 generates one or more notification(s) that, when presented, is/are intended to expressly inform a user of the gas grill 100 that ignition of the IR burner 110 of the gas grill 100 has failed. In other examples, the processor circuitry of the controller 128 generates one or more notification(s) that, when presented, is/are intended to inherently and/or intuitively inform a user of the gas grill 100 that ignition of the IR burner 110 of the gas grill 100 has failed. Following Block 3110, control of the machine-readable instructions and/or operations 3100 of FIG. 31 proceeds to Block 3112.

At Block 3112, the processor circuitry of the controller 128 of FIG. 1 instructs, commands, signals, and/or otherwise causes the "failed ignition" notification(s) generated at Block 3110 to be presented locally and/or remotely. For example, the processor circuitry of the controller 128 may instruct, command, signal, and/or otherwise cause the user interface 118 of the gas grill 100 of FIG. 1 to locally present (e.g., via one or more of the output device(s) 122 of the user interface 118) one or more of the "failed ignition" notification(s). As another example, the processor circuitry of the controller 128 may additionally or alternatively instruct, command, signal, and/or otherwise cause the network interface 124 of the gas grill 100 of FIG. 1 to transmit (e.g., via one or more of the communication device(s) 126 of the network interface 124) one or more of the "failed ignition" notification(s) to one or more of the remote device(s) 132 of FIG. 1 for remote presentation via one or more of the output device(s) of the remote device(s) 132. In some examples, one or more of the "failed ignition" notification(s) may be presented for a predetermined duration (e.g., a predetermined presentation duration, as may be stored in the memory 130 of the gas grill 100). In other examples, one or more of the "failed ignition" notification(s) may be presented until a countering event (e.g., detecting ignition of one or more of the ceramic tile(s) of the IR burner 110, or receiving a request, command, and/or instruction to terminate the presentation of the "failed ignition" notification(s)) occurs. Following Block 3112, control of the machine-readable instructions and/or operations 3100 of FIG. 31 proceeds to Block 3114.

At Block 3114, the processor circuitry of the controller 128 of FIG. 1 determines whether to end the ignition monitoring process and/or protocol set forth in FIG. 31. For example, the processor circuitry of the controller 128 can determine whether the user interface 118 and/or the network interface 124 of the gas grill 100 of FIG. 1 has/have received any commands, instructions, signals, inputs, and/or other data indicative of a request to terminate the ignition monitoring process and/or protocol of FIG. 31. If the processor circuitry of the controller 128 determines at Block 3114 that the ignition monitoring process and/or protocol of FIG. 31 is to continue (e.g., that no termination request has been received), control of the machine-readable instructions and/or operations 3100 of FIG. 31 returns to Block 3102. If the processor circuitry of the controller 128 instead determines at Block 3114 that the ignition monitoring process and/or protocol of FIG. 31 is to cease or terminate (e.g., that a termination request has been received), the machine-readable instructions and/or operations 3100 of FIG. 31 end.

Figure 32:
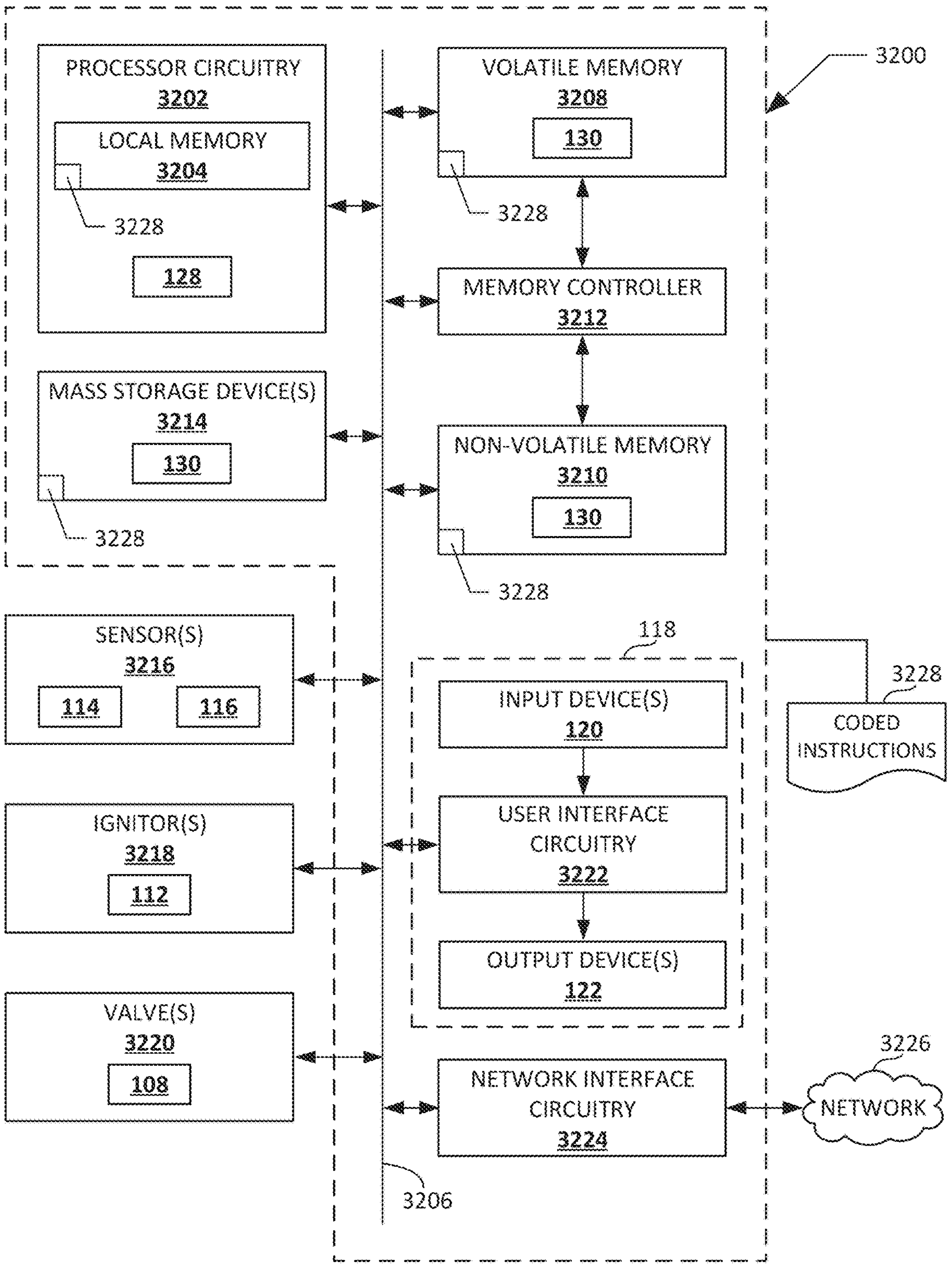
FIG. 32 is a block diagram of an example processor platform including processor circuitry structured to execute and/or instantiate the machine-readable instructions and/or operations of FIG. 31 to implement the gas grill of FIG. 1.

FIG. 32 is a block diagram of an example processor platform 3200 including processor circuitry structured to execute and/or instantiate the machine-readable instructions and/or operations 3100 of FIG. 31 to implement the gas grill 100 of FIG. 1. The processor platform 3200 of the illustrated example includes processor circuitry 3202. The processor circuitry 3202 of the illustrated example is hardware. For example, the processor circuitry 3202 includes any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s). In this example, the processor circuitry 3202 implements the controller 128 of FIG. 1.

The processor circuitry 3202 of the illustrated example includes a local memory 3204 (e.g., a cache, registers, etc.). The processor circuitry 3202 is in electrical communication with a main memory via a bus 3206, with the main memory including a volatile memory 3208 and a non-volatile memory 3210. The volatile memory 3208 may be implemented by any type of random-access memory (RAM) (e.g., Synchronous Dynamic Random Access Memory (SDRAM), Dynamic Random Access Memory (DRAM), RAMBUS® Dynamic Random Access Memory (RDRAM®), etc.). The non-volatile memory 3210 may be implemented by flash memory and/or any other desired type of memory device. Access to the main memory 3208, 3210 of the illustrated example is controlled by a memory controller 3212.

The processor platform 3200 of the illustrated example also includes one or more mass storage device(s) 3214 to store software and/or data. Examples of such mass storage device(s) 3214 include an optical storage device, a magnetic storage device, a floppy disk drive, a hard disk drive (HDD), a solid state storage device, a flash memory device, a read-only memory (ROM), a random-access memory (RAM), a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information). In the illustrated example of FIG. 32, one or more of the volatile memory 3208, the non-volatile memory 3210, and/or the mass storage device(s) 3214 implement(s) the memory 130 of FIG. 1.

The processor circuitry 3202 is also in electrical communication with one or more sensor(s) 3216 via the bus 3206. In this example, the sensors 3216 include the thermal sensor 114 and the flame sensor 116 of FIG. 1. The processor circuitry 3202 is also in electrical communication with one or more ignitor(s) 3218 via the bus 3206. In this example, the ignitor(s) 3218 include the ignitor 112 of FIG. 1. The processor circuitry 3202 is also in electrical communication with one or more valve(s) 3220 via the bus 3206. In this example, the valve(s) 3220 include the valve 108 of FIG. 1.

The processor platform 3200 of the illustrated example also includes user interface circuitry 3222. The user interface circuitry 3222 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In the illustrated example, one or more input device(s) 120 are connected to the user interface circuitry 3222. The input device(s) 120 permit(s) a user to enter data and/or commands into the processor circuitry 3202. The input device(s) 120 can be implemented, for example, by one or more of a touchscreen, a button, a dial, a knob, a switch, an audio sensor, a microphone, an image sensor, a camera, and/or a voice recognition system. One or more output device(s) 122 are also connected to the user interface circuitry 3222 of the illustrated example. The output device(s) 122 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker. The user interface circuitry 3222 of the illustrated example, thus, typically includes a graphics driver card, a graphics driver chip, and/or graphics processor circuitry such as a GPU. In the illustrated example of FIG. 32, the user interface circuitry 3222, the input device(s) 120, and the output device(s) 122 collectively implement the user interface 118 of FIG. 1.

The processor platform 3200 of the illustrated example also includes network interface circuitry 3224. The network interface circuitry 3224 includes one or more communication device(s) (e.g., transmitter(s), receiver(s), transceiver(s), modem(s), gateway(s), wireless access point(s), etc.) to facilitate exchange of data with external machines (e.g., computing devices of any kind, including the remote device(s) 132 of FIG. 1) by a network 3226. The communication can be by, for example, a satellite system, a wireless system, a cellular telephone system, an Ethernet connection, a digital subscriber line (DSL) connection, a telephone line connection, a coaxial cable system, an optical connection, etc. In the illustrated example of FIG. 32, the network interface circuitry 3224 implements the network interface 124 (e.g., including the communication device(s) 126) of FIG. 1.

Coded instructions 3228 including the above-described machine-readable instructions and/or operations 3100 of FIG. 31 may be stored in the local memory 3204, in the volatile memory 3208, in the non-volatile memory 3210, on the mass storage device(s) 3214, and/or on a removable non-transitory computer-readable storage medium such as a flash memory stick, a dongle, a CD, a DVD, or a Blu-ray disk.

The following paragraphs provide various examples in relation to the disclosed gas grills including downwardly facing IR burner assemblies.

Example 1 includes a gas grill. In Example 1, the gas grill includes a cookbox, a shroud, an infrared (IR) burner, and a cooking grate. The shroud is coupled to the cookbox. The shroud includes opposing sidewalls and a housing. The opposing sidewalls extend upwardly from the cookbox and include a plurality of pairs of opposing grate supports. The plurality of pairs of opposing grate supports includes at least a first pair of opposing grate supports and a second pair of opposing grate supports. The second pair of opposing grate supports is located below the first pair of opposing grate supports. The housing extends between the opposing sidewalls and defines an internal compartment that is laterally bound by the opposing sidewalls. The IR burner is coupled to the housing such that a portion of the IR burner is located within the internal compartment. The IR burner includes a plurality of downwardly facing ceramic tiles configured in an end-to-end arrangement. The cooking grate is located below the IR burner and supported by one of the plurality of pairs of opposing grate supports. The cooking grate is spaced apart from the IR burner by a first distance when the cooking grate is supported by the first pair of opposing grate supports and by a second distance greater than the first distance when the cooking grate is supported by the second pair of opposing grate supports.

Example 2 includes the gas grill of Example 1. In Example 2, the plurality of pairs of opposing grate supports further includes a third pair of opposing grate supports located below the first pair of opposing grate supports and above the second pair of opposing grate supports. The cooking grate is spaced apart from the IR burner by a third distance when the cooking grate is supported by the third pair of opposing grate supports. The third distance is greater than the first distance and less than the second distance.

Example 3 includes the gas grill of Example 1. In Example 3, the cooking grate includes a front support rod, a rear support rod, a plurality of laterally spaced support rods, a first indicator rod, and a second indicator rod. The rear support rod is arranged parallel to and spaced apart from the front support rod. The laterally spaced support rods are arranged perpendicular to and extend between the front support rod and the rear support rod. The first indicator rod is welded to an underside of one or more of the plurality of laterally spaced support rods. The first indicator rod is arranged parallel to and located rearward of the front support rod. The second indicator rod is located rearward of the first indicator rod and welded to an underside of one or more of the plurality of laterally spaced support rods. The second indicator rod is arranged parallel to and located forward of the rear support rod. The first indicator rod and the second indicator rod collectively indicate an optimal food placement area associated with a projection of heat generated by the IR burner.

Example 4 includes the gas grill of Example 3. In Example 4, the first indicator rod has a length that is less than a length of the front support rod, and the second indicator rod has a length that is less than a length of the rear support rod.

Example 5 includes the gas grill of Example 4. In Example 5, the length of the first indicator rod is greater than or equal to a length of the end-to-end arrangement of the plurality of downwardly facing ceramic tiles.

Example 6 includes the gas grill of Example 4. In Example 6, the second indicator rod is spaced apart from the first indicator rod by a distance that is greater than or equal to a width of the end-to-end arrangement of the plurality of downwardly facing ceramic tiles.

Example 7 includes the gas grill of Example 1. In Example 7, respective neighboring ones of the plurality of downwardly facing ceramic tiles are spaced apart by a gap of ten millimeters or less.

Example 8 includes the gas grill of Example 1. In Example 8, the gas grill further includes a guard coupled to the IR burner. The guard includes a plurality of first rods and a plurality of second rods. The first rods are located below and spaced apart from the plurality of downwardly facing ceramic tiles. Respective ones of the first rods are oriented parallel to and spaced apart from one another. The second rods are located below and spaced apart from the plurality of downwardly facing ceramic tiles. Respective ones of the second rods are oriented parallel to and spaced apart from one another, and are oriented orthogonally relative to the respective ones of the first rods. The first rods and the second rods are configured to protect a bottom surface of each one of the plurality of downwardly facing ceramic tiles.

Example 9 includes the gas grill of Example 1. In Example 9, the housing formed by the shroud provides a closed off boundary between the internal compartment and a cooking chamber of the gas grill.

Example 10 includes a gas grill. In Example 10, the gas grill includes a cookbox, a shroud, an infrared (IR) burner, an ignitor, and a sensor. The shroud is coupled to the cookbox. The shroud includes opposing sidewalls and a housing. The opposing sidewalls extend upwardly from the cookbox. The housing extends between the opposing sidewalls and defines an internal compartment that is laterally bound by the opposing sidewalls. The IR burner is coupled to the housing such that a portion of the IR burner is located within the internal compartment. The IR burner includes a plurality of downwardly facing ceramic tiles configured in an end-to-end arrangement. The end-to-end arrangement has a first end and a second end located opposite the first end. The ignitor is operatively positioned proximate the first end of the end-to-end arrangement. The ignitor is configured to ignite a first ceramic tile from among the plurality of downwardly facing ceramic tiles. The first ceramic tile is located at the first end of the end-to-end arrangement. The sensor is configured to detect whether at least one of the plurality of downwardly facing ceramic tiles is ignited.

Example 11 includes the gas grill of Example 10. In Example 11, the gas grill includes a component housing coupled to and extending from a portion of the housing formed by the shroud. The component housing is configured to contain a portion of the ignitor.

Example 12 includes the gas grill of Example 11. In Example 12, the gas grill includes an ignitor bracket coupled to the component housing. The ignitor bracket is configured to support the ignitor.

Example 13 includes the gas grill of Example 12. In Example 13, the gas grill includes a grounding bracket extending between the ignitor bracket and the IR burner.

Example 14 includes the gas grill of Example 10. In Example 14, the sensor is a thermal sensor operatively positioned proximate the second end of the end-to-end arrangement. The thermal sensor is configured to detect whether a second ceramic tile from among the plurality of downwardly facing ceramic tiles is ignited. The second ceramic tile is located at the second end of the end-to-end arrangement.

Example 15 includes the gas grill of Example 14. In Example 15, respective neighboring ones of the plurality of downwardly facing ceramic tiles are spaced apart by a gap. A crossover ignition spanning each gap is required to ignite the second ceramic tile following ignition of the first ceramic tile by the ignitor. The thermal sensor is configured to determine whether the crossover ignition has reached the second ceramic tile.

Example 16 includes the gas grill of Example 15. In Example 16, the gap between the respective neighboring ones of the plurality of downwardly facing ceramic tiles is ten millimeters or less.

Example 17 includes the gas grill of Example 14. In Example 17, the gas grill includes a component housing coupled to and extending from a portion of the housing formed by the shroud. The component housing is configured to contain a portion of the thermal sensor.

Example 18 includes the gas grill of Example 10. In Example 18, the sensor is a flame sensor operatively positioned proximate the first end of the end-to-end arrangement. The flame sensor is configured to detect whether the first ceramic tile is ignited.

Example 19 includes the gas grill of Example 18. In Example 19, the gas grill includes a component housing coupled to and extending from a portion of the housing formed by the shroud. The component housing is configured to contain a portion of the ignitor and a portion of the flame sensor.

Example 20 includes the gas grill of Example 10. In Example 20, the housing formed by the shroud provides a closed off boundary between the internal compartment and a cooking chamber of the gas grill.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A gas grill, comprising:

a cookbox;

a shroud coupled to the cookbox, the shroud including opposing sidewalls and a housing, the opposing sidewalls extending upwardly from the cookbox and including one or more pairs of opposing grate supports, the housing extending between the opposing sidewalls and defining an internal compartment that is laterally bound by the opposing sidewalls;

an infrared (IR) burner coupled to the housing such that a portion of the IR burner is located within the internal compartment, the IR burner including a plurality of downwardly facing ceramic tiles configured in an end-to-end arrangement, the end-to-end arrangement having a first end and a second end located opposite the first end; and a cooking grate located below the IR burner and supported by one of the one or more pairs of opposing grate supports, wherein the cooking grate includes:

a front support rod;

a rear support rod arranged parallel to and spaced apart from the front support rod;

a plurality of laterally spaced support rods arranged perpendicular to and extending between the front support rod and the rear support rod;

a first indicator rod welded to an underside of one or more of the plurality of laterally spaced support rods, the first indicator rod arranged parallel to and located rearward of the front support rod; and a second indicator rod located rearward of the first indicator rod and welded to an underside of one or more of the plurality of laterally spaced support rods, the second indicator rod arranged parallel to and located forward of the rear support rod, the first indicator rod and the second indicator rod collectively indicating an optimal food placement area associated with a projection of heat generated by the IR burner.

2. The gas grill of claim 1, wherein the first indicator rod has a length that is less than a length of the front support rod, and the second indicator rod has a length that is less than a length of the rear support rod.

3. The gas grill of claim 2, wherein the length of the first indicator rod is greater than or equal to a length of the end-to-end arrangement of the plurality of downwardly facing ceramic tiles.

4. The gas grill of claim 2, wherein the second indicator rod is spaced apart from the first indicator rod by a distance that is greater than or equal to a width of the end-to-end arrangement of the plurality of downwardly facing ceramic tiles.

5. The gas grill of claim 1, wherein respective neighboring ones of the plurality of downwardly facing ceramic tiles are spaced apart by a gap of ten millimeters or less.

6. The gas grill of claim 1, further comprising a guard coupled to the IR burner, the guard including:

a plurality of first guard rods located below and spaced apart from the plurality of downwardly facing ceramic tiles, respective ones of the first guard rods being oriented parallel to and spaced apart from one another; and a plurality of second guard rods located below and spaced apart from the plurality of downwardly facing ceramic tiles, respective ones of the second guard rods being oriented parallel to and spaced apart from one another, and being oriented orthogonally relative to the respective ones of the first guard rods, wherein the first guard rods and the second guard rods are configured to protect a bottom surface of each one of the plurality of downwardly facing ceramic tiles.

7. The gas grill of claim 1, wherein the housing formed by the shroud provides a closed off boundary between the internal compartment and a cooking chamber of the gas grill.

8. The gas grill of claim 1, further comprising:

an ignitor operatively positioned proximate the first end of the end-to-end arrangement, the ignitor configured to ignite a first ceramic tile from among the plurality of downwardly facing ceramic tiles, the first ceramic tile located at the first end of the end-to-end arrangement; and a sensor configured to detect whether at least one of the plurality of downwardly facing ceramic tiles is ignited.

9. The gas grill of claim 8, further comprising a component housing coupled to and extending from a portion of the housing formed by the shroud, the component housing configured to contain a portion of the ignitor.

10. The gas grill of claim 9, further comprising an ignitor bracket coupled to the component housing and configured to support the ignitor.

11. The gas grill of claim 10, further comprising a grounding bracket extending between the ignitor bracket and the IR burner.

12. The gas grill of claim 8, wherein the sensor is a thermal sensor operatively positioned proximate the second end of the end-to-end arrangement, the thermal sensor configured to detect whether a second ceramic tile from among the plurality of downwardly facing ceramic tiles is ignited, the second ceramic tile located at the second end of the end-to-end arrangement.

13. The gas grill of claim 12, wherein respective neighboring ones of the plurality of downwardly facing ceramic tiles are spaced apart by a gap, wherein a crossover ignition spanning each gap is required to ignite the second ceramic tile following ignition of the first ceramic tile by the ignitor, wherein the thermal sensor is configured to determine whether the crossover ignition has reached the second ceramic tile.

14. The gas grill of claim 13, wherein the gap between the respective neighboring ones of the plurality of downwardly facing ceramic tiles is ten millimeters or less.

15. The gas grill of claim 12, further comprising a component housing coupled to and extending from a portion of the housing formed by the shroud, the component housing configured to contain a portion of the thermal sensor.

16. The gas grill of claim 8, wherein the sensor is a flame sensor operatively positioned proximate the first end of the end-to-end arrangement, the flame sensor configured to detect whether the first ceramic tile is ignited.

17. The gas grill of claim 16, further comprising a component housing coupled to and extending from a portion of the housing formed by the shroud, the component housing configured to contain a portion of the ignitor and a portion of the flame sensor.

18. The gas grill of claim 1, wherein the one or more pairs of opposing grate supports includes a first pair of opposing grate supports and a second pair of opposing grate supports by which the cooking grate can selectively be supported, the second pair of opposing grate supports located below the first pair of opposing grate supports, wherein the cooking grate is spaced apart from the IR burner by a first distance when the cooking grate is supported by the first pair of opposing grate supports and by a second distance greater than the first distance when the cooking grate is supported by the second pair of opposing grate supports.

19. The gas grill of claim 18, wherein the one or more pairs of opposing grate supports further includes a third pair of opposing grate supports by which the cooking grate can selectively be supported, the third pair of opposing grate supports located below the first pair of opposing grate supports and above the second pair of opposing grate supports, wherein the cooking grate is spaced apart from the IR burner by a third distance when the cooking grate is supported by the third pair of opposing grate supports, the third distance being greater than the first distance and less than the second distance.

* * * * *